(12) United States Patent
Heimer

(10) Patent No.: US 7,515,345 B2
(45) Date of Patent: Apr. 7, 2009

(54) COMPACT OBJECTIVE LENS ASSEMBLY

(75) Inventor: Richard J. Heimer, Melbourne, FL (US)

(73) Assignee: DRS Sensors & Targeting Systems, Inc., Palm Bay, FL (US)

(*) Notice: Subject to any disclaimer, the term of this patent is extended or adjusted under 35 U.S.C. 154(b) by 290 days.

(21) Appl. No.: 11/539,804

(22) Filed: Oct. 9, 2006

(65) Prior Publication Data

US 2008/0291531 A1 Nov. 27, 2008

(51) Int. Cl.
G02B 27/14 (2006.01)
G02B 5/04 (2006.01)

(52) U.S. Cl. .............. 359/630; 359/637; 359/631; 359/833; 359/377

(58) Field of Classification Search ........ 359/625, 359/626, 629–632, 637, 834, 836, 422, 423, 359/431, 432, 328, 351, 362, 363, 372–377; 396/20, 305, 332, 373, 385, 429; 348/335, 348/337, 341, 207.99; 250/333, 214 LA; 353/20, 32, 39, 81; 356/69, 237.5
See application file for complete search history.

(56) References Cited

U.S. PATENT DOCUMENTS

| 2,374,475 | A | * | 4/1945 | Dirksen et al. ........... 396/429 |
|---|---|---|---|---|
| 2,825,815 | A | * | 3/1958 | Dis Ario ................. 250/333 |
| 3,720,459 | A | * | 3/1973 | Bach ..................... 352/113 |
| 5,801,882 | A | * | 9/1998 | Miyauchi ................ 359/431 |
| 6,008,948 | A | | 12/1999 | Tagino |
| 6,081,372 | A | * | 6/2000 | Mura ..................... 359/377 |
| 6,084,715 | A | | 7/2000 | Aoki et al. |
| 6,178,048 | B1 | | 1/2001 | Tagino |
| 6,185,046 | B1 | | 2/2001 | Tagino |
| 6,490,095 | B2 | * | 12/2002 | Okuyama et al. ........ 359/631 |
| 6,510,010 | B1 | * | 1/2003 | Takahashi ............... 359/720 |
| 6,876,390 | B1 | | 4/2005 | Nagata |
| 6,900,950 | B2 | | 5/2005 | Nagata |
| 7,327,513 | B2 | * | 2/2008 | Johnson ................. 359/363 |

* cited by examiner

*Primary Examiner*—Loha Ben
(74) *Attorney, Agent, or Firm*—Sonnenschein Nath & Rosenthal LLP

(57) ABSTRACT

A high-performance image-forming optical objective lens made compact and thin, particularly in the object side direction, by twice folding the optical path by means of two prism lenses longitudinally separated and arranged in an angular relationship to one another. The prisms have entrance and exit faces each of which is constructed of a curved surface having optical power, as well as having a rotationally symmetric polynomial aspheric attribute. The image-forming optical objective is particularly suited to helmet-mounted applications wherein the angular means for folding the optical path provides for an optical objective configuration that closely conforms to the exterior surface contour of the helmet, while providing a minimal forward projection in object space from the helmet.

48 Claims, 35 Drawing Sheets

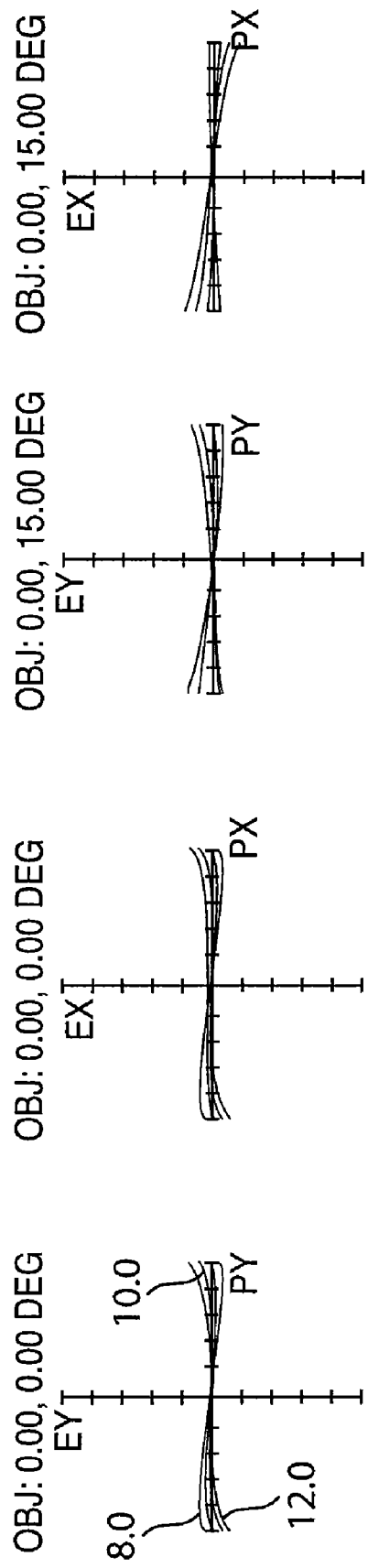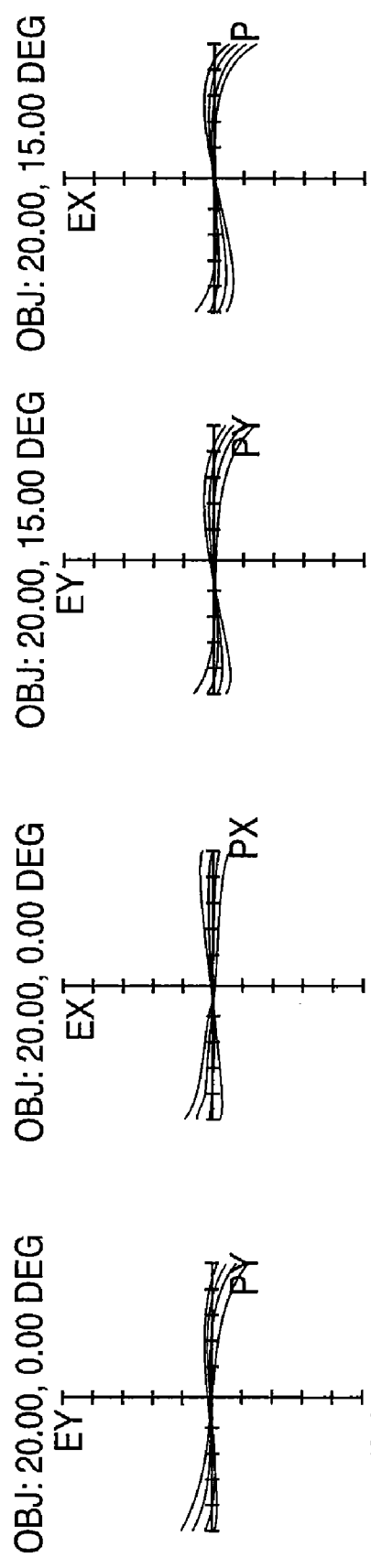

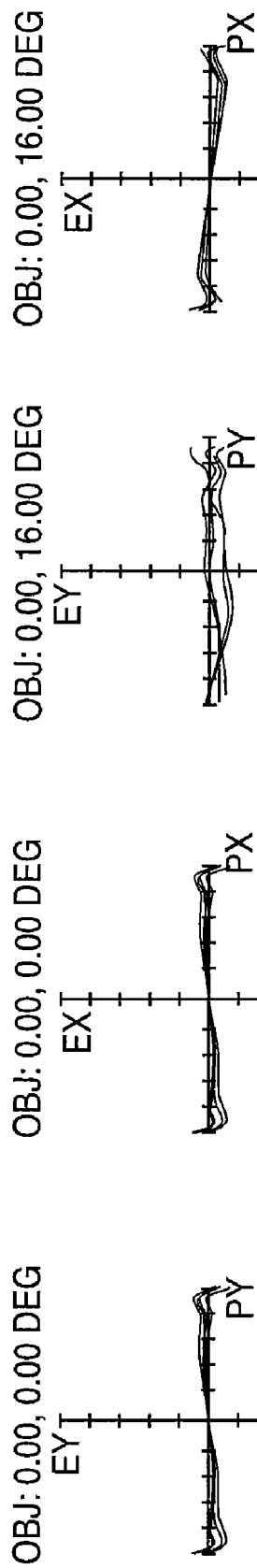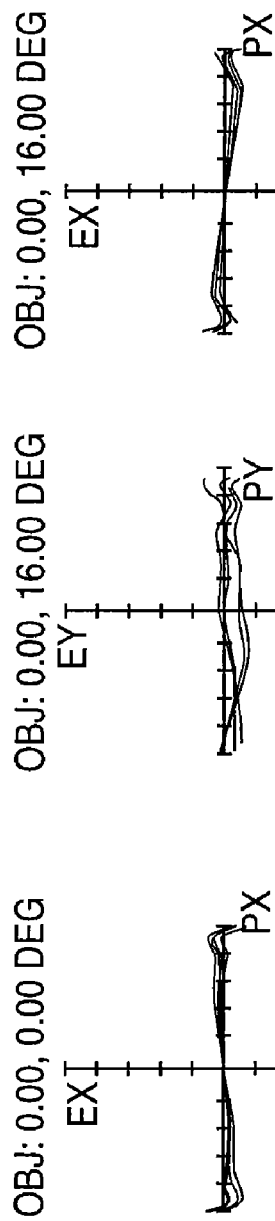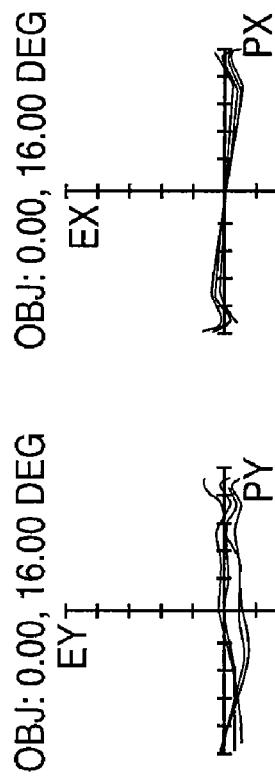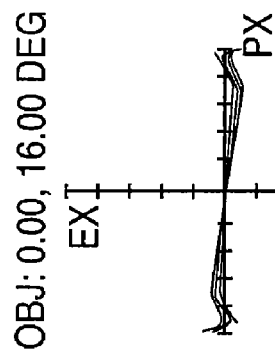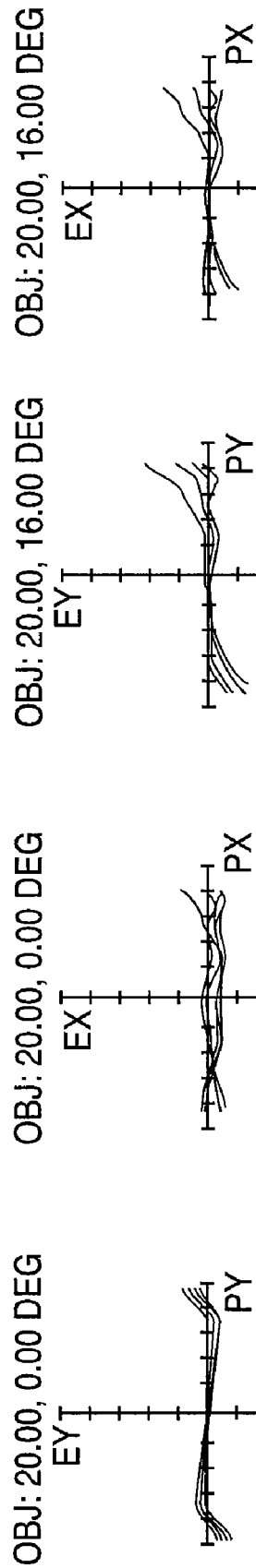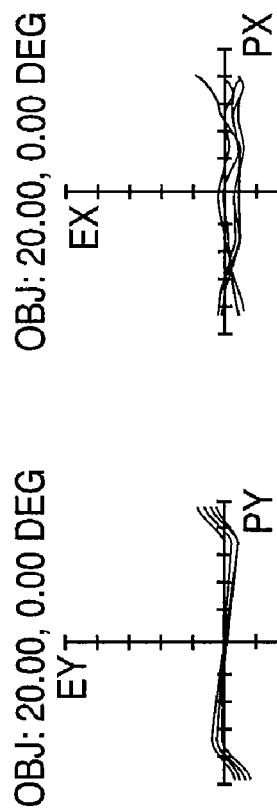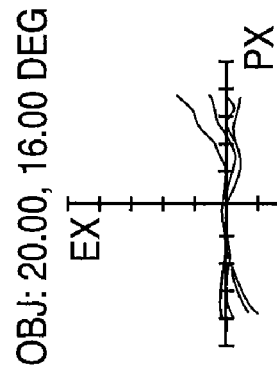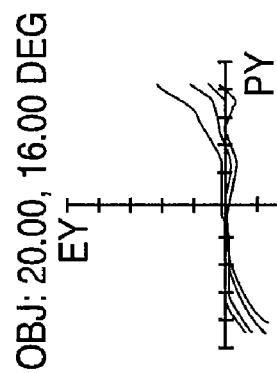

COMPACT OBJECTIVE LENS ASSEMBLY

FIELD OF THE INVENTION

The present invention relates to image-forming optical systems for applications in the visible, near infrared and thermal infrared regions of the electromagnetic spectrum. In particular, the present invention relates to an objective lens assembly having two prisms longitudinally separated relative to a structure (such as a helmet or other headgear), and arranged in an angular relationship to one another such that an optical path through the system is folded to conform to a surface of the structure and to minimize a length of the optical path along an axis perpendicular to the structure surface.

BACKGROUND OF THE INVENTION

With the advent of small, low power stand-alone electronic type cameras for the detection of visible, near-infrared (VNIR) and long-wave infrared (LWIR) images (such as the conventional image-intensified CMOS imager for VNIR image detection and the uncooled micro-bolometer focal plane array imager for LWIR image detection), the number of applications for these types of VNIR or LWIR cameras has expanded to include hand-held, weapon-borne and helmet-mounted applications. However, the conventional VNIR and LWIR cameras each have an image-forming optical systems or objective lens assembly that is typically too long in a field-of-view axis to be suitable for use in hand-held, weapon-borne and helmet-mounted applications.

For example, FIGS. 1 and 2 depict a front and side view, respectively, of a conventional LWIR camera 50 and a conventional VNIR camera 60 each mounted to a helmet 70 having a body axis coordinate system 72. The coordinate system 72 includes a z-axis 74, a y-axis 76, and a x-axis 78. As shown in FIGS. 1 and 2, the z-axis 74 corresponds to a longitudinal axis of the helmet 70 running from the front to the back of the helmet 70. The y-axis 76 is orthogonal to the z-axis 74 and runs from the bottom to the top of the helmet 70. The x-axis 78 is orthogonal to the z-axis 74 and the y-axis 76.

The LWIR camera 50 and the VNIR camera 60 each include an objective lens assembly 52 and 62, respectively, and a corresponding image detector and processor 54 and 64, respectively, for detecting and processing an image received via the objective lens assembly 52 or 62. The LWIR and VNIR cameras 50 and 60 are shown in a juxtaposed relationship, and arranged in such a way that their respective axial principal rays 58 and 68 are received along and define an optical path parallel to the z-axis 74 of the helmet 70. The optical path of each of the cameras 50 and 60 is also displaced from one another along the y-axis 76 of the helmet 70. In the conventional system depicted in FIGS. 1 and 2, the optical path of the LWIR and VNIR cameras 50 and 60 are positioned in close proximity along the y-axis 76 of the helmet in order to minimize sensor-to-sensor (e.g., camera 50 to camera 60) parallax.

Each objective lens assembly 52 and 62 is constructed as a series of lens elements or lens groupings (not shown in the figures), sequentially arranged and separated along their respective axial principal ray or optical path 58 and 68 and which define a respective front vertex-to-image (or entrance pupil to exit pupil) distance 58 and 68 for the respective conventional objective lens assembly 52 and 62. The telephoto ratio of each objective lens assembly 52 and 62 is approximately 1.7/1. As shown in FIG. 2, despite the relatively short front vertex-to-image distances 56 and 66, each of the conventional objective lens assemblies 52 and 62, when attached to their respective image detector and processor 54 or 64 and mounted on the helmet 70, exhibit an excessively long forward projection in the z-axis 74 of the helmet 70. The forward projection of each of these conventional objective lens assemblies 52 and 54 adversely affects the individual movement of the user wearing the helmet 70, interfering with other equipment or objects near the user. For example, this forward projection problem can inhibit a soldier's choice of weapon firing positions.

In general, for an objective lens assembly to be useful in the near infrared and far infrared wavebands, the respective relative aperture of the objective lens assembly must be small, such as, for example, in the approximate range of f/1.0 to f/1.2. Further, to be useful in a helmet-mounted application, the angular field-of-view must be comparatively large, such as, for example, 30° in elevation (vertical) and 40° in azimuth (horizontal).

Conventional objective lens assemblies having an effective focal length that is longer than the overall length of the respective prior art objective lens assembly are well known. When the ratio of overall length to focal length is less than unity, an objective lens assembly is referred to as telephoto. Unfortunately, telephoto lenses are not suited for applications requiring small relative apertures and large fields of view because they are prone to sizeable residuals of a backward curving field and both axial and lateral chromatic aberration.

Certain conventional objective lens assemblies have been designed to meet the aperture and field requirements mentioned above. However, the ratio of overall length to focal length (telephoto ratio) of each of these objective lens assemblies generally is greater than 1.7. When such an objective lens assembly is combined with an electronic camera, the overall optical path inclusive of the objective lens and camera body is too long (in the direction perpendicular to the camera focal plane array) for the helmet-mounted application, causing the forward projection problem discussed above.

One conventional objective lens assembly or optical system employed in small-sized or hand held cameras uses two prisms to fold an optical path as disclosed in Nagata, U.S. Pat. No. 6,900,950. The first prism has a first transmitting surface, a first reflecting surface and a second transmitting surface. The second prism has a first transmitting surface, a first reflecting surface, a second reflecting surface and a second transmitting surface. In that arrangement, the optical path propagation through the second prism, as a result of two reflections, has a perpendicular intersection, whereafter the emerging light path is parallel to and displaced transversely from the initial light path from the source, which is at normal incident on the first prism face. However, this conventional optical system with electronic camera attached is neither satisfactorily thin nor compact. Moreover, this conventional optical system makes use of asymmetric free-form aspheric surfaces that require expensive tooling, which may require a large production base to satisfactorily amortize the tooling cost.

A second conventional objective lens assembly or optical system that uses two prisms is disclosed in Nagata, U.S. Pat. No. 6,876,390. The first and second prisms of this second conventional optical system each has a first surface through which a light beam enters the prism, a second surface reflecting the incident light beam in the prism, a third surface reflecting the reflected light beam in the prism, and a fourth surface through which the light beam exits the prism. The large number of reflecting surfaces in this conventional optical system has the disadvantage of being extremely sensitive to tilt and decenter errors. Since at least two reflecting surfaces in each prism are rotationally asymmetric free-form aspheric surfaces, fabricating each of the prisms in this second conventional optical system is costly. Finally, this second conventional optical system alone or when attached to an electronic camera is neither thin nor compact for a helmet-mounted application.

A third conventional objective lens assembly or optical system that uses two prisms is disclosed in Aoki et al., U.S. Pat. No. 6,084,715. The first and second prisms of this second conventional optical system are separated transversely with an aperture stop disposed between the two prisms. The first prism has an object facing reflecting surface with an aspheric surface attribute that reflects the light beam in the prism, providing power to the light beam as it is reflected. The second prism has an image facing reflecting surface with an aspheric surface geometry that reflects the light beam in said prism, also giving power to the light beam upon reflection. The entrance and exit faces of each prism have aspheric surface attributes. All of said aspheric surfaces are asymmetrical free-form surface geometries. Further, the large number of asymmetric free-form aspheric surfaces in this example has the disadvantage of being extremely sensitive to manufacturing errors. Moreover, this configuration when attached to an electronic camera is neither sufficiently thin nor compact for a helmet-mounted application.

Therefore, a need exists for an objective lens assembly that overcomes the problems noted above and others previously experienced for a VNIR camera or a LWIR camera suitable for use in hand-held, weapon-borne and helmet-mounted applications.

SUMMARY OF THE INVENTION

Optical systems and assemblies consistent with the present invention provide a compact objective lens assembly suitable for use in helmet-mounted applications. The objective lens assembly twice folds the optical path of the objective lens assembly by means of two prism lenses longitudinally separated and arranged in an angular relationship to one another.

In accordance with articles of manufacture consistent with the present invention, an objective lens assembly is provided having a first prism and a second prism, which may each be right angle prisms. The first prism includes, in sequence of light propagation from the object, a first transmitting surface A, a reflecting surface B and a second transmitting surface C. The first transmitting surface A is operatively configured to pass light from the object to the reflecting surface B. The reflecting surface B being operatively configured to reflect the passed light towards the second transmitting surface C. The second transmitting surface C is operatively configured to allow the reflected light from the reflecting surface B to pass through and exit the first prism. The second prism includes, in sequence of light propagation from the object, a first transmitting surface D, a reflecting surface E and a second transmitting surface F. The first transmitting surface D being operatively configured to pass the light exiting the first prism to the reflecting surface E. The reflecting surface E is operatively configured to reflect the passed light towards the second transmitting surface F. The second transmitting surface F is operatively configured to allow the reflected light from the reflecting surface E to pass through and exit the second prism. The first prism has a first local coordinate system having a local x-axis, a local y-axis, and a local z-axis that intersects the first transmitting surface A of the first prism. The first prism is rotated a first predetermined angle about the local z-axis of the first prism. The second prism has a second local coordinate system having a local axis that intersects the first transmitting surface D of the second prism and is aligned with one of the local x-axis and the local y-axis of the rotated first prism. The second prism is rotated a second predetermined angle about the local axis of the second prism.

In accordance with articles of manufacture consistent with the present invention, a dual field-of-view objective lens assembly for forming an image of an object is provided. The objective lens assembly comprises, in sequence from the object side thereof, a first grouping that includes a first positive power lens; a first prism; and a second positive power lens; and a second grouping that includes a first negative power lens, a second prism and a second positive power lens. The first prism has, in sequence of light propagation from the object, a first transmitting surface A, a reflecting surface B and a second transmitting surface C. The first transmitting surface A is operatively configured to pass light from the object to the reflecting surface B. The reflecting surface B is operatively configured to reflect the passed light towards the second transmitting surface C. The second transmitting surface C is operatively configured to allow the reflected light from the reflecting surface B to pass through and exit the first prism. The second prism has, in sequence of light propagation from the object, a first transmitting surface D, a reflecting surface E and a second transmitting surface F. The first transmitting surface D is operatively configured to pass the light exiting the first prism to the reflecting surface E. The reflecting surface E is operatively configured to reflect the passed light towards the second transmitting surface F. The second transmitting surface F is operatively configured to allow the reflected light from the reflecting surface E to pass through and exit the second prism. The second positive power lens of the first grouping has a center axis and is adapted to selectively move along the center axis between the second transmitting surface C of the first prism and the first negative power lens to change a focal length of the objective lens assembly between a narrow focal position and a wide-angle focal position.

In accordance with articles of manufacture consistent with the present invention, an objective lens assembly for forming an image of an object is provided. The objective lens assembly, comprising, in sequence from the object side thereof: a first grouping including a first prism and a first achromatic doublet; and a second grouping including a second prism and a second achromatic doublet. The first prism has, in sequence of light propagation from the object, a first transmitting surface A, a reflecting surface B and a second transmitting surface C. The first transmitting surface A is operatively configured to pass light from the object to the reflecting surface B. The reflecting surface B is operatively configured to reflect the passed light towards the second transmitting surface C. The second transmitting surface C is operatively configured to allow the reflected light from the reflecting surface B to pass through and exit the first prism. The second prism has, in sequence of light propagation from the object, a first transmitting surface D, a reflecting surface E and a second transmitting surface F. The first transmitting surface D is operatively configured to pass the light exiting the first prism to the reflecting surface E. The reflecting surface E is operatively configured to reflect the passed light towards the second transmitting surface F. The second transmitting surface F is operatively configured to allow the reflected light from the reflecting surface E to pass through and exit the second prism.

In accordance with systems consistent with the present invention, an optical system is provided comprising a first objective lens assembly for forming a thermal image of an object; and a second objective lens assembly for forming a near-infrared image of the object. The first objective lens assembly includes: a first prism having, in sequence of light propagation from the object, a first transmitting surface A, a reflecting surface B and a second transmitting surface C. The first transmitting surface A is operatively configured to pass light from the object to the reflecting surface B. The reflecting surface B is operatively configured to reflect the passed light towards the second transmitting surface C. The second transmitting surface C is operatively configured to allow the reflected light from the reflecting surface B to pass through and exit the first prism. The first prism has a first local coordinate system having a local X-axis, a local Y-axis, and a local Z-axis that intersects the first transmitting surface A of the first prism. The first prism is rotated a first predetermined angle about the local Z-axis of the first prism. The objective lens assembly further includes a second prism having, in sequence of light propagation from the object, a first transmitting surface D, a reflecting surface E and a second transmitting surface F. The first transmitting surface D is operatively configured to pass the light exiting the first prism to the reflecting surface E. The reflecting surface E is operatively configured to reflect the passed light towards the second transmitting surface F. The second transmitting surface F is operatively configured to allow the reflected light from the reflecting surface E to pass through and exit the second prism. The second prism has a second local coordinate system having a local axis that intersects the first transmitting surface D of the second prism and is aligned with one of the local X-axis and the local Y-axis of the rotated first prism. The second prism is rotated a second predetermined angle about the local axis of the second prism. The second objective lens assembly includes: a first grouping that includes a first prism and a first achromatic doublet; and a second grouping that includes a second prism and a second achromatic doublet. The first prism of the first grouping has, in sequence of light propagation from the object, a first transmitting surface A, a reflecting surface B and a second transmitting surface C. The first transmitting surface A is operatively configured to pass light from the object to the reflecting surface B. The reflecting surface B is operatively configured to reflect the passed light towards the second transmitting surface C. The second transmitting surface C is operatively configured to allow the reflected light from the reflecting surface B to pass through and exit the first prism of the first grouping. The second prism of the second grouping has, in sequence of light propagation from the object, a first transmitting surface D, a reflecting surface E and a second transmitting surface F. The first transmitting surface D is operatively configured to pass the light exiting the first prism to the reflecting surface E. The reflecting surface E is operatively configured to reflect the passed light towards the second transmitting surface F. The second transmitting surface F is operatively configured to allow the reflected light from the reflecting surface E to pass through and exit the second prism of the second grouping.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate implementations of the invention and, together with the description, serve to explain the advantages and principles of the invention. In the drawings.

FIGS. 25A-H are ray plot diagrams depicting the residual transverse ray aberrations of the LWIR objective lens assembly in FIGS. 3-6;

FIGS. 27A-H are ray plot diagrams depicting the residual transverse ray aberrations of the VNIR objective lens assembly in FIGS. 16-18;

DESCRIPTION OF THE PREFERRED EMBODIMENT

Imaging systems and apparatus consistent with the present invention provide an objective lens assembly having two prisms operatively configured to twice fold and twice rotate an optical path through the objective lens assembly, enabling the optical path to conform to a compound surface of a helmet.

Embodiments of a LWIR objective lens assembly consistent with the present invention are described in Examples 1 through 4 below. Embodiments of a VNIR objective lens assembly consistent with the present invention are described in Examples 5 through 7.

Figure 1:
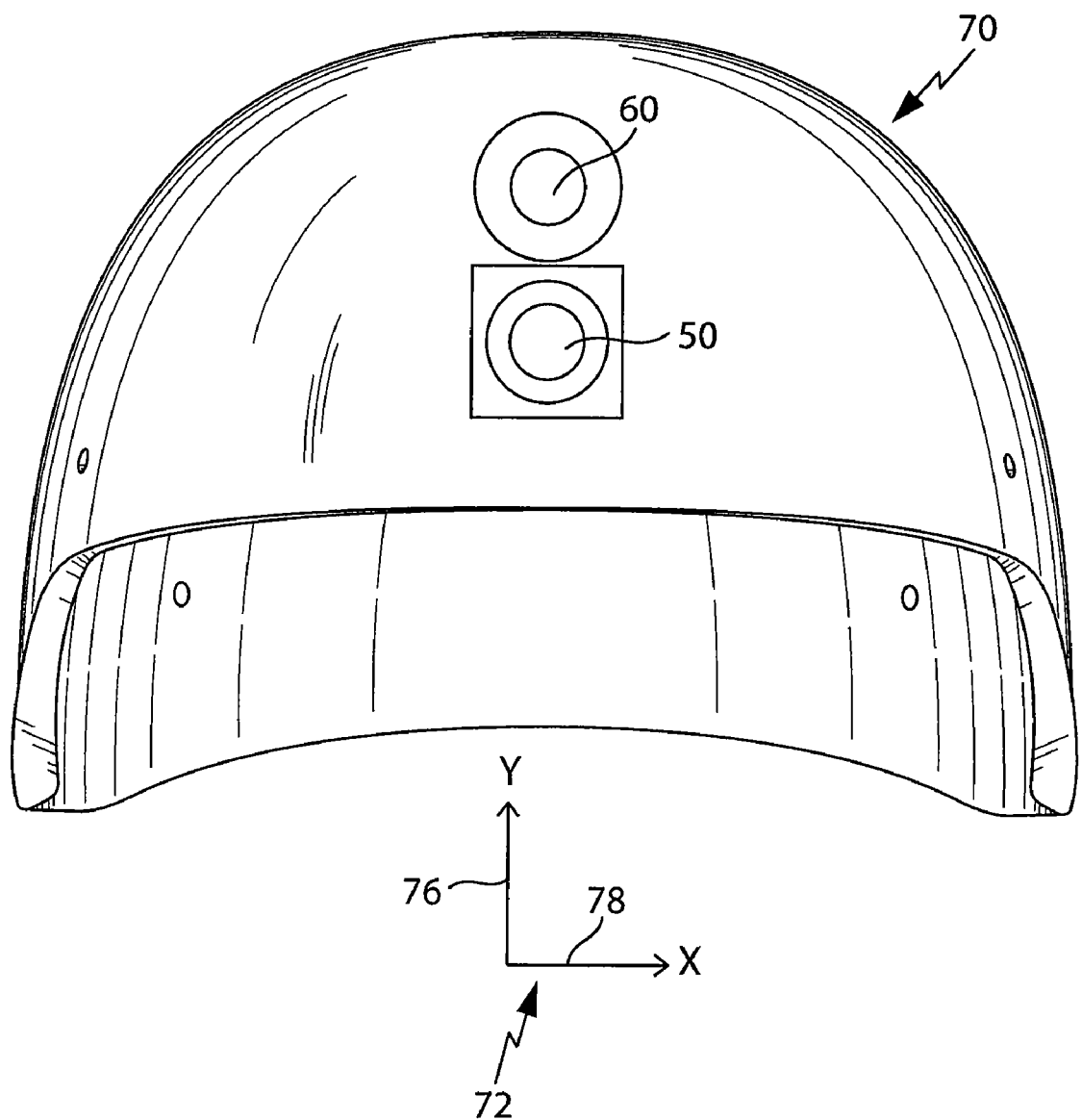
FIG. 1 is a front view of a conventional VNIR camera and a conventional LWIR camera mounted on the front of a helmet.
Figure 2:
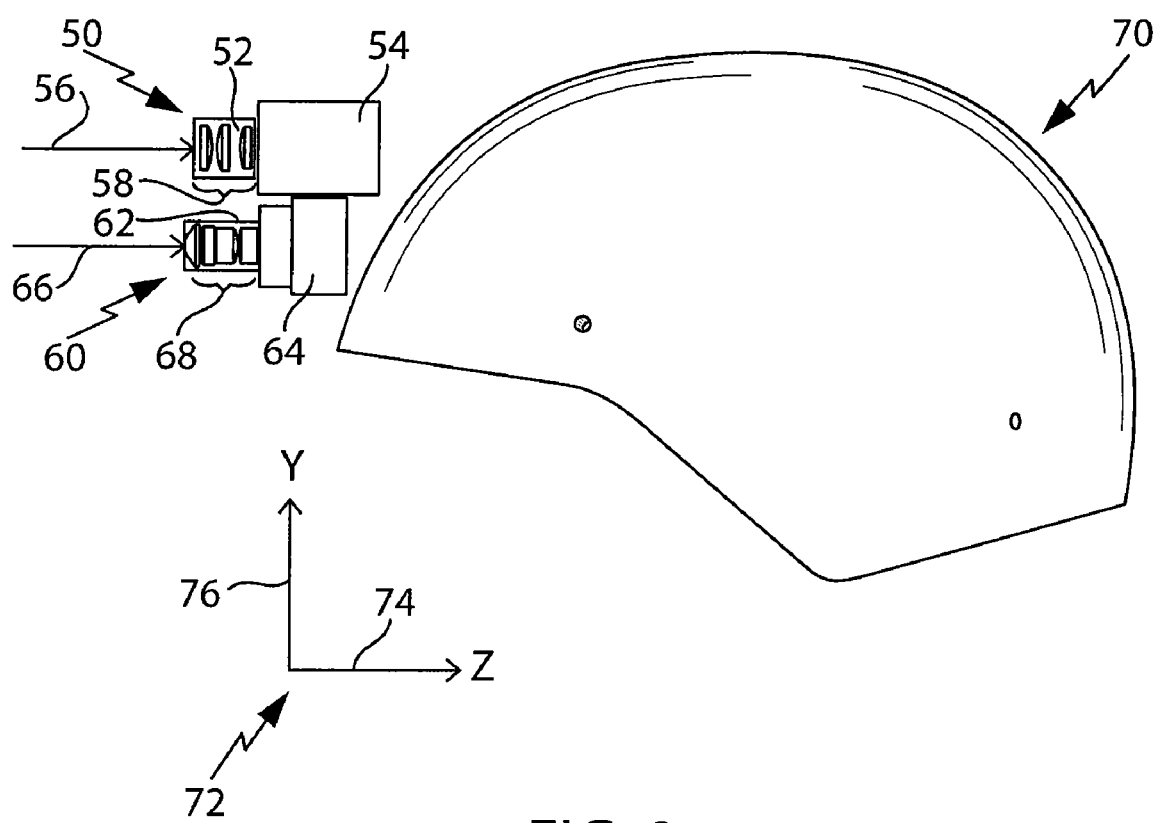
FIG. 2 is a side view of each of the conventional VNIR camera and the conventional LWIR camera as mounted on the helmet.
Figure 3:
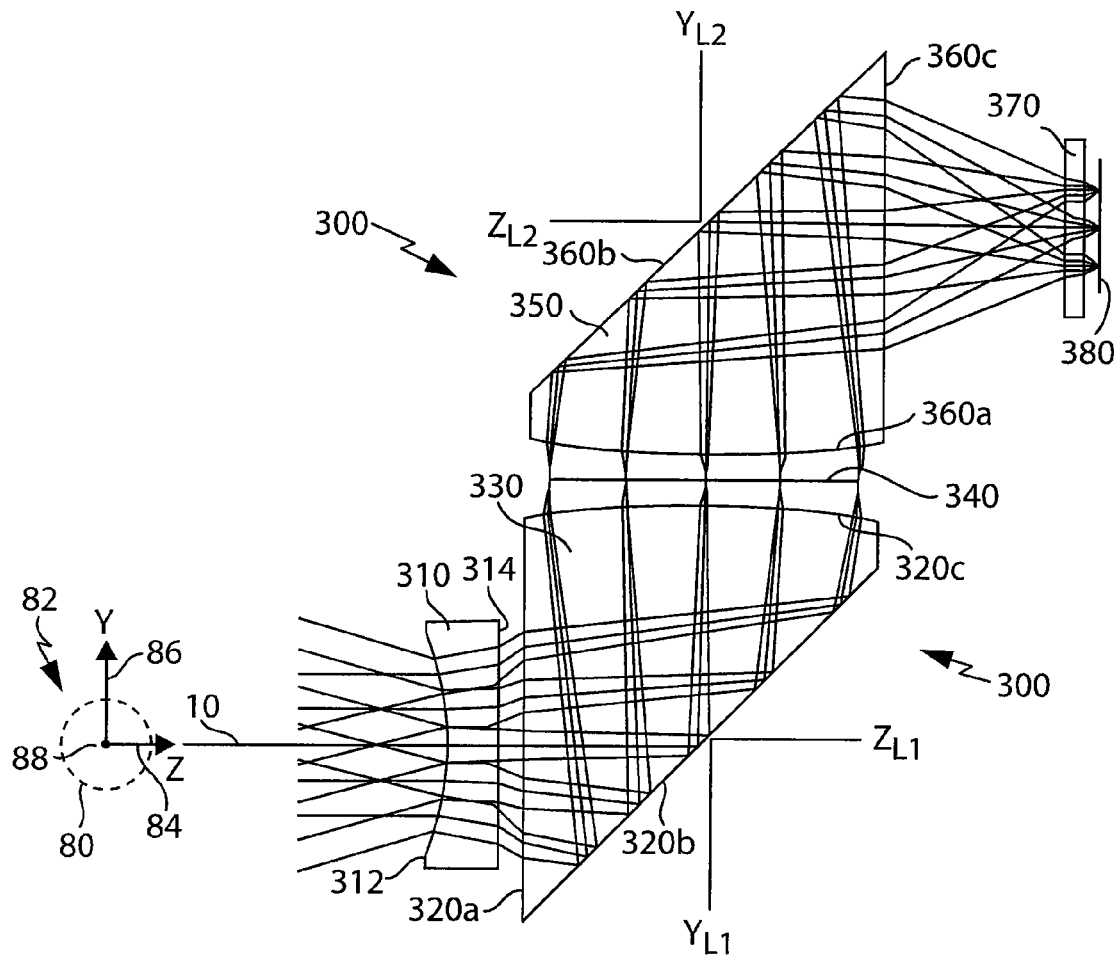
FIG. 3 is a sectional view of one embodiment of an objective lens assembly having a first prism and a second prism operatively configured for long-wave infrared imaging consistent with the present invention.

For clarity in the discussion, each objective lens assembly (e.g., assembly 300 in FIGS. 3-6) described below in accordance with the present invention is oriented in reference to an object 80 having a body coordinate system 82 as depicted in FIG. 3. The body coordinate system 82 of the object 80 (and for each objective lens assembly) has a Z-axis 84, a Y-axis 86, and a X-axis 88. An axial principal ray 10 received by each objective lens assembly of the present invention is defined as the ray emerging from the center of the object 80 that passes through the center of an aperture stop (e.g., stop 340 in FIG. 3) of the respective objective lens assembly and reaches the center of a focal plane array or an imaging plane (e.g., plane 380 in FIG. 3), which may be incorporated in an image detector and processor (e.g., detector 3202 or 3302 in FIGS. 31 and 32) for a VNIR camera 3200 or for a LWIR camera 3300. The axial principal ray 10 defines the Z-axis 84 of the body coordinate system 82 for the object 80 and the respective objective lens assembly (e.g., assembly 300). The direction in which the Z-axis 84 extends from the object 80 to a first surface of the objective lens assembly (e.g., surface 312 in FIG. 3) is defined as positive. The body coordinate system 82 follows the known right hand rule with reference to the axial principal ray 10 to define the Y-axis 86 of the object 80 and the respective objective lens assembly as being orthogonal and vertical to the Z-axis 84. The X-axis 88 is orthogonal to both the Z-axis 84 and the Y-axis 86. In FIG. 3, the positive direction of the X-axis 88 is into the page. In the various illustrations given for each embodiment or example of an objective lens assembly consistent with the present invention, the direction of light propagation is initially from left-to-right, along the positive Z-axis 84. Reflecting surfaces of the respective objective lens assembly may subsequently reverse the direction of the light propagation. Therefore, after an odd number of reflections, the Z-axis 84 will be negative.

In the embodiments described in reference to examples 1 to 7, the constituent surfaces are rotational symmetric about the Z-axis 84. As discussed below, the optical path of each objective lens assembly is folded twice by means of a first prism and a second prism, the first fold about the Y-axis 86 and the second fold about the X-axis 88. Further, each of the two prisms (e.g., 330 and 350) are each rotated about their respective local Z-axis as further described below. In the embodiments of each LWIR objective lens assembly described in Examples 1 through 4, the first prism and the second prism of each LWIR objective lens assembly are rotated counterclockwise about their respective local Z-axis (see FIG. 4) to enable the optical path of the respective LWIR objective lens assembly to conform to a surface of a helmet in a first direction. In the embodiments of each VNIR objective lens assembly described in Examples 5 through 7, the first prism and the second prism of each VNIR objective lens assembly are each rotated about their respective local Z-axis in a clockwise direction to enable the optical path of the respective VNIR objective lens assembly to conform to the surface of the helmet in a second direction different from the first direction. However, one having skill in the art will appreciate that the prisms of the LWIR objective lens assemblies may be rotated in a clockwise direction and the prisms of the VNIR objective lens assemblies may be rotated in a counterclockwise direction to enable the optical path of each of a pair of LWIR and VNIR objective lens assemblies to both conform to the surface of a helmet.

In the description of each objective lens assembly below, the terms "front" and "first" refer to those constituent parameters that are located at the proximal end portion of the respective objective lens assembly below facing the object 80. The terms "back", "rear" or "second" refer to those parameters that occupy the distal end portion of the respective objective lens assembly (e.g., facing the focal plane array (e.g., imaging plane 380 in FIG. 3)) or the camera 3200 or 3300 incorporating the respective focal plane array.

Figure 4:
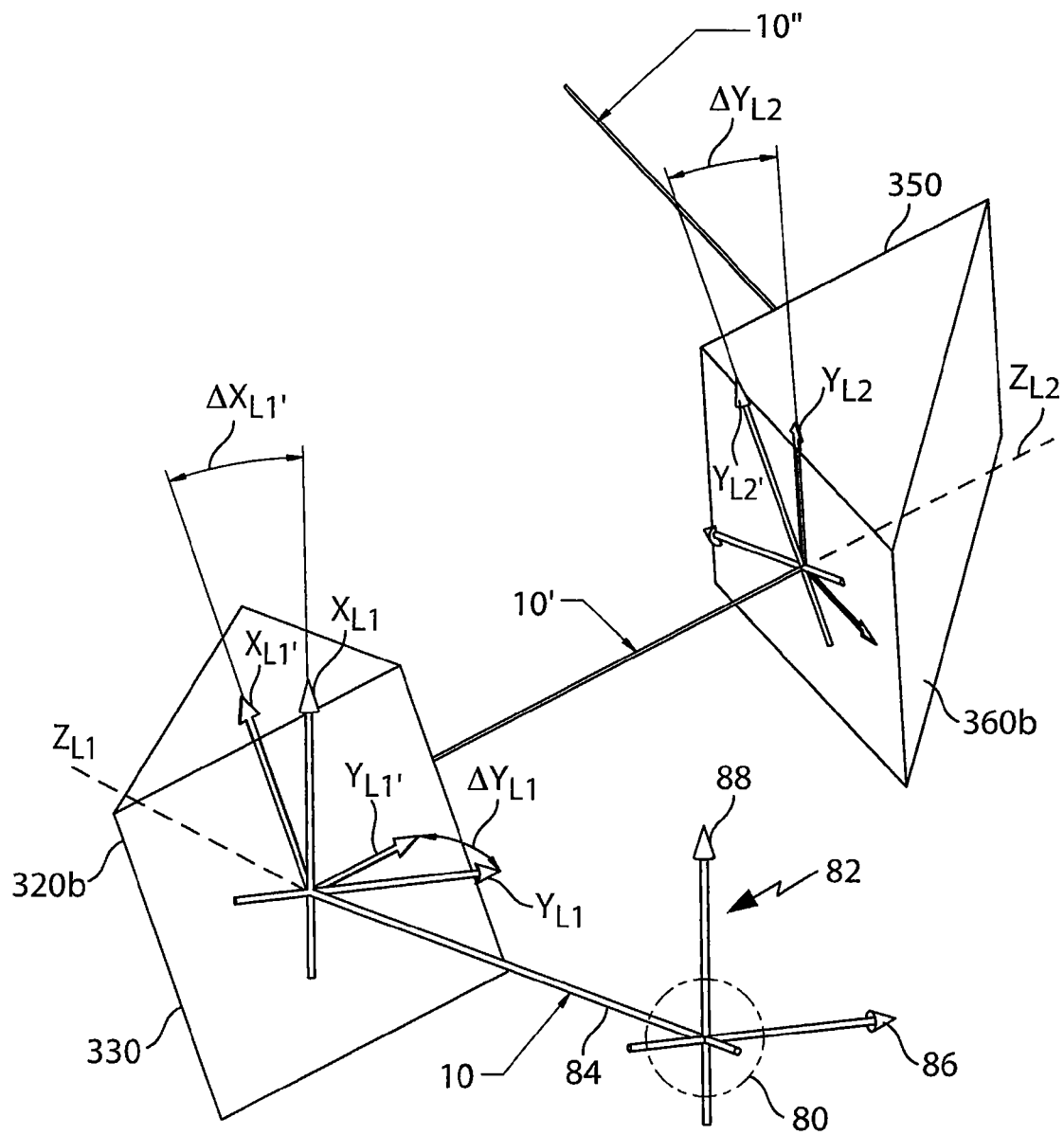
FIG. 4 is a diagram depicting a first angular (or clocking) relationship of the first prism to an object coordinate system and a second angular (or clocking) relationship of the second prism to the first prism in accordance with the present invention.

Whereas each objective lens assembly described in the following examples is a progression of surfaces whose central axis (e.g., see 10' in FIG. 4) is free to navigate in any direction in the coordinate system 80, each objective lens assembly depicted in FIGS. 3, 7, 10, 13A, 13B, 16, 19, and 22 is shown, for purposes of explanation, as a sectional view taken along the YZ-plane of the respective objective lens assembly before either of the two prisms are rotated in accordance with the present invention. For example, as shown in FIGS. 3 and 4, the local $Z_{L1}$ axis, $Y_{L1}$ axis and $Z_{L1}$ axis of the first prism 330 are aligned with the object or body coordinate axes 82, 84, and 86. In the implementation shown in FIG. 3, the local $Z_{L2}$ axis, $Y_{L2}$ axis and $X_{L2}$ axis of the second prism 330 are inversely aligned with the object or body coordinate axes 82, 84, and 86. Each objective lens assembly is shown in subsequent perspective diagrams (e.g., FIGS. 5-6 for objective lens assembly 300) after the first prism and the second prism of the respective objective lens assembly have each been rotated about their respective local Z-axis in accordance with the present invention such that the optical path is folded twice to minimize the optical path and to cause an object image received by the objective lens assembly to be transferred to an imaging plane in axial alignment with the object coordinate system.

EXAMPLE 1

As discussed above, FIG. 3 depicts a sectional view of one embodiment of an objective lens assembly 300 operatively configured for long-wave infrared imaging consistent with the present invention. As shown in FIG. 3, the sectional view is taken along a YZ plane of the objective lens assembly 300 having a body coordinate system aligned with the coordinate axes 82 of the object 80. The objective lens assembly 300 has, in sequence of light propagation from the object 80, a negative (or diverging) power field lens 310 having a first surface 312 and a second surface 314, a first right angle prism with positive (or converging) power 330, an aperture stop 340, and a second positive power right angle prism 350. As shown in FIG. 3, the second prism 350 is aligned with a plane parallel plate 370, which represents the window of a micro-bolometer camera (e.g., LWIR camera 3300 in FIG. 31), and an image or focal plane array 380 of the micro-bolometer camera that receives an image transferred by the second prism 350. The plane parallel plate 370 and the focal plane array 380 may be incorporated into the objective lens assembly 300.

The first prism 330 comprises a first transmitting surface (A) 320a, a reflecting surface (B) 320b and a second transmitting surface (C) 320c. Light rays from the object 80 are transmitted through field lens 310, pass through the first transmitting surface 320a and are internally reflected or folded (approximately 90°) at the reflecting surface 320b towards the second transmitting surface 320c. The reflected rays then pass through the second transmitting surface 320c to the aperture stop 340. The second prism 350 comprises a first transmitting surface (D) 360a, a reflecting surface (E) 360b and a second transmitting surface (F) 360c. Light rays propagating from the aperture stop 340 passes through the first transmitting surface 360a and are internally reflected or folded (approximately 90°) by the reflecting surface 360b of the second prism 350. The reflected light from the reflecting surface 360b then passes through the second transmitting surface 360c of the second prism 350 and through the plane parallel plate 370 to form an image of the object 80 in the focal plane array 380. The first surface 312 of lens 310, the second transmitting surface 320c of the first prism 330 and the first transmitting surface 360a of the second prism 350 are rotationally symmetric polynomial aspheric surfaces. The second surface 312 of lens 310, the first transmitting surface 320a of the first prism 330, the reflecting surface 320b of the first prism 330, the reflecting surface 360b of the second prism 350 and the second transmitting surface 360c of the second prism 350 are planar surfaces.

As depicted in FIG. 4, each of the two prisms 330 and 350 of the objective lens assembly 300 has respective local axes (e.g., $Z_{L1}$ axis, $Y_{L1}$, axis and $X_{L1}$ axis of the first prism 330 and $Z_{L2}$ axis, $Y_{L2}$, axis and $X_{L2}$ axis of the second prism 350) where the Z axis of each prism is axially aligned along the optical path (10, 10', and 10" in FIG. 4) of the lens objective assembly 300. In FIG. 4, the aperture stop 340, the plate 370 and the focal plane array 380 are not shown and each of the surfaces of the first prism 330 and the second prisms are shown in planar form for clarity in the discussion of the angular rotation of the two prisms 330 and 350. In accordance with the present invention, the first prism 330 is rotated a first predetermined angle (e.g., $\Delta X_{L1}$ in FIG. 4) about its local $Z_{L1}$ axis such that the first prism 330 has a new angular or clocking position ($Z_{L1}$ axis, $Y_{L1}$, axis and $X_{L1}$ axis) relative to the object 80 coordinate system 82. After the first prism 330 is rotated, the coordinate axes ($Z_{L2}$ axis, $Y_{L2}$ axis and $X_{L2}$) of the second prism 350 are aligned with the rotated coordinate axes ($Z_{L1}$ axis, $Y_{L1}$, axis and $X_{L1}$ axis) of the first prism 330. The second prism 350 is rotated a second predetermined angle (e.g., $\Delta Y_{L2}$ in FIG. 4) about its local $Z_{L2}$ axis such that the second prism 350 has a new angular or clocking position ($Z_{L2}$ axis, $Y_{L2}$, axis and $X_{L2}$,) relative to the rotated first prism 330. The first and second predetermined angles $\Delta X_{L1}$ and $\Delta Y_{L2}$ allow light rays from the object 80 to be folded twice by the two prisms 330 and 350 such that the object image transferred from the objective lens assembly 300 to the focal plane array 380 is axially aligned with the object or body coordinate axes 82, 84, and 86. Accordingly, an object image transferred by the objective lens assembly 300 to the focal plane array 380 does not require processing by the camera 3300 to correct for a rotational or clocking difference between the object image as transferred to the focal plane array 380 and the actual object 80.

Figure 5:
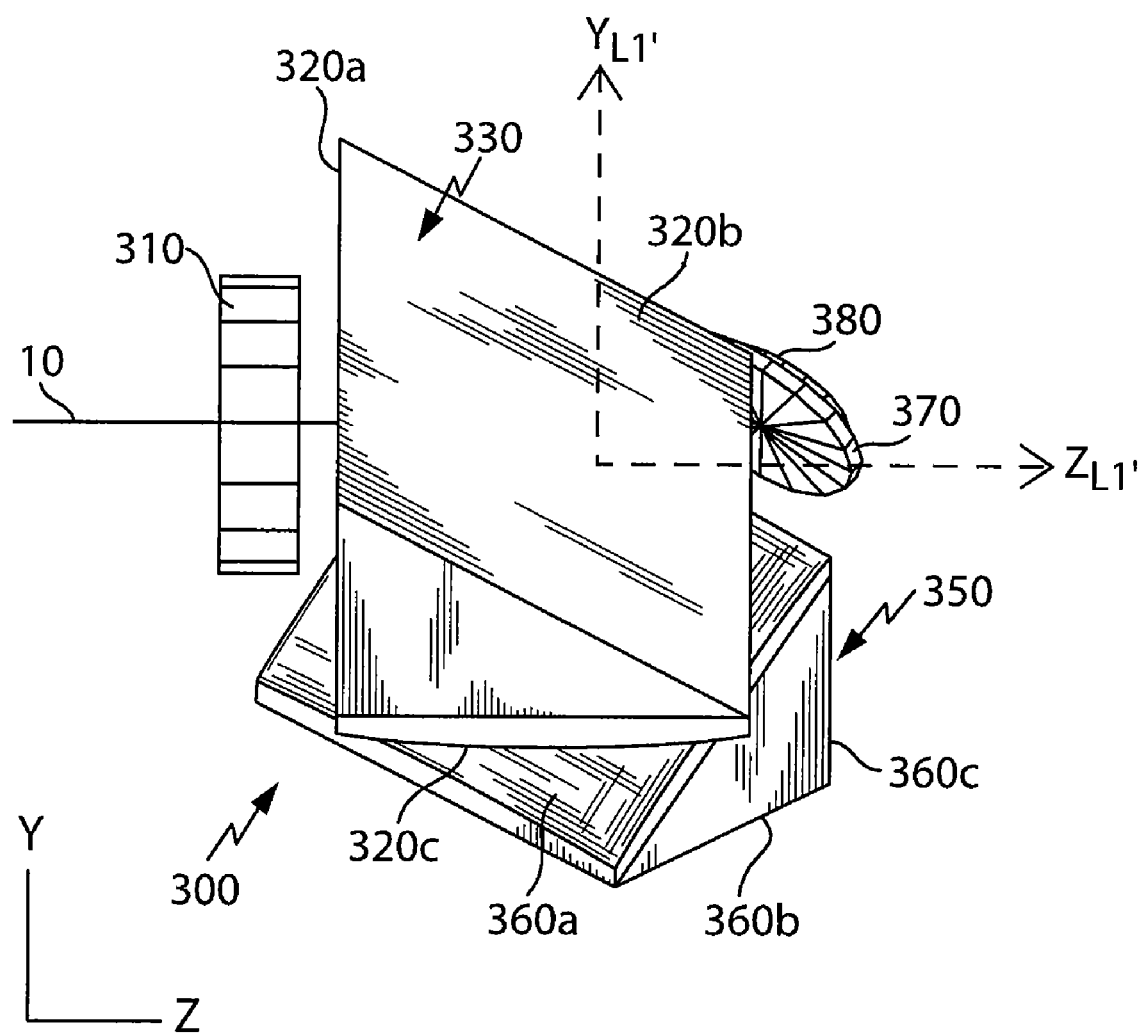
FIG. 5 is a perspective side view of the objective lens assembly of FIG. 3 after the first prism and the second prism have each been rotated about their respective local z-axis in accordance with the present invention.
Figure 6:
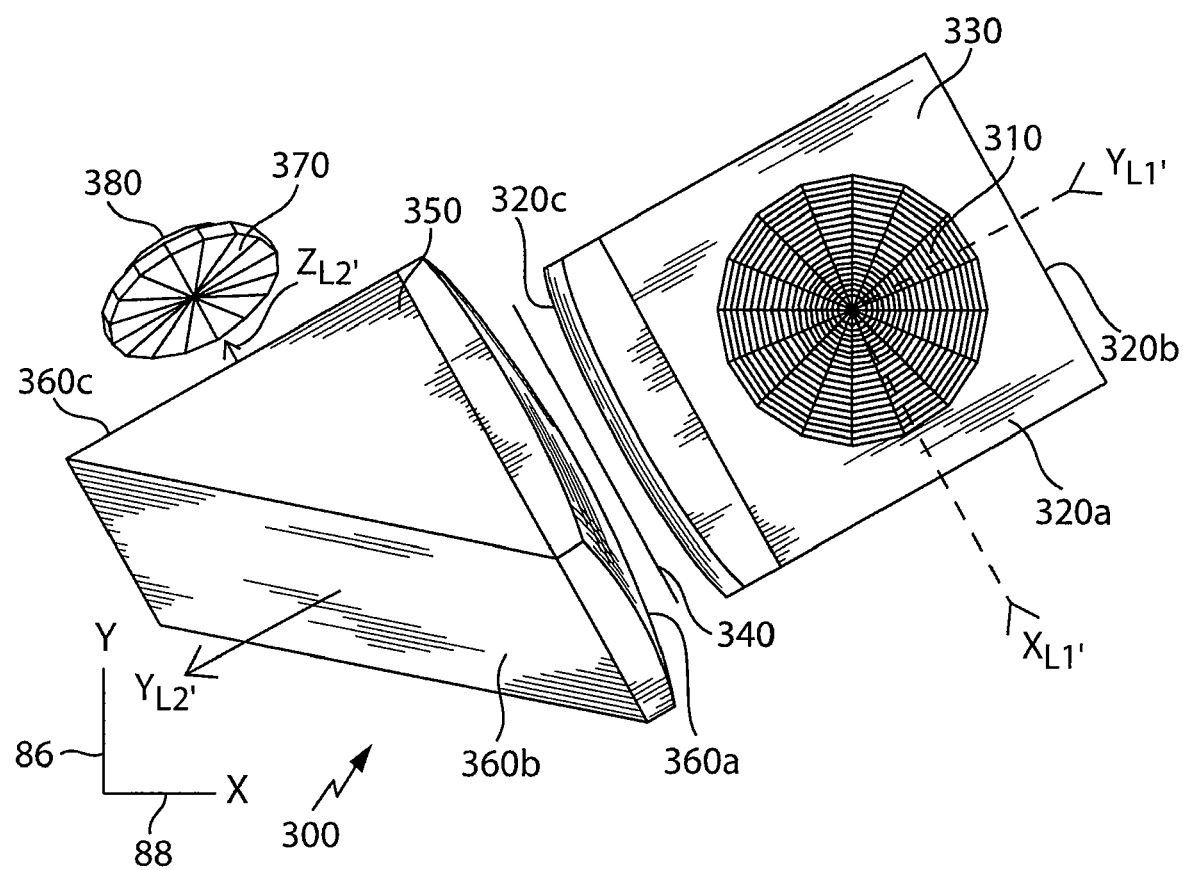
FIG. 6 is a perspective front view of the objective lens assembly of FIG. 3 after the first prism and the second prism have each been rotated about their respective local z-axis as shown in FIG. 5.

FIG. 5 is a perspective side view and FIG. 6 is a perspective front view of the objective lens assembly 300 after the first prism and the second prism have each been rotated about their respective local Z-axis. In FIG. 5, the X-axis 88 of the objective lens assembly is oriented into the plane of the diagram. In FIG. 6, the Z-axis 84 of the objective lens assembly is oriented into the plane of the diagram. In the implementation shown in FIGS. 5 and 6, the reflecting surface 320b of the first prism 30 is rotated counterclockwise at a first predetermined angle of approximately 45° about its local $Z_{L1}$ axis to reflect light rays from the object 80 at a corresponding angle (e.g., 45°) from the X-axis 88 of the object 80 or the lens assembly 300. After aligning the local coordinate axes ($Z_{L2}$ axis, $Y_{L2}$ axis and $X_{L2}$) of the second prism 350 with the rotated coordinate axes ($Z_{L1}$ axis, $Y_{L1'}$ axis and $X_{L1}$) of the first prism 330, the reflecting surface 360b of the second prism 350 is rotated counterclockwise at a first predetermined angle of approximately 45° about its local $Z_{L2}$ axis to reflect light rays from the second transmitting surface 320c of the first prism 330 at a corresponding angle (e.g., 45°) from the Y-axis 86 of the object 80 of the lens assembly 300. The 45° counterclockwise rotations of the two prisms 330 and 350 about their Z-axes, as shown in FIGS. 4-6, are not drawn to scale to provide clarity in the description and to avoid obscuring aspects of the invention.

EXAMPLE 2

Figure 7:
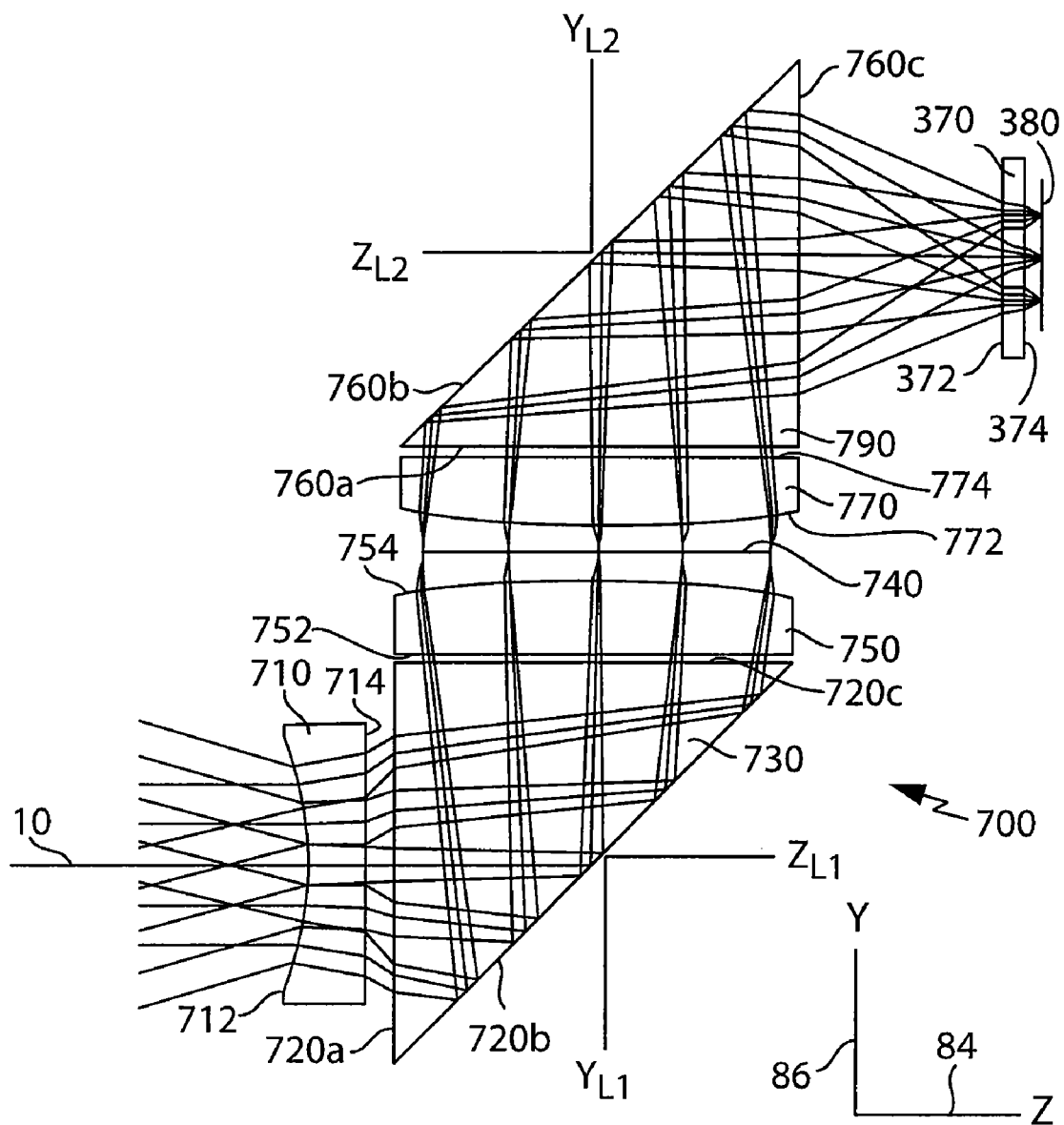
FIG. 7 is a sectional view of a second embodiment of an objective lens assembly having a first prism and a second prism operatively configured for long-wave infrared imaging consistent with the present invention.

FIG. 7 depicts a sectional view of a second embodiment of an objective lens assembly 700 operatively configured for long-wave infrared imaging consistent with the present invention. As shown in FIG. 7, the sectional view is taken along a YZ plane of the objective lens assembly 700 having a body coordinate system aligned with the coordinate axes 82 of the object 80. The objective lens assembly 700 comprises a negative (or diverging) power field lens 710 having a first surface 712 and a second surface 714, a first right angle prism 730, a second positive (or converging) power lens 750 having a first transmitting surface 752 and a second transmitting surface 754, an aperture stop 740, a third positive (or converging) power lens 770 having a first transmitting surface 772 and a second transmitting surface 774, and a second right angle prism 790. The second prism 790 is aligned with a plane parallel plate or window 370, which represents the window of a micro-bolometer camera (e.g., LWIR camera 3300 in FIG. 31), and an image or focal plane array 380 of the micro-bolometer camera that receives an image transferred by the second prism 790. The plane parallel plate 370 and the focal plane array 380 may be incorporated into the objective lens assembly 700.

The first prism 730 comprises a first transmitting surface (A) 720a, a reflecting surface (B) 720b and a second transmitting surface (C) 720c. The second prism 790 comprises a first transmitting surface (D) 760a, a reflecting surface (E) 760b and a second transmitting surface (F) 760c. Light rays from the object pass through the field lens 710, enter the first transmitting surface 720a of the first prism 730 and are internally reflected or folded (approximately 90°) by the reflecting surface 720b towards the second transmitting surface 720c. The reflected light from the reflecting surface 720b passes through the second transmitting surface 720c and then through lens 750 where they are collected in the aperture stop 740. The light rays propagating from the aperture stop 740 then pass through the lens 770 and the first transmitting surface 760a of the second prism 790. The light rays propagating from the first transmitting surface 760a are then internally reflected or folded (approximately 90°) by the reflecting surface 760b towards the second transmitting surface 760c of the second prism 790. The light rays reflected from the reflecting surface 760b are then transmitted through the second transmitting surface 760c of the second prism 790 and the window 370, coming to focus on the focal plane array 380. The first transmitting surface 712 of the field lens 710, the second transmitting surface 754 of lens 750, and the first transmitting surface 772 of lens 770 are rotationally symmetric aspheric surfaces. The second surface 714 of the field lens 710 is a planar surface. The first transmitting surface 720a, the reflecting surface 720b, and the second transmitting surface 720c of the first prism 730 also are each a planar surface. Similarly, the second transmitting surface of lens 770 as well as the first transmitting surface 760a, the reflecting surface 760b and the second transmitting surface 760c of the second prism 790 are each a planar surface. In this implementation, the window 370 has first and second transmitting surfaces 372 and 374 that are each a planar surface.

Figure 8:
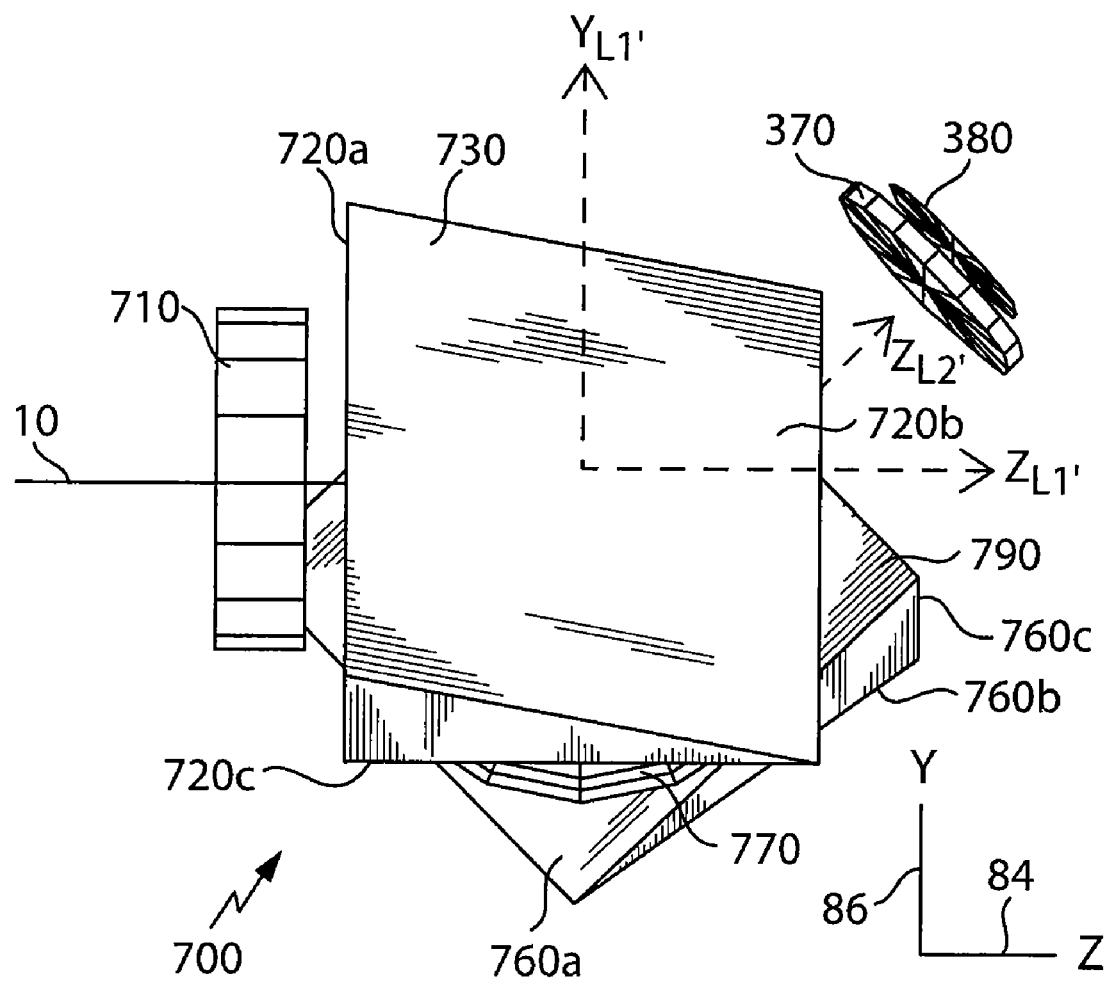
FIG. 8 is a perspective side view of the objective lens assembly of FIG. 7 after the first prism and the second prism have each been rotated about their respective local z-axis in accordance with the present invention.
Figure 9:
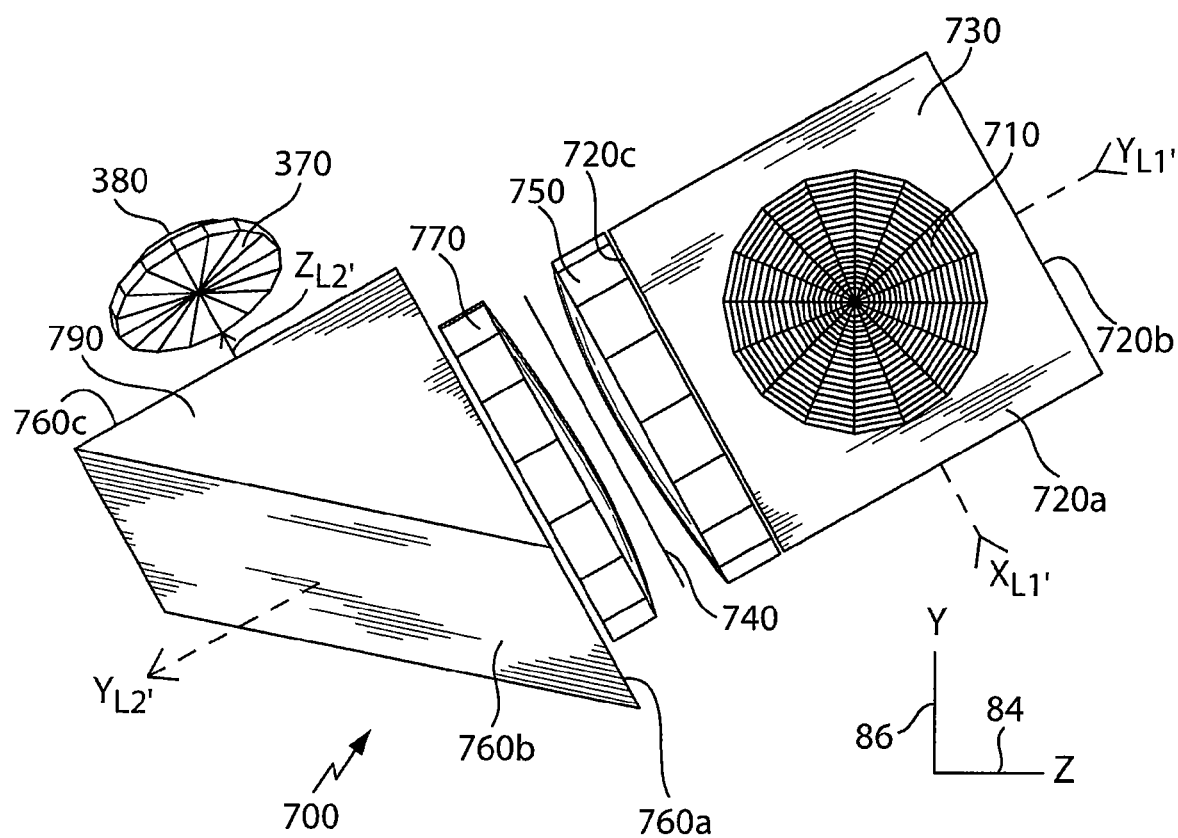
FIG. 9 is a perspective front view of the objective lens assembly of FIG. 7 after the first prism and the second prism have each been rotated about their respective local z-axis as shown in FIG. 8.

FIG. 8 is a perspective side view and FIG. 9 is a perspective front view of the objective lens assembly 700 after the first prism 730 and the second prism 790 have each been rotated about their respective local Z-axis similar to the objective lens assembly 300 as described above in reference to FIGS. 5-6. In FIG. 8, the X-axis 88 of the objective lens assembly is oriented into the plane of the diagram. In FIG. 9, the Z-axis 84 of the objective lens assembly is oriented into the plane of the diagram. In the implementation shown in FIGS. 8 and 9, the reflecting surface 720b of the first prism 730 is rotated counterclockwise at a first predetermined angle of approximately 45° about its local $Z_{L1}$ axis to reflect light rays from the object 80 at a corresponding angle (e.g., 45°) from the X-axis 88 of the object 80 or the objective lens assembly 700. After aligning the local coordinate axes ($Z_{L2}$ axis, $Y_{L2}$ axis and $X_{L2}$) of the second prism 790 with the rotated coordinate axes ($Z_{L1}$ axis, $Y_{L1'}$ axis and $X_{L1}$ axis) of the first prism 730, the reflecting surface 760b of the second prism 790 is rotated counterclockwise at a first predetermined angle of approximately 45° about its local $Z_{L2}$ axis to reflect light rays from the second transmitting surface 720c of the first prism 730 at a corresponding angle (e.g., 45°) from the Y-axis 86 of the object 80 of the lens assembly 700. The 45° counterclockwise rotations of the two prisms 730 and 790 about their Z-axes, as shown in FIGS. 8-9, are not drawn to scale to provide clarity in the description and to avoid obscuring aspects of the invention.

EXAMPLE 3

Figure 10:
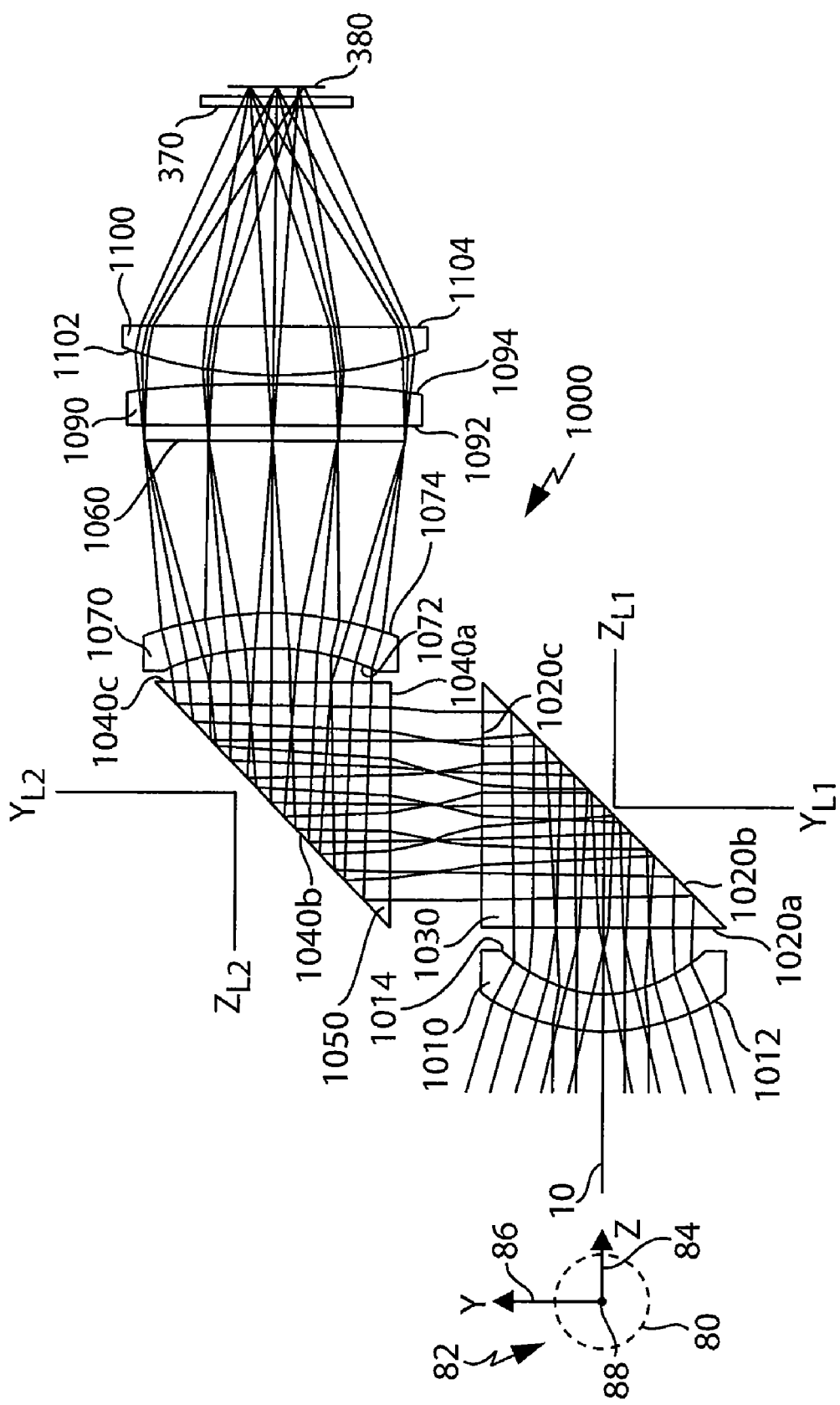
FIG. 10 is a sectional view of a third embodiment of an objective lens assembly having a first prism and a second prism operatively configured for long-wave infrared imaging consistent with the present invention.

FIG. 10 depicts a sectional view of a third embodiment of an objective lens assembly 1000 operatively configured for long-wave infrared imaging consistent with the present invention. As shown in FIG. 10, the sectional view is taken along a YZ plane of the objective lens assembly 1100 having a body coordinate system aligned with the coordinate axes 82 of the object 80. The objective lens assembly 1000 comprises, in the order in which light rays from the object propagate through the lens assembly 1000, a negative (or diverging) power meniscus lens 1010 having a first surface 1012 and a second surface 1014, a first right angle prism 1030, a second right angle prism 1050, a second negative power meniscus lens 1070 having a first surface 1072 and a second surface 1074, an aperture stop 1060, and two positive power lenses 1090 and 1100. In the implementation shown in FIGS. 10-12, the first 1090 of the two power lenses 1090 and 1100 has a front planar surface 1092 and a rear convex surface 1094. The second 1100 of the two power lenses has a front convex surface 1102 and a rear surface 1104 that may be spherical or planar. The second prism 1050 is aligned along its local $Z_{L2}$ axis with the power meniscus lens 1070, the two positive power lens 1090 and 1100, a plane parallel plate or window 370, which represents the window of a micro-bolometer camera (e.g., LWIR camera 3300 in FIG. 31), and an image or focal plane array 380 of the micro-bolometer camera that receives an image transferred by the power lens 1100. The plane parallel plate 370 and the focal plane array 380 may be incorporated into the lens objective assembly 1000.

The first prism 1030 comprises a first transmitting surface (A) 1020a, a reflecting surface (B) 1020b and a second transmitting surface (C) 1020c. The second prism 1090 comprises a first transmitting surface (D) 1040a, a reflecting surface (E) 1040b and a second transmitting surface (F) 1040c. In the implementation shown in FIGS. 10-12, light rays from the object 80 pass through the lens 1010, enter the first transmitting surface 1020a of prism 1030, and are reflected or folded (approximately 90°) by the reflecting surface 1020b towards the second transmitting surface 1020c. The reflected light rays are subsequently transmitted through the second transmitting surface 1020c and enter the first transmitting surface 1040a of the second prism 1050. The light rays next propagate to the second reflecting surface 1040b of prism 1050 where they are reflected or folded (approximately 90°) towards the second transmitting surface 1040c. This reflected light is then transmitted through the second transmitting surface 1040c of the second prism 1050, the lens 1070 and onto the aperture stop 1060. Light rays then propagate from the aperture stop 1060 through both lenses 1090 and 1100 and the window 370 onto the focal plane array 380. In one implementation, the surfaces 1012 and 1014 of lens 1010, the surfaces 1072 and 1074 of lens 1070, the rear surface of lens 1090 and both surfaces of lens 1100 are spherical. In this implementation, the first transmitting surface 1020a, the reflecting surface 1020b, and the second transmitting surface 1020c of the prism 1030 as well as the first transmitting surface 1040a, the reflecting surface 1040b, and the second transmitting surface 1040c of the prism 1050 are planar surfaces. The rear surface of lens 1070 is a rotationally symmetric aspheric or convex. The front surface of lens 1070 is an asphero-diffractive or concave surface.

Figure 11:
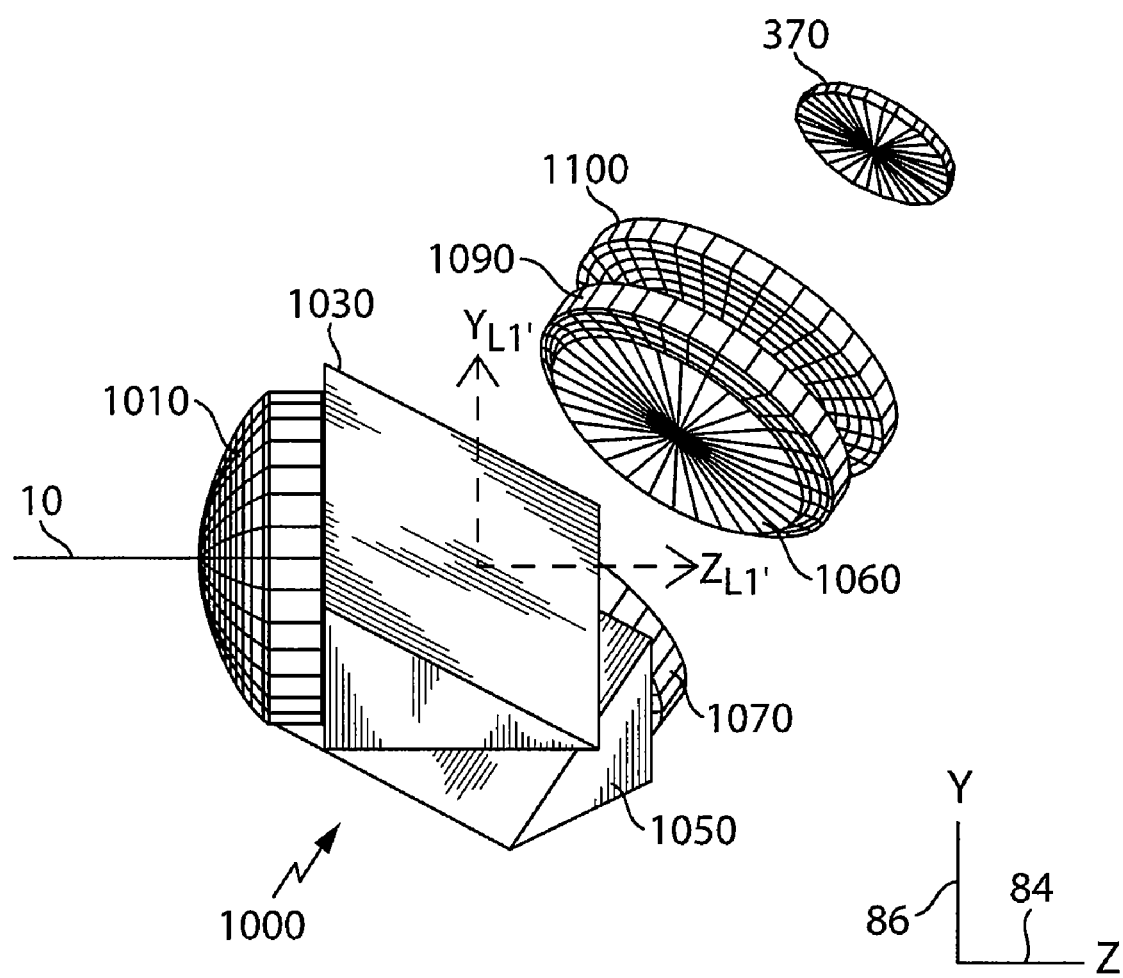
FIG. 11 is a perspective side view of the objective lens assembly of FIG. 10 after the first prism and the second prism have each been rotated about their respective local z-axis in accordance with the present invention.
Figure 12:
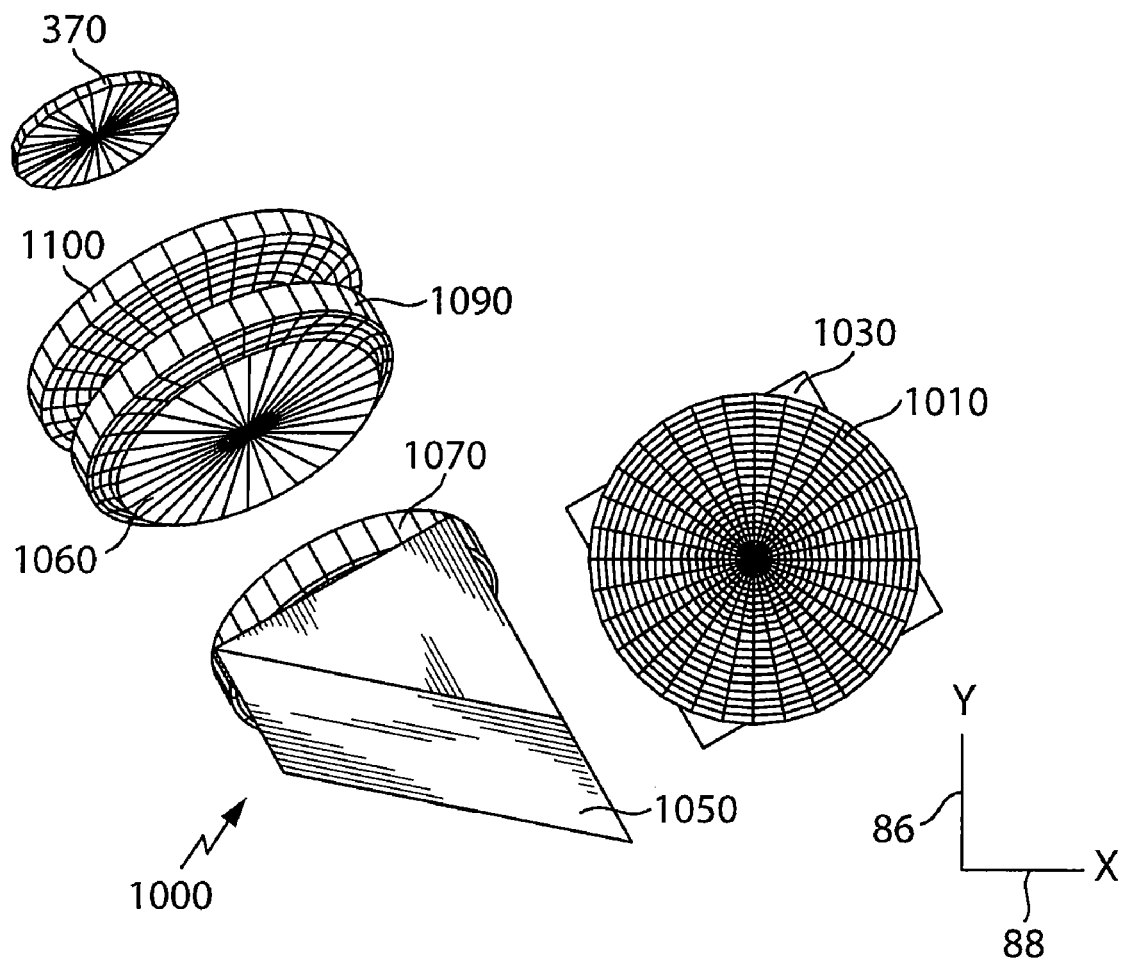
FIG. 12 is a perspective front view of the objective lens assembly of FIG. 10 after the first prism and the second prism have each been rotated about their respective local z-axis as shown in FIG. 11.

FIG. 11 is a perspective side view and FIG. 12 is a perspective front view of the objective lens assembly 1000 after the first prism 1030 and the second prism 1050 have each been rotated about their respective local Z-axis similar to the objective lens assembly 300 as described above in reference to FIGS. 5-6. In FIG. 11, the X-axis 88 of the objective lens assembly is oriented into the plane of the diagram. In FIG. 12, the Z-axis 84 of the objective lens assembly is oriented into the plane of the diagram. In the implementation shown in FIGS. 11 and 12, the reflecting surface 1020b of the first prism 1030 is rotated counterclockwise at a first predetermined angle of approximately 45° about its local $Z_{L1}$ axis to reflect light rays from the object 80 at a corresponding angle (e.g., 45°) from the X-axis 88 of the object 80 or the lens assembly 1000. After aligning the local coordinate axes ($Z_{L2}$ axis, $Y_{L2}$ axis and $X_{L2}$ axis) of the second prism 1050 with the rotated coordinate axes ($Z_{L1}$ axis, $Y_{L1}$ axis and $X_{L1}$ axis) of the first prism 1030, the reflecting surface 1040b of the second prism 1050 is rotated counterclockwise at a first predetermined angle of approximately 45° about its local $Z_{L2}$ axis to reflect light rays from the second transmitting surface 1020c of the first prism 1030 at a corresponding angle (e.g., 45°) from the Y-axis 86 of the object 80 of the lens assembly 1000. The 45° counterclockwise rotations of the two prisms 1030 and 1050 about their respective local Z-axis (i.e., $Z_{L1}$ axis and $Z_{L2}$ axis), as shown in FIGS. 11-12, are not drawn to scale to provide clarity in the description and to avoid obscuring aspects of the invention.

EXAMPLE 4

Figure 13A:
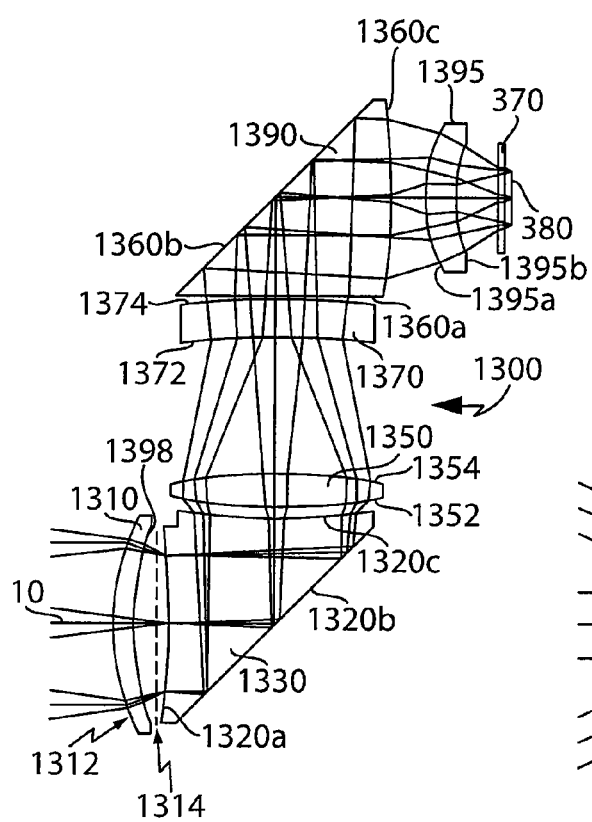
FIGS. 13A-B depict a long-wave infrared dual field-of-view objective lens assembly having a first prism, a second prism disposed relative to the first prism, and a positive power lens adapted to be selectively moved between the first and the second prisms.
Figure 13B:
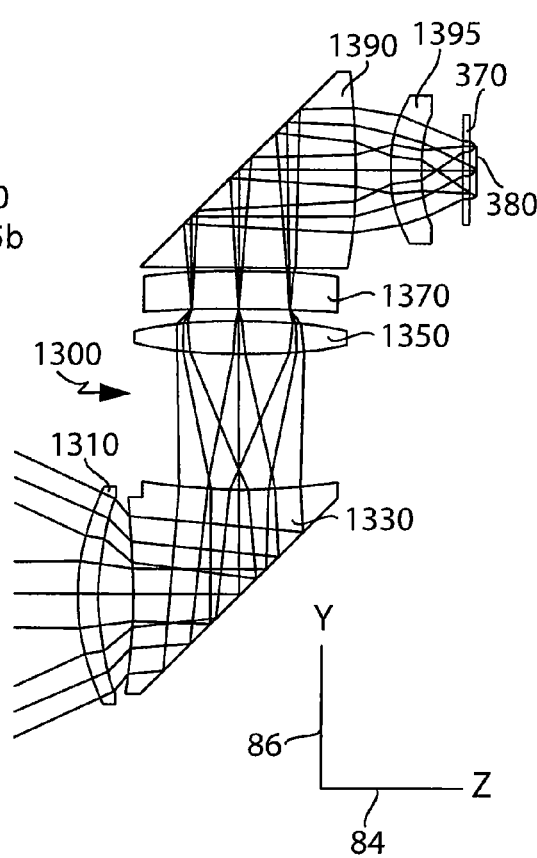

To improve the probability of detecting a human object at great object distances, such as, for example, in excess of 300 meters, the field-of-view of an LWIR objective lens assembly may be reduced to increase the spatial resolution of the LWIR objective. Optical systems and assemblies consistent with the present invention provide a dual field-of-view objective lens assembly 1300 as shown in FIGS. 13A and 13B that is operatively configured to provide both far and near infrared image detection. The objective lens assembly 1300 includes a first negative power right angle prism 1330, a second positive power right angle prism 1390 disposed relative to the first prism 1330, and a positive power lens 1350 adapted to be selectively moved between the first and the second prisms 1330 and 1390. In the implementation shown in FIGS. 13A-B, the objective lens assembly 1300 comprises, in the sequence of light ray propagation, a positive power lens 1310, the first negative power right angle prism 1330, the positive power lens 1350, a negative power lens 1370, and the second positive power right angle prism 1390, and a positive power lens 1395. The second prism 1350 is aligned along its local $Z_{L2}$ axis with the positive power lens 1395, a plane parallel plate or window 370, which represents the window of a micro-bolometer camera (e.g., LWIR camera 3300 in FIG. 31), and an image or focal plane array 380 of the micro-bolometer camera that receives an image transferred by the positive power lens 1395. The plane parallel plate 370 and the focal plane array 380 may be incorporated into the objective lens assembly 1300.

The first prism 1330 comprises a first transmitting surface (A) 1320a, a reflecting surface (B) 1320b and a second transmitting surface (C) 1320c. The second prism 1390 comprises a first transmitting surface (D) 1360a, a reflecting surface (E) 1360b and a second transmitting surface (F) 1360c. Light rays from the object 80 are transmitted by lens 1310 towards the first transmitting surface 1320a of the first prism 1330. Light rays entering the first transmitting surface 1320a of the first prism 1330 are transmitted towards and internally reflected or folded (approximately 90°) by the reflecting surface 1320b of the first prism 1330. The reflected light rays are then transmitted through the second transmitting surface 1320b, the lens 1350 and the lens 1370 towards the first transmitting surface 1360a of the second prism 1390. Light rays entering the first transmitting surface 1360a of the second prism 1390 are reflected or folded (approximately 90°) by the reflecting surface 1360b towards the second reflecting surface 1360c of the second prism 1390. The reflected light passing through the second transmitting surface 1360c of the second prism 1390 propagates through the lens 1395 and window 370 to the focal plane array 380.

In the implementation shown in FIGS. 13A-B, the positive power lens 1350 functions as a focusing lens and is adapted to selectively move along its center axis (e.g., Y-axis 86 of the objective lens assembly 1300) between the second transmitting surface 1320c of the first prism 1330 and the lens 1370 disposed in proximity to the first transmitting surface 1360a of the second prism 1390 to change a focal length of the objective lens assembly 1300 from its longest focal setting (or narrow-angle view position) as shown in FIG. 13A to its shortest focal setting (or wide-angle view position) as shown in FIG. 13B. Each lens and prism of the objective lens assembly 1300 may be constructed of a single material having infrared transmitting properties. An aperture stop 1398 may be disposed in proximity to the first transmitting surface 1320a of the first prism 1330 in the narrow-angle view position such that the aperture stop 1398 is operatively configured to determine a diameter of a cone of energy (from object 80 light rays) that the dual-field of view objective lens assembly 1300 may accept. In one implementation, the aperture stop 1398 is adapted to move with the focusing lens 1350. Accordingly, the relocation of the aperture stop 1398 allows an entrance pupil (not shown in FIGS. 13A-13B) to remain unvignetted from one focal setting to another. As a result, a f-number of the objective lens assembly 1300 may vary from the narrow-angle to wide-angle focal setting. In the implementation shown in FIGS. 13A-B, the f-number changes from approximately 1.0 to 1.2 as the focusing lens 1350 moves from the second transmitting surface 1320c of the first prism 1330 to the negative power lens 1370. Although the dual field-of-view objective lens assembly 1300 is shown in FIGS. 13A and 13B corrected for two focal settings via lens 1350 motion, by the addition of means for independent movement of lens 1370, objective lens assembly 1300 may be operatively configured as a zoom lens corrected for continuous focus from the narrow-angle setting to the wide-angle focal setting.

In one implementation, the lens 1310 and the lens 1395 are each a positive power meniscus lens. The lens 1310 has front and rear surfaces 1312 and 1314 each of which is spherical. Similarly, the lens 1395 has front and rear surfaces 1395a and 1395b, each of which is spherical. Each front surface 1312 and 1395a may be a convex surface and each rear surface 1314 and 1395b may be a concave surface. The first transmitting surface 1320a and the second transmitting surface 1320c of the first prism 1330 as well as the front surface of the lens 1370 may each be an aspheric-diffractive or concave surface. The second transmitting surface 1360c of the first prism 1330, the front and rear surfaces 1352 and 1354 of the lens 1350, and the rear surface 1374 of the lens 1370 may each be rotationally symmetric aspheric or convex. The first transmitting surface 1360a of the second prism 1390 may be a planar surface.

FIG. 11 is a perspective side view and FIG. 12 is a perspective front view of the objective lens assembly 1000 after the first prism 1030 and the second prism 1050 have each been rotated about their respective local Z-axis similar to the objective lens assembly 300 as described above in reference to FIGS. 5-6. In FIG. 11, the X-axis 88 of the objective lens assembly is oriented into the plane of the diagram. In FIG. 12, the Z-axis 84 of the objective lens assembly is oriented into the plane of the diagram. In the implementation shown in FIGS. 11 and 12, the reflecting surface 1020b of the first prism 1030 is rotated counterclockwise at a first predetermined angle of approximately 45° about its local $Z_{L1}$ axis to reflect light rays from the object 80 at a corresponding angle (e.g., 45°) from the X-axis 88 of the object 80 or the lens assembly 1000. After aligning the local coordinate axes ($Z_{L2}$ axis, $Y_{L2}$ axis and $X_{L2}$ axis) of the second prism 1050 with the rotated coordinate axes ($Z_{L1}$ axis, $Y_{L1}$ axis and $X_{L1}$ axis) of the first prism 1030, the reflecting surface 1040b of the second prism 1050 is rotated counterclockwise at a first predetermined angle of approximately 45° about its local $Z_{L2}$ axis to reflect light rays from the second transmitting surface 1020c of the first prism 1030 at a corresponding angle (e.g., 45°) from the Y-axis 86 of the object 80 of the lens assembly 1000. The 45° counterclockwise rotations of the two prisms 1030 and 1050 about their respective local Z-axis (i.e., $Z_{L1}$ axis and $Z_{L2}$ axis), as shown in FIGS. 11-12, are not drawn to scale to provide clarity in the description and to avoid obscuring aspects of the invention.

Figure 14:
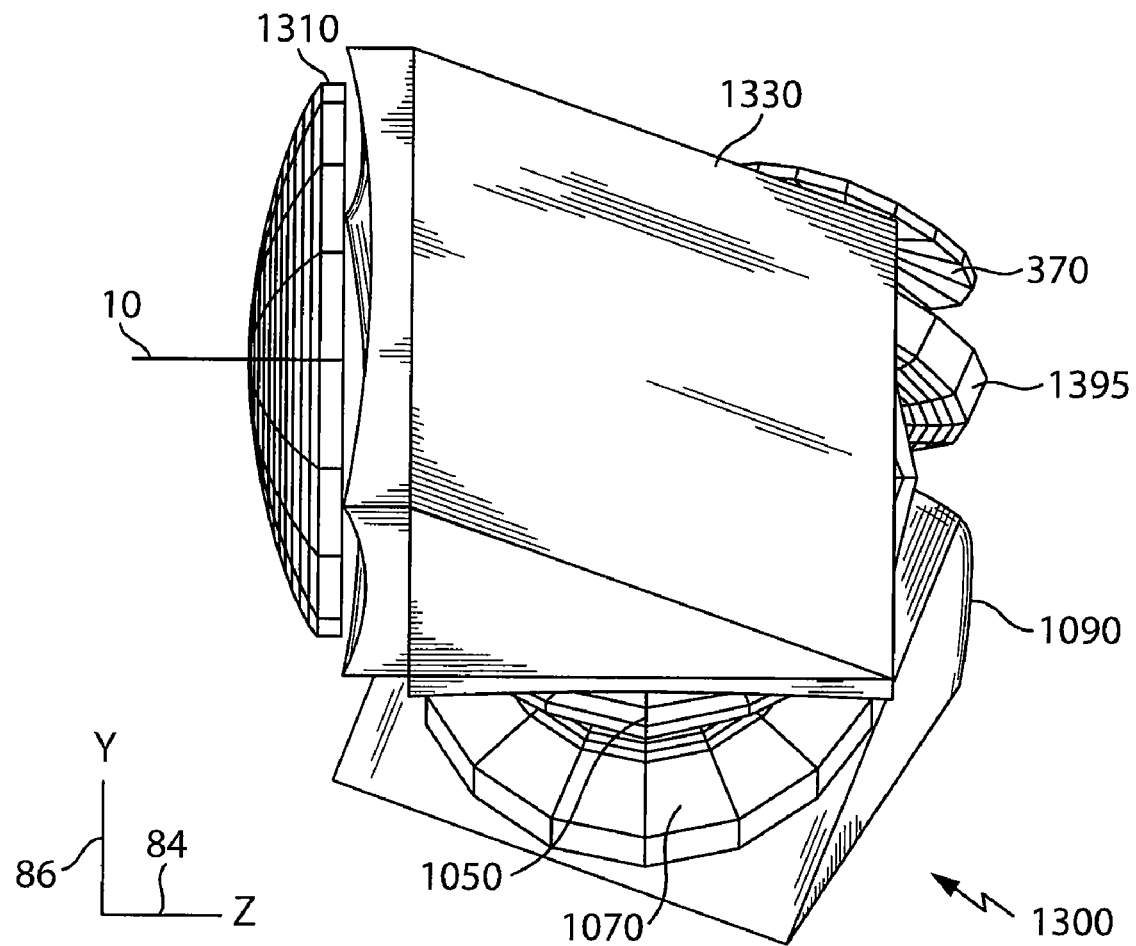
FIG. 14 is a perspective side view of the objective lens assembly of FIGS. 13A & B after the first prism and the second prism have each been rotated about their respective local z-axis in accordance with the present invention.
Figure 15:
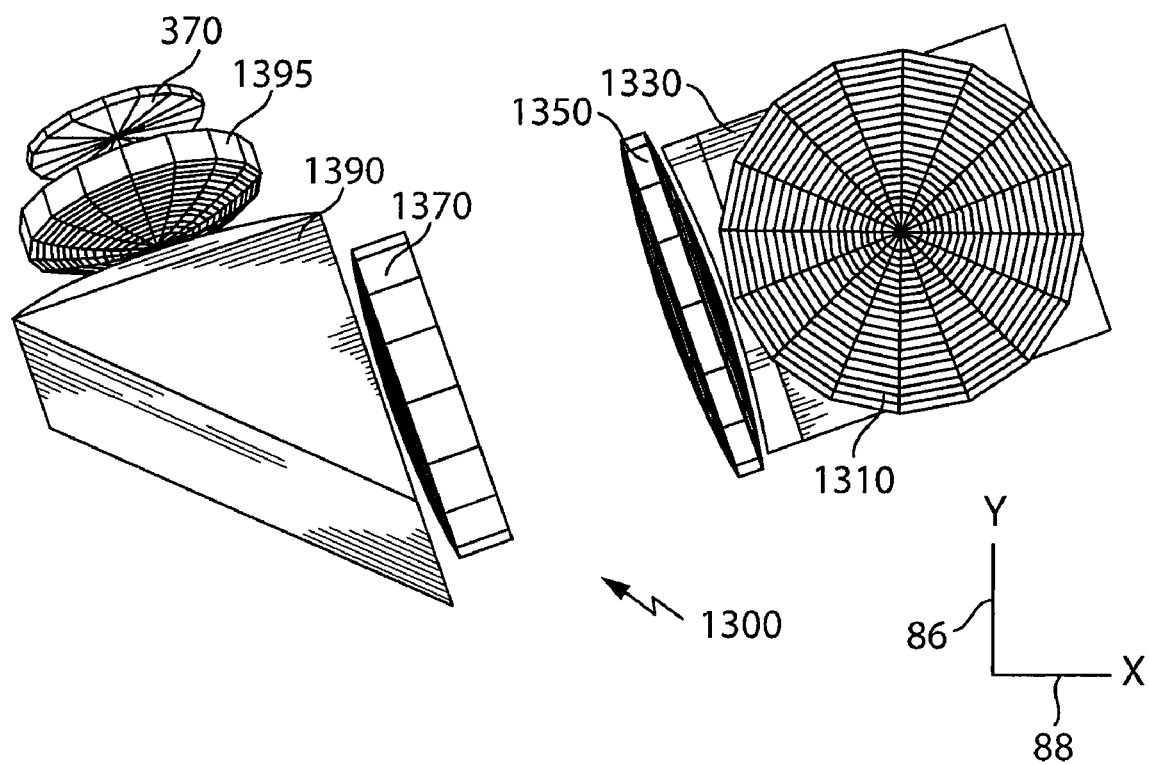
FIG. 15 is a perspective front view of the objective lens assembly of FIGS. 13A & B after the first prism and the second prism have each been rotated about their respective local z-axis as shown in FIG. 14.

FIG. 14 is a perspective side view and FIG. 15 is a perspective front view of the objective lens assembly 1300 after the first prism 1330 and the second prism 1390 have each been rotated about their respective local Z-axis similar to the objective lens assembly 300 as described above in reference to FIGS. 5-6. In FIG. 14, the X-axis 88 of the objective lens assembly 1300 is oriented into the plane of the diagram. In FIG. 15, the Z-axis 84 of the objective lens assembly 1300 is oriented into the plane of the diagram. In FIGS. 14-15, the lens 1350 is disposed such that the objective lens assembly 1300 is in its narrow-angle focal setting. In the implementation shown in FIGS. 14 and 15, the reflecting surface 1320b of the first prism 1330 is rotated counterclockwise at a first predetermined angle of approximately 45° about its local $Z_{L1}$ axis to reflect light rays from the object 80 at a corresponding angle (e.g., 45°) from the X-axis 88 of the object 80 of the lens assembly 1300. After aligning the local coordinate axes ($Z_{L2}$ axis, $Y_{L2}$ axis and $X_{L2}$ axis) of the second prism 1390 with the rotated coordinate axes ($Z_{L1}$ axis, $Y_{L1}$ axis and $X_{L1}$ axis) of the first prism 1330, the reflecting surface 1360b of the second prism 1390 is rotated counterclockwise at a first predetermined angle of approximately 45° about its local $Z_{L2}$ axis to reflect light rays from the second transmitting surface 1320c of the first prism 1330 at a corresponding angle (e.g., 45°) from the Y-axis 86 of the object 80 of the lens assembly 1300. The 45° counterclockwise rotations of the two prisms 1330 and 1350 about their respective local Z-axis (i.e., $Z_{L1}$ axis and $Z_{L2}$ axis), as shown in FIGS. 14-15, are not drawn to scale to provide clarity in the description and to avoid obscuring aspects of the invention.

EXAMPLE 5

Figure 16:
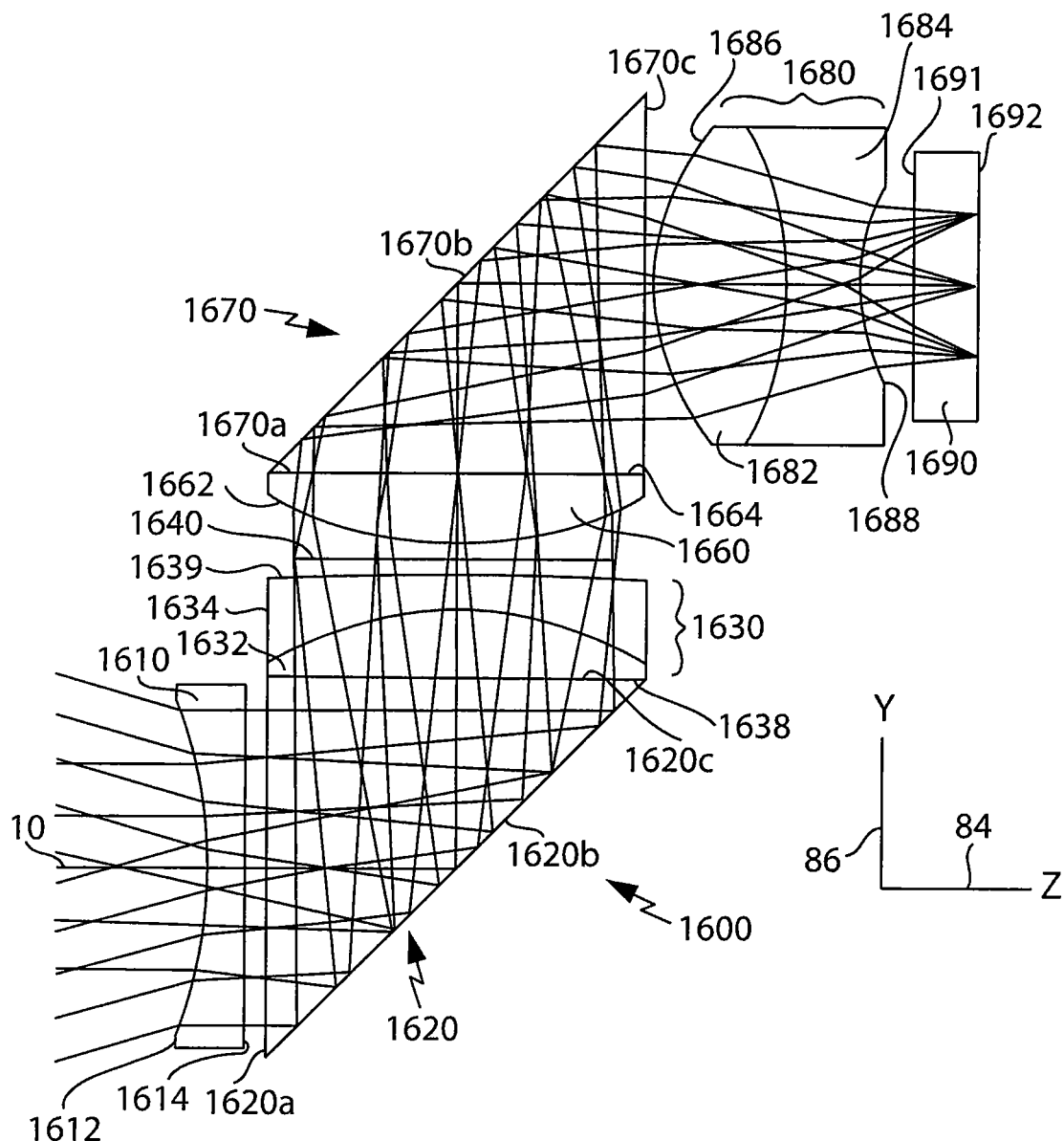
FIG. 16 is a sectional view of an embodiment of an objective lens assembly having a first prism and a second prism operatively configured for visible near infrared imaging consistent with the present invention.

FIG. 16 depicts a sectional view of an embodiment of an objective lens assembly 1600 operatively configured for visible near infrared imaging consistent with the present invention. As shown in FIG. 16, the sectional view is taken along a YZ plane of the objective lens assembly 1600 having a body coordinate system aligned with the coordinate axis 82 of the object 80. The objective lens assembly 1600 comprises, in the order in which light rays from the object propagate through the lens assembly 1600, a negative (or diverging) power lens 1610 having a front surface 1612 and a rear surface 1614, a first right angle prism 1620, a first achromatic doublet 1630 having a positive power lens 1632 facing the first prism 1620 and a negative power lens 1634, an aperture stop 1640, a positive power lens 1660 having a front surface 1662 and a rear surface 1664, a second right angle prism 1670, a second achromatic doublet 1680 having a positive power lens 1682 and a negative power lens 1684. In the implementation shown in FIGS. 16-18, the second prism 1670 is aligned along its local $Z_{L2}$ axis with the second achromatic doublet 1680 and a plane parallel plate or window 1690, which represents the window of a micro-bolometer camera (e.g., VNIR camera 3200 in FIG. 31). In one implementation, the plane parallel plate or window 1690 has a rear surface 1692 that corresponds to an image or focal plane array 380 of the micro-bolometer camera 3200 in FIG. 31. The plane parallel plate or window 1690 may be incorporated into the objective lens assembly 1600.

The first prism 1620 comprises a first transmitting surface (A) 1620a, a reflecting surface (B) 1620b and a second transmitting surface (C) 1620c. In one implementation, the positive power lens 1632 of the first achromatic doublet 1630 has a front surface 1638 and the negative power lens 1634 of the first achromatic doublet 1630 has a rear surface 1639. The front surface 1638 faces (and may be bonded to) the second transmitting surface 1620c of the first prism 1620. In this implementation, the rear surface 1664 of the positive power lens 1660 faces (and may be bonded to) the first transmitting surface 1670a of the second prism 1670. The second prism 1670 comprises a first transmitting surface (D) 1670a, a reflecting surface (E) 1670b and a second transmitting surface (F) 1670c. In one implementation, the positive power lens 1682 of the second achromatic doublet 1680 has a front surface 1686 and the negative power lens 1684 of the second achromatic doublet 1680 has a rear surface 1688. In the implementation shown in FIGS. 16-18, light rays from the object 80 pass through the lens 1610, enter the first transmitting surface 1620a of prism 1620, and are reflected or folded (approximately 90°) by the reflecting surface 1620b toward the second transmitting surface 1620c. The reflected light rays are subsequently transmitted through the second transmitting surface 1620c toward the positive power lens 1632 of the first achromatic doublet 1630. The reflected rays then propagate through the positive power lens 1632 and then the negative power lens 1634 of the first achromatic doublet 1630 onto the aperture stop 1640. Light rays from the aperture stop 1640 are transmitted through the front and rear surfaces 1662 and 1664 of the positive power lens 1660 and the first transmitting surface 1670a of the second prism 1670 toward the second prism's reflecting surface 1670b. Light rays entering the second prism 1670 via the first transmitting surface 1670a are reflected or folded (approximately 90°) by the reflecting surface 1670b toward the second transmitting surface 1670c of the second prism 1670. Light rays propagate from the second transmitting surface 1670c of the second prism 1670 through the second achromatic doublet 1680 and the plane parallel plate or window 1690 onto the rear surface 1692 corresponding to the focal plane array 380 (depicted in FIG. 3).

In the implementation shown in FIG. 16, the front surface 1612 of the lens 1610, the rear surface 1639 of the first achromatic doublet 1630, the front surface 1662 of the positive power lens 1660, the front surface 1686 and the rear surface 1688 of the second achromatic doublet 1680 each are rotationally symmetric aspheric surfaces. The rear surface 1614 of the lens 1610, the first transmitting surface 1620a, the reflecting surface 1620b, the second transmitting surface 1620c, the front surface 1638 of the first achromatic doublet 1630, the rear surface 1664 of the positive power lens 1660, the first transmitting surface 1670a, the reflecting surface 1670b, the second transmitting surface 1670c and the front surface 1691 of the plane parallel plate or window 1690 are each planar surfaces.

Figure 17:
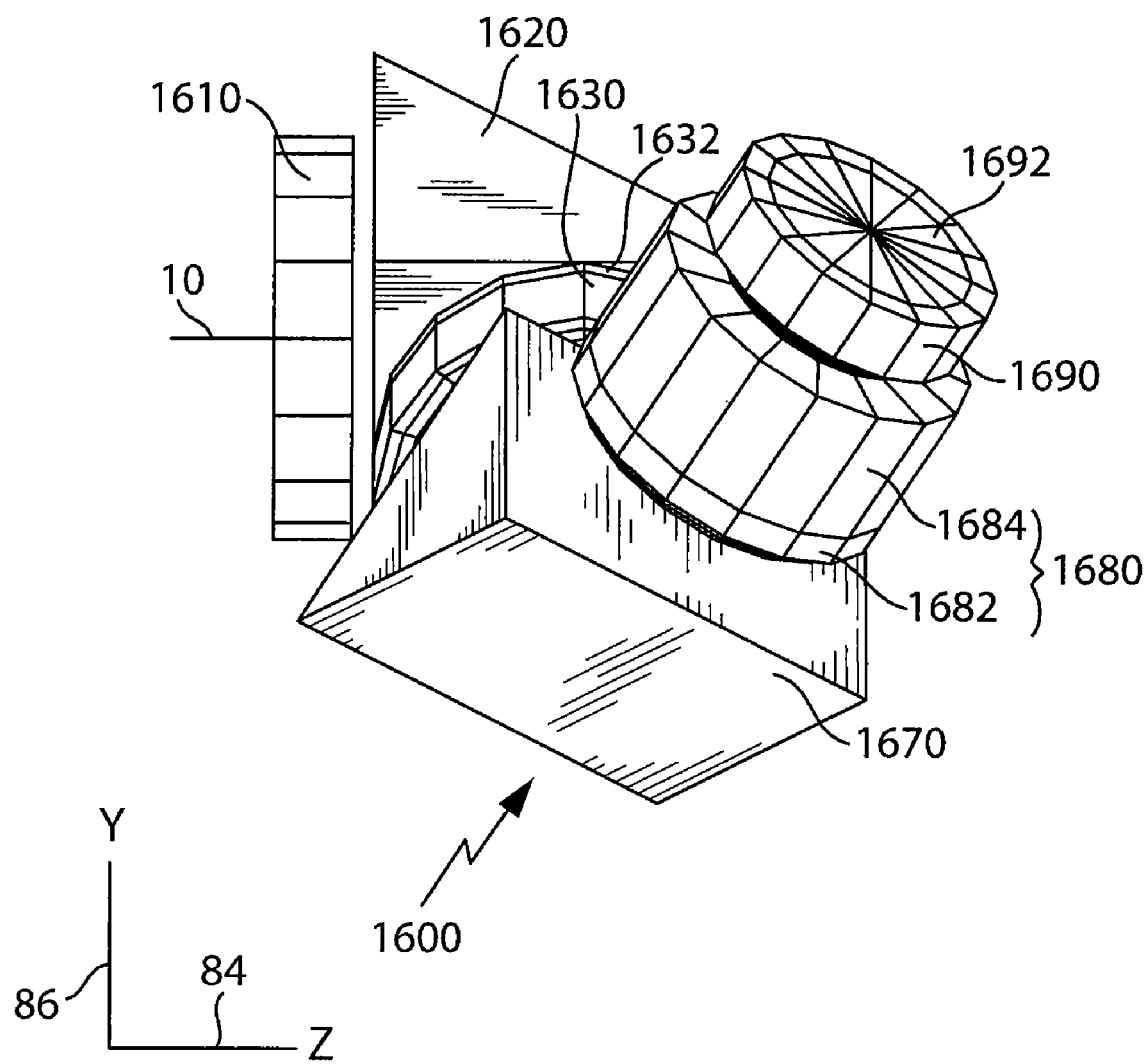
FIG. 17 is a perspective side view of the objective lens assembly of FIG. 16 after the first prism and the second prism have each been rotated about their respective local z-axis in accordance with the present invention.
Figure 18:
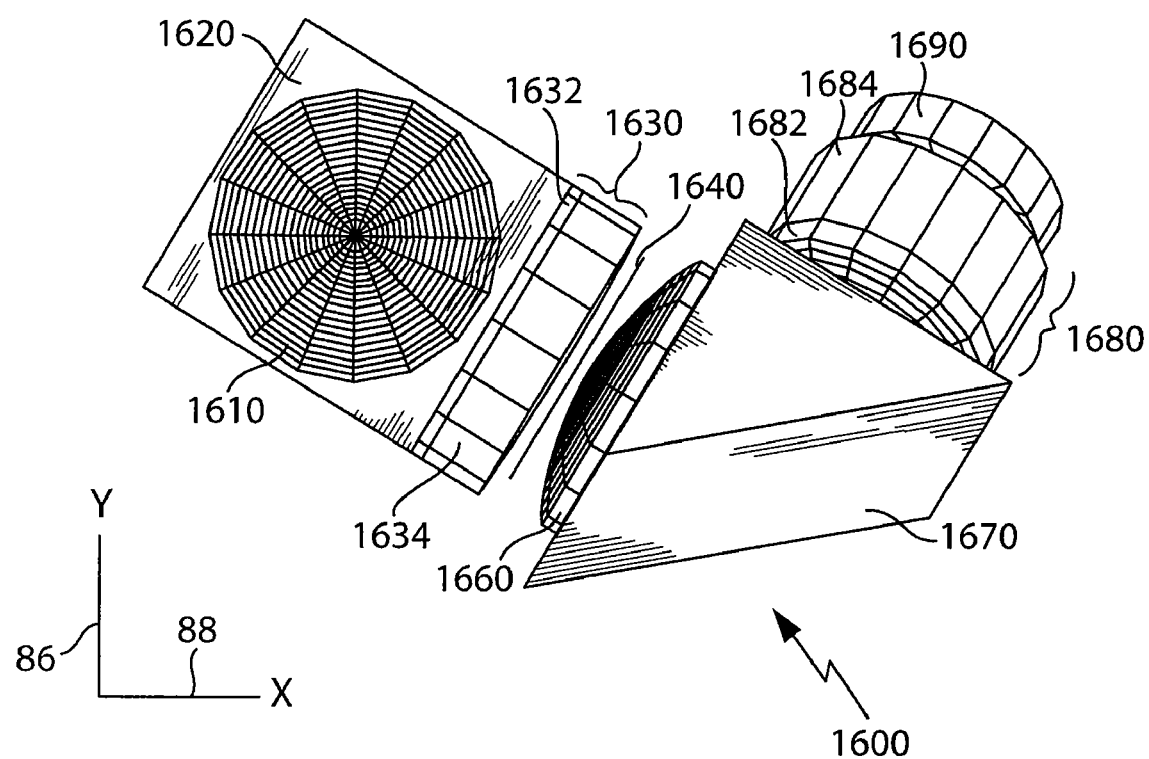
FIG. 18 is a perspective front view of the objective lens assembly of FIG. 16 after the first prism and the second prism have each been rotated about their respective local z-axis as shown in FIG. 17.

FIG. 17 is a perspective side view and FIG. 18 is a perspective front view of the objective lens assembly 1600 after the first prism 1620 and the second prism 1670 have each been rotated about their respective local Z-axis similar to the objective lens assembly 300 as described above in reference to FIGS. 5-6. However, in the implementation, depicted in FIGS. 17-18, the prisms 1620 and 1670 are each rotated clockwise about their respective local Z-axis such that the optical path (e.g., 10, 10', 10" in FIG. 4) of the VNIR objective lens assembly 1600 conforms to the surface of a helmet (e.g., helmet 70 in FIG. 31) in a second direction different from the first direction of an LWIR objective lens assembly (e.g., LWIR objective lens assembly 300) that may be disposed adjacent to the VNIR objective lens assembly 1600 as discussed in further detail below. In FIG. 17, the X-axis 88 of the objective lens assembly 1600 is oriented into the plane of the diagram. In FIG. 18, the Z-axis 84 of the objective lens assembly 1600 is oriented into the plane of the diagram. In the implementation shown in FIGS. 17 and 18, the reflecting surface 1620b of the first prism 1620 is rotated clockwise at a first predetermined angle of approximately 45° about its local $Z_{L1}$ axis to reflect light rays from the object 80 at a corresponding angle (e.g., 45°) from the X-axis 88 of the object 80 or the objective lens assembly 1600. After aligning the local coordinate axes ($Z_{L2}$ axis, $Y_{L2}$ axis and $X_{L2}$ axis) of the second prism 1670 with the rotated coordinate axes ($Z_{L1}$ axis, $Y_{L1}$ axis and $X_{L1}$ axis) of the first prism 1620, the reflecting surface 1670b of the second prism 1670 is rotated clockwise at a first predetermined angle of approximately 45° about its local $Z_{L2}$ axis to reflect light rays from the second transmitting surface 1620c of the first prism 1620 at a corresponding angle (e.g., 45°) from the Y-axis 86 of the object 80 or the lens assembly 1600. The 45° clockwise rotations of the two prisms 1620 and 1670 about their respective local Z-axis (i.e., $Z_{L1}$ axis and $Z_{L2}$ axis), as shown in FIGS. 17-18, are not drawn to scale to provide clarity in the description and to avoid obscuring aspects of the invention.

EXAMPLE 6

Figure 19:
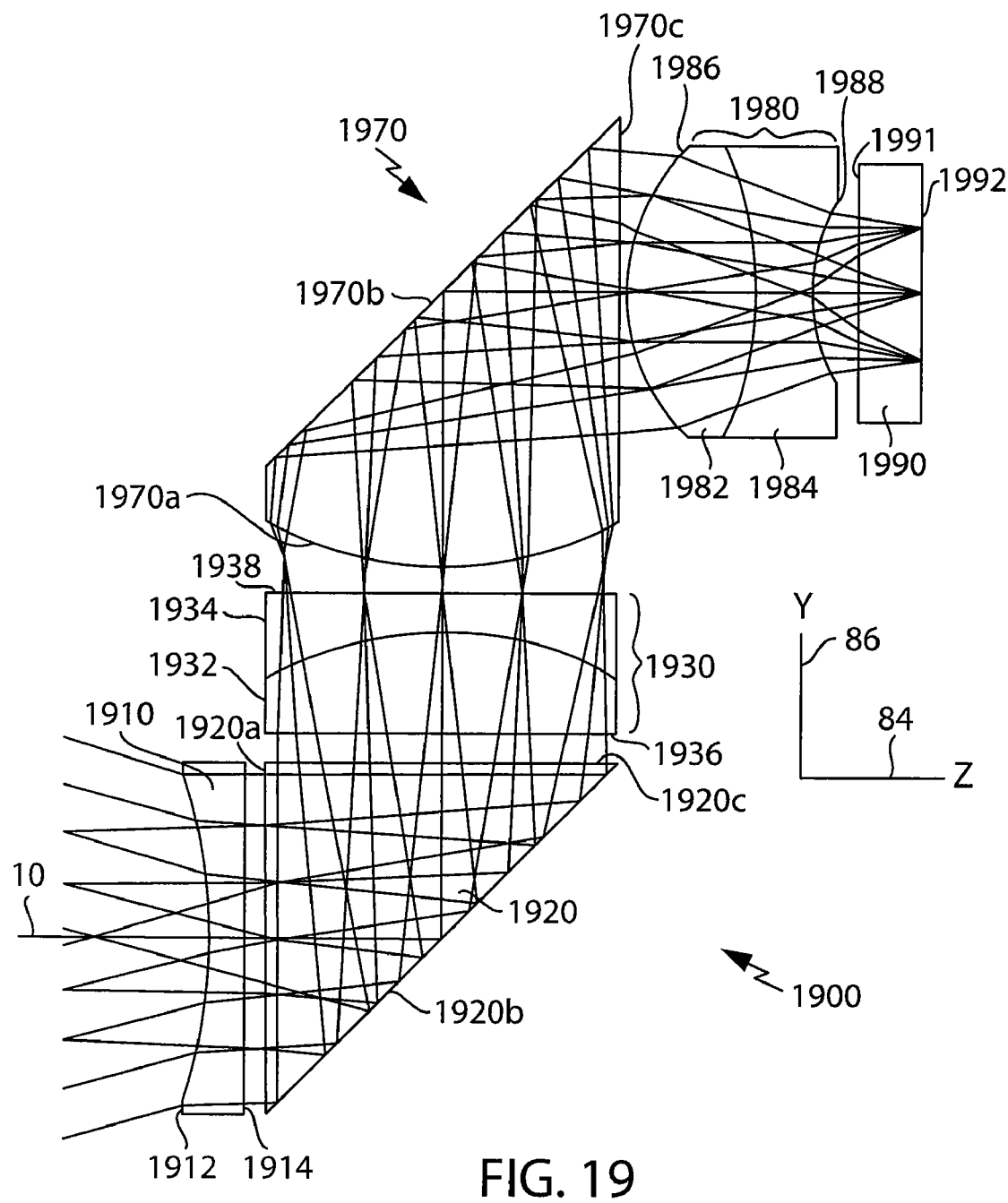
FIG. 19 is a sectional view of a second embodiment of an objective lens assembly having a first prism and a second prism operatively configured for visible near infrared imaging consistent with the present invention.

FIG. 19 depicts a sectional view of another embodiment of an objective lens assembly 1900 operatively configured for visible near infrared imaging consistent with the present invention. As shown in FIG. 19, the sectional view is taken along a YZ plane of the objective lens assembly 1900 having a body coordinate system aligned with the coordinate axes 82 of the object 80. The objective lens assembly 1900 comprises, in the order in which light rays from the object propagate through the lens assembly 1900, a negative (or diverging) power lens 1910 having a front surface 1912 and a rear surface 1914, a first right angle prism 1920, a first achromatic doublet 1930 having a positive power lens 1932 facing the first prism 1920 and a negative power lens 1934, a second right angle positive power prism 1970, a second achromatic doublet 1980 having a positive power lens 1982 and a negative power lens 1984. In the implementation shown in FIGS. 19-21, the second prism 1970 is aligned along its local $Z_{L2}$ axis with the second achromatic doublet 1980 and a plane parallel plate or window 1990, which represents the window of a micro-bolometer camera (e.g., VNIR camera 3200 in FIG. 31). In one implementation, the plane parallel plate or window 1990 has a front surface 1991 and a rear surface 1992 that corresponds to an image or focal plane array 380 of the micro-bolometer camera 3200 in FIG. 31. The plane parallel plate or window 1990 may be incorporated into the objective lens assembly 1900.

The first prism 1920 comprises the first transmitting surface (A) 1920a, a reflecting surface (B) 1920b and a second transmitting surface (C) 1920c. In one implementation, the positive power lens 1932 of the first achromatic doublet 1930 has a front surface 1936 facing the second transmitting surface 1920c of the first prism 1920 and the negative power lens 1934 of the first achromatic doublet 1930 has a rear surface 1938 facing a first transmitting surface (D) 1970a of the second prism 1970. The second prism 1970 comprises the first transmitting surface (D) 1970a, a reflecting surface (E) 1970b and a second transmitting surface (F) 1970c.

In the implementation shown in FIG. 19, the second prism 1970 incorporates the positive power lens 1660 in FIG. 16 to form the first transmitting surface 1970a, which is a positive power rotationally symmetric aspheric surface. In addition, the front surface 1912 of the lens 1910, the rear surface 1938 of the first achromatic doublet 1930, the front surface 1986 and the rear surface 1988 of the second achromatic doublet 1980 are each rotationally symmetric aspheric surfaces. The rear surface 1914 of the lens 1910, the first transmitting surface 1920a, the reflecting surface 1920b, the second transmitting surface 1920c, the front surface 1936 of the first achromatic doublet 1930, the reflecting surface 1970b, the second transmitting surface 1970c and the front surface 1991 of the plane parallel plate or window 1990 are each a planar surface. In one implementation, the positive power lens 1982 of the second achromatic doublet 1980 has a front surface 1986 facing the second transmitting surface 1970c of the second prism 1970 and the negative power lens 1984 of the second achromatic doublet 1980 has a rear surface 1988 facing the plane parallel plate or window 1990.

Figure 20:
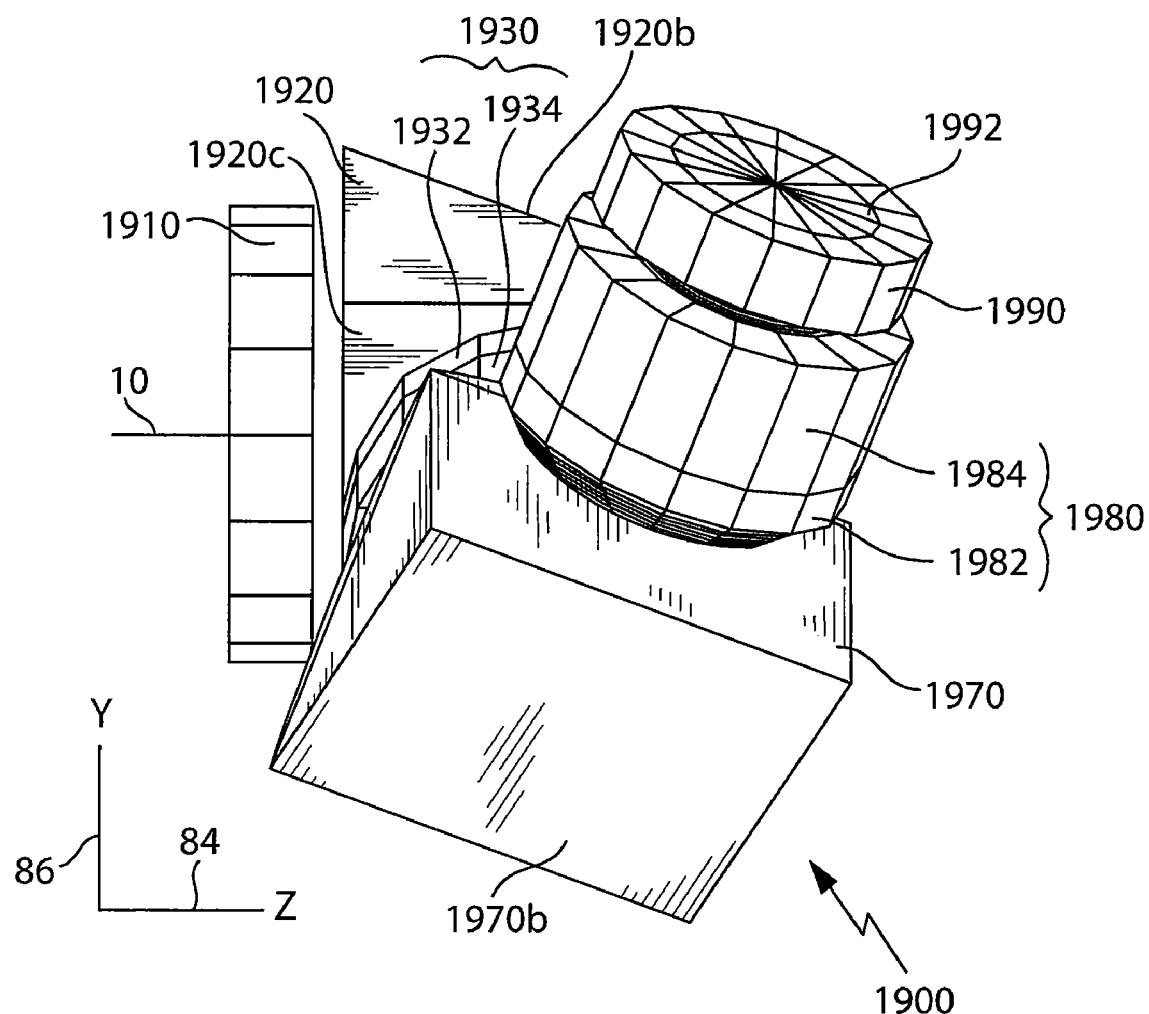
FIG. 20 is a perspective side view of the objective lens assembly of FIG. 19 after the first prism and the second prism have each been rotated about their respective local z-axis in accordance with the present invention.
Figure 21:
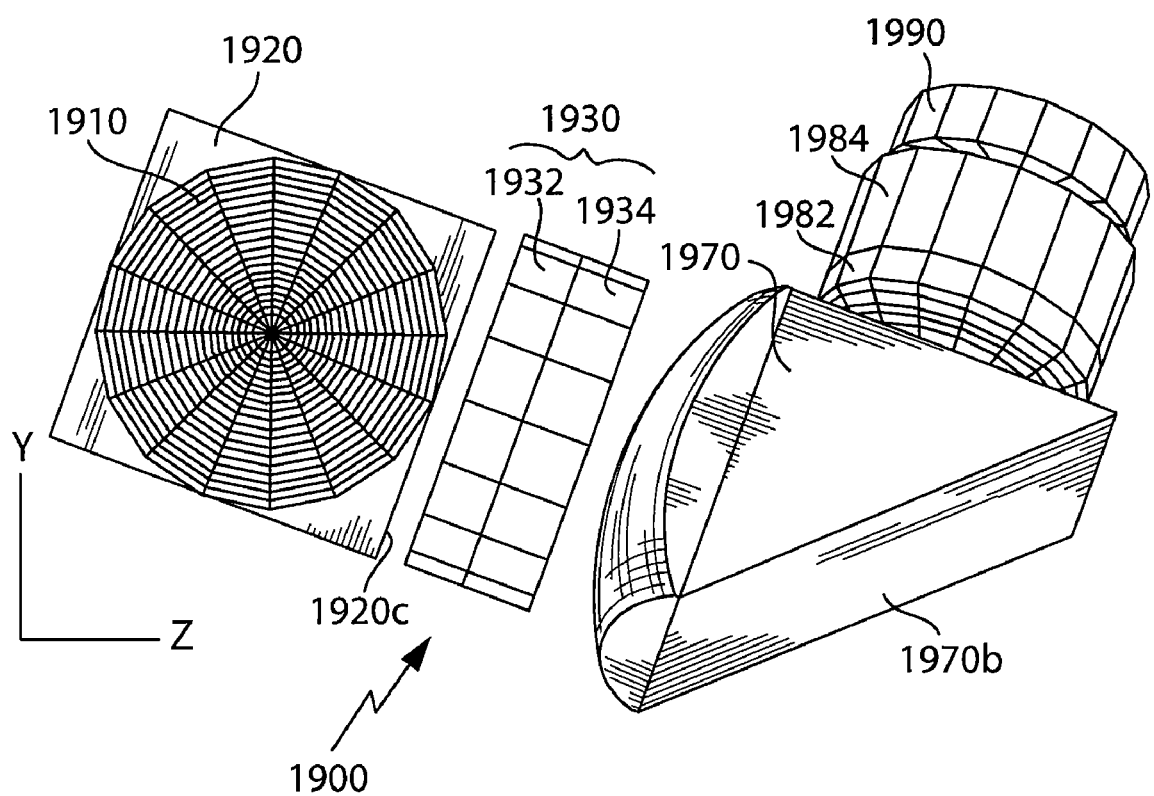
FIG. 21 is a perspective front view of the objective lens assembly of FIG. 19 after the first prism and the second prism have each been rotated about their respective local z-axis as shown in FIG. 20.

In the implementation shown in FIGS. 19-21, light rays from the object 80 pass through the lens 1910, enter the first transmitting surface 1920a of prism 1920, and are reflected or folded (approximately 90°) by the reflecting surface 1920b towards the second transmitting surface 1920c. The reflected light rays are subsequently transmitted through the second transmitting surface 1920c towards the positive power lens 1932 of the first achromatic doublet 1930. The reflected rays then propagate through the positive power lens 1932 and then the negative power lens 1934 of the first achromatic doublet 1930. In this implementation, the rear surface 1938 of the negative power lens 1934 (e.g., the first achromatic doublet 1930) functions as an aperture stop consistent with the aperture stop 1640 of the objective lens assembly 1600. Light rays propagated from the aperture stop or rear surface 1938 of the negative power lens 1934 are transmitted through the first transmitting surface 1970a of the second prism 1970 towards the second prism's reflecting surface 1970b. Light rays entering the second prism 1970 via the first transmitting surface 1970a are reflected or folded (approximately 90°) by the reflecting surface 1970b towards the second transmitting surface 1970c of the second prism 1970. Light rays propagate from the second transmitting surface 1970c of the second prism 1970 through the second achromatic doublet 1980 and the plane parallel plate or window 1990 onto the rear surface 1992 corresponding to the focal plane array 380 (depicted in FIG. 3).

FIG. 20 is a perspective side view and FIG. 21 is a perspective front view of the objective lens assembly 1900 after the first prism 1920 and the second prism 1970 have each been rotated about their respective local Z-axis similar to the objective lens assembly 300 as described above in reference to FIGS. 5-6. However, in the implementation, depicted in FIGS. 20-21, the prisms 1920 and 1970 are each rotated clockwise about their respective local Z-axis such that the optical path (e.g., 10, 10', 10" in FIG. 4) of the VNIR objective lens assembly 1900 conforms to the surface of a helmet (e.g., helmet 2910 in FIG. 31) in a second direction different from the first direction of an LWIR objective lens assembly (e.g., LWIR objective lens assembly 300) that may be disposed adjacent to the VNIR objective lens assembly 1900 as discussed in further detail below. In FIG. 20, the X-axis 88 of the objective lens assembly is oriented into the plane of the diagram. In FIG. 21, the Z-axis 84 of the objective lens assembly is oriented into the plane of the diagram. In the implementation shown in FIGS. 20-21, the reflecting surface 1920b of the first prism 1920 is rotated clockwise at a first predetermined angle of approximately 45° about its local $Z_{L1}$ axis to reflect light rays from the object 80 at a corresponding angle (e.g., 45°) from the X-axis 88 of the object 80 or the lens assembly 1900. After aligning the local coordinate axes ($Z_{L2}$ axis, $Y_{L2}$ axis and $X_{L2}$ axis) of the second prism 1970 with the rotated coordinate axes ($Z_{L1}$ axis, $Y_{L1}$, axis and $X_{L1}$ axis) of the first prism 1920, the reflecting surface 1970b of the second prism 1970 is rotated clockwise at a first predetermined angle of approximately 45° about its local $Z_{L2}$ axis to reflect light rays from the second transmitting surface 1920c of the first prism 1920 at a corresponding angle (e.g., 45°) from the Y-axis 86 of the object 80 or the lens assembly 1900. The 45° clockwise rotations of the two prisms 1920 and 1970 about their respective local Z-axis (i.e., $Z_{L1}$ axis and $Z_{L2}$ axis), as shown in FIGS. 20-21, are not drawn to scale to provide clarity in the description and to avoid obscuring aspects of the invention.

EXAMPLE 7

Figure 22:
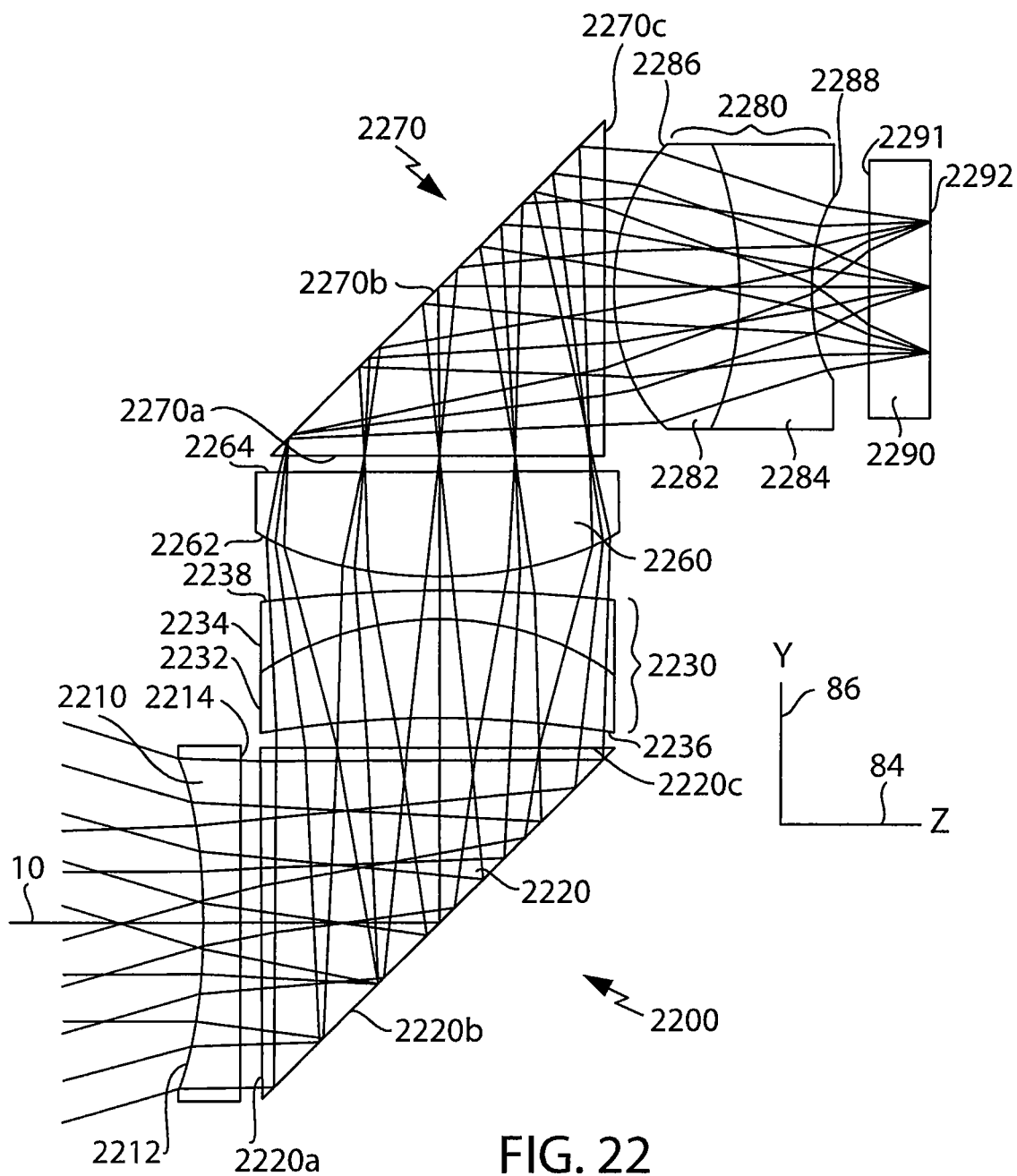
FIG. 22 is a sectional view of a third embodiment of an objective lens assembly having a first prism and a second prism operatively configured for visible near infrared imaging consistent with the present invention.

FIG. 22 depicts a sectional view of another embodiment of an objective lens assembly 2200 operatively configured for visible near infrared imaging consistent with the present invention. As shown in FIG. 22, the sectional view is taken along a YZ plane of the lens objective lens assembly 2200 having a body coordinate system aligned with the coordinate axis 82 of the object 80. The objective lens assembly 2200 comprises, in the order in which light rays from the object propagate through the objective lens assembly 2200, a negative (or diverging) power lens 2210 having a front surface 2212 and a rear surface 2214, a first right angle prism 2220, a first achromatic doublet 2230 having a positive power lens 2232 facing the first prism 2220 and a negative power lens 2234, a positive power lens 2260 having a front surface 2262 and a rear surface 2264, a second right angle prism 2270, and a second achromatic doublet 2280 having a positive power lens 2282 and a negative power lens 2284. In the implementation shown in FIGS. 22-24, the second prism 2270 is aligned along its local $Z_{L2}$ axis with the second achromatic doublet 2280 and a plane parallel plate or window 2290, which represents the window of a micro-bolometer camera (e.g., VNIR camera 3200 in FIG. 31). In one implementation, the plane parallel plate or window 2290 has a rear surface 2292 that corresponds to an image or focal plane array 380 in FIG. 3 of the micro-bolometer camera 3200 in FIG. 31. The plane parallel plate 2290 may be incorporated into the objective lens assembly 2200.

The first prism 2220 comprises a first transmitting surface (A) 2220a, a reflecting surface (B) 2220b and a second transmitting surface (C) 2220c. In one implementation, the positive power lens 2232 of the first achromatic doublet 2230 has a front surface 2236 and the negative power lens 2234 of the first achromatic doublet 2230 has a rear surface 2238. The front surface 2236 faces the second transmitting surface 2220c of the first prism 2220. In this implementation, the rear surface 2264 of the positive power lens 2260 faces the first transmitting surface 2270a of the second prism 2270. The second prism 2270 comprises a first transmitting surface (D) 2270a, a reflecting surface (E) 2270b and a second transmitting surface (F) 2270c. In one implementation, the positive power lens 2282 of the second achromatic doublet 2280 has a front surface 2286 and the negative power lens 2284 of the second achromatic doublet 2280 has a rear surface 2288.

Figure 23:
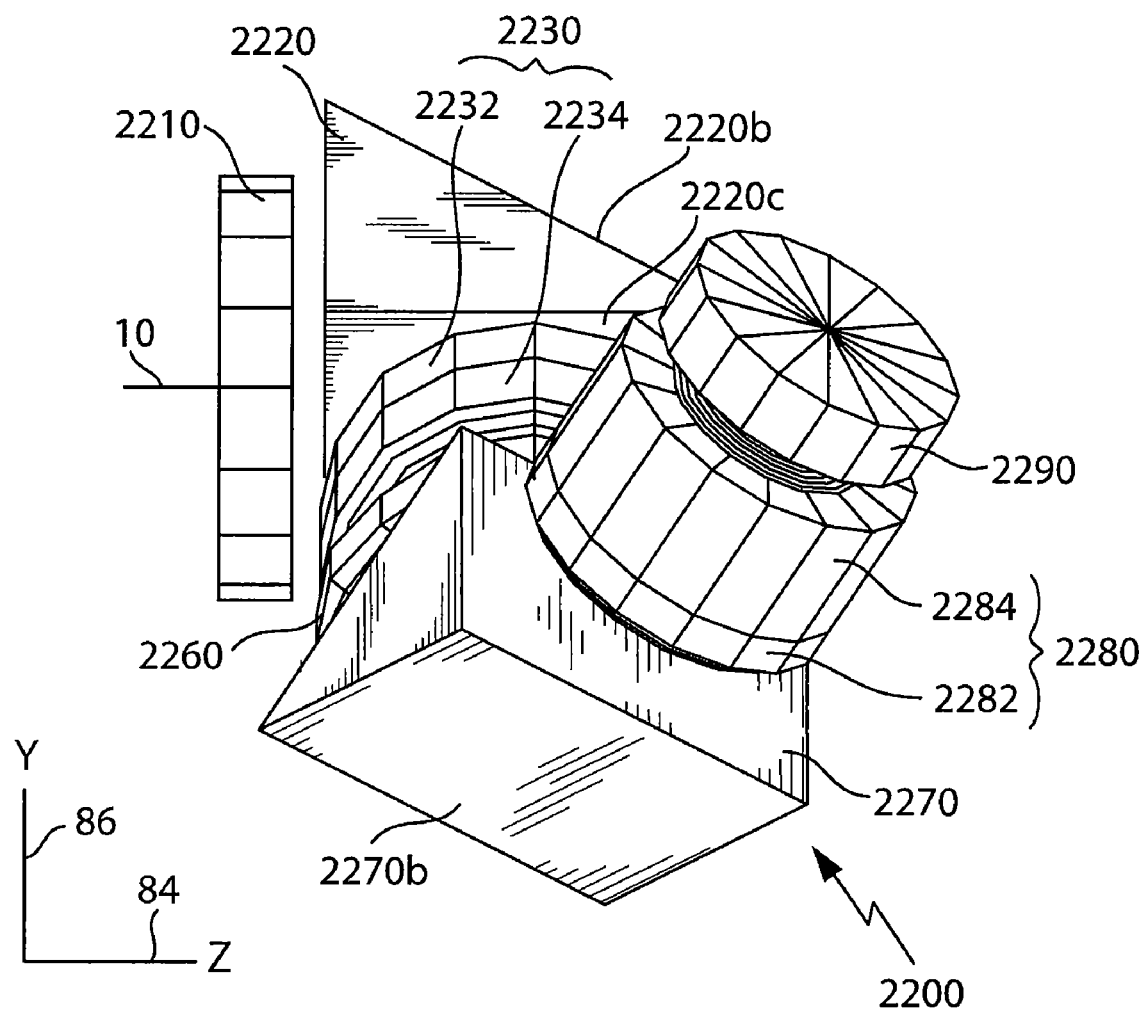
FIG. 23 is a perspective side view of the objective lens assembly of FIG. 22 after the first prism and the second prism have each been rotated about their respective local z-axis in accordance with the present invention.
Figure 24:
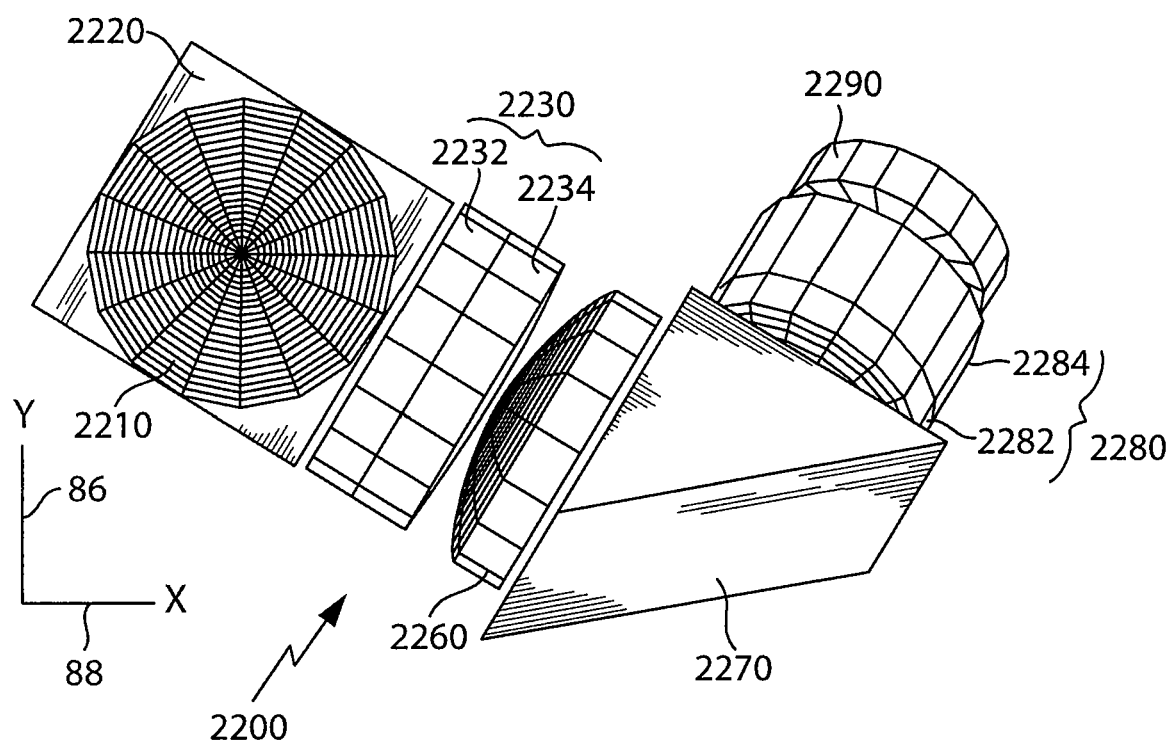
FIG. 24 is a perspective front view of the objective lens assembly of FIG. 22 after the first prism and the second prism have each been rotated about their respective local z-axis as shown in FIG. 23.

In the implementation shown in FIGS. 22-24, light rays from the object 80 pass through the lens 2210, enter the first transmitting surface 2220a of prism 2220, and are reflected or folded (approximately 90°) by the reflecting surface 2220b towards the second transmitting surface 2220c. The reflected light rays are subsequently transmitted through the second transmitting surface 2220c towards the positive power lens 2232 of the first achromatic doublet 2230. The reflected rays then propagate through the positive power lens 2232 and then the negative power lens 2234 of the first achromatic doublet 2230. Light rays from the rear surface 2238 of the negative power lens 2234 of the first achromatic doublet 2230 are transmitted through the front and rear surfaces 2262 and 2264 of the positive power lens 2260 and the first transmitting surface 2270a of the second prism 2270 towards the second prism's reflecting surface 2270b. Light rays entering the second prism 2270 via the first transmitting surface 2270a are reflected or folded (approximately 90°) by the reflecting surface 2270b towards the second transmitting surface 2270c of the second prism 2270. Light rays propagate from the second transmitting surface 2270c of the second prism 2270 through the second achromatic doublet 2280 and the plane parallel plate or window 2290 onto the rear surface 2292 corresponding to the focal plane array 380 (depicted in FIG. 3).

In the implementation shown in FIG. 22, the front surface 2212 of the lens 2210, the rear surface 2238 of the first achromatic doublet 2230, the front surface 2262 of the positive power lens 2260, the front surface 2286 and the rear surface 2288 of the second achromatic doublet 2280 are each rotationally symmetric aspheric surfaces. The second surface 2214 of the lens 2210, the first transmitting surface 2220a, the reflecting surface 2220b, the second transmitting surface 2220c, the first transmitting surface 2270a, the reflecting surface 2270b, the second transmitting surface 2270c and the front surface 2291 of the plane parallel plate or window 2290 are each planar surfaces.

FIG. 23 is a perspective side view and FIG. 24 is a perspective front view of the objective lens assembly 2200 after the first prism 2220 and the second prism 2270 have each been rotated about their respective local Z-axis similar to the objective lens assembly 300 as described above in reference to FIGS. 5-6. However, in the implementation, depicted in FIGS. 23-24, the prisms 2220 and 2270 are each rotated clockwise about their respective local Z-axis such that the optical path (e.g., 10, 10', 10" in FIG. 4) of the VNIR objective lens assembly 2200 conforms to the surface of a helmet (e.g., helmet 2910 in FIG. 31) in a second direction different from the first direction of an LWIR objective lens assembly (e.g., LWIR objective lens assembly 300) that may be disposed adjacent to the VNIR objective lens assembly 2200 as discussed in further detail below. In FIG. 23, the X-axis 88 of the objective lens assembly is oriented into the plane of the diagram. In FIG. 24, the Z-axis 84 of the objective lens assembly is oriented into the plane of the diagram. In the implementation shown in FIGS. 23 and 24, the reflecting surface 2220b of the first prism 2220 is rotated clockwise at a first predetermined angle of approximately 45° about its local $Z_{L1}$ axis to reflect light rays from the object 80 at a corresponding angle (e.g., 45°) from the X-axis 88 of the object 80 or the objective lens assembly 2200. After aligning the local coordinate axes ($Z_{L2}$ axis, $Y_{L2}$ axis and $X_{L2}$ axis) of the second prism 2270 with the rotated coordinate axes ($Z_{L1}$ axis, $Y_{L1}$, axis and $X_{L1}$ axis) of the first prism 2220, the reflecting surface 2270b of the second prism 2270 is rotated clockwise at a first predetermined angle of approximately 45° about its local $Z_{L2}$ axis to reflect light rays from the second transmitting surface 2220c of the first prism 2220 at a corresponding angle (e.g., 45°) from the Y-axis 86 of the object 80 or the lens assembly 2200. The 45° clockwise rotations of the two prisms 2220 and 2270 about their respective local Z-axis (i.e., $Z_{L1}$ axis and $Z_{L2}$ axis), as shown in FIGS. 23-24, are not drawn to scale to provide clarity in the description and to avoid obscuring aspects of the invention.

As described above, the negative power field lens 310, 710, 1610, 1910, and 2210 of the respective objective lens assembly 300, 700, 1600, 1900, or 2200 has a first or front surface 312, 712, 1612, 1912, or 2212 that is a concave surface facing object 80 and a second planar surface 314, 714, 1614, 1914, or 2214 that faces the focal plane array 380 (depicted in FIG. 3). The negative power field lens 310, 710, 1610, 1910, and 2210 may function as a focusing lens that may be moved longitudinally along the local Z-axis of the first prism 330, 730, 1620, 1920, or 2220 of the respective objective lens assembly to compensate for changes in object 80 distances from 300 to approximately 2 meters. However, in implementations in which there are other means available for focusing, such as, for example, incorporating a wavefront coding element in the aperture stop space of the respective objective lens assembly, the first prism 330, 730, 1620, 1920, or 2220 may be eliminated by transferring its net negative optical power to the front surface of the first prism 330, 730, 1620, 1920, or 2220.

In the Examples 1 to 3 of the LWIR objective lens assemblies 300, 700, and 1000, the focal plane array 380 has a size of 8.128×6.096 millimeters. In the respective examples, each of the angular fields of view of the objective lens assemblies 300, 700, and 100 are as follows: The horizontal field angle is 40° and the vertical angle is 30°. The entrance pupil diameter is 10.894 millimeters, corresponding to an f-number of 1.0.

In Examples 5 to 7 of the VNIR objective lens assemblies 1600, 1900, and 2200, the focal plane array corresponding to 1690, 1990, and 2290 has a size of 12.80×9.60 millimeters. In the respective examples, each of the angular fields of view of the objective lens assemblies 1600, 1900, and 2200 are as follows: The horizontal field angle is 40° and the vertical angle is 32°. The entrance pupil diameter is 17.097 millimeters and the f-number is equivalent to 1.2.

In Example 4 of the dual field-of-view objective lens assembly 1300, the size of the focal plane array 380 (depicted in FIG. 3) is 8.128×6.096 millimeters. The angular fields of view of the objective lens assembly 1300 are as follows: In the wide-angle zoom setting, the horizontal field angle is 40° and the vertical angle is 30°. In the telephoto end position, the horizontal field angle is 13.4° whereas the vertical angle is 10°. The f-number for the wide-angle position is 1.2, while in the telephoto position the f-number is 1.0; corresponding to an entrance pupil diameter of 10.894 millimeters and 27.235 millimeters, respectively.

The aforementioned examples are also applicable to optical systems having focal plane array sizes other than those mentioned above. Further, the present invention includes not only image-forming objective lens assemblies or optical system embodiments according to the present invention but also associated focal plane arrays (e.g., corresponding to 380, 1690, 1990, and 2290) and associated image detector and processor (e.g., 3202 and 3302 in FIG. 31) for an image camera apparatus (e.g., LWIR camera 3300 and VNIR camera 3200 in FIG. 31).

In all of the preceding Examples, the present invention adopts a basic arrangement in which the imaging forming optical system or objective lens assembly 300, 700, 1000, 1300, 1600, 1900, or 2200 has no intermediate image planes, and includes, in sequence from object 80 to image plane (e.g., corresponding to 380, 1690, 1990, or 2290), a first part including at least one prism 330, 730, 1030, 1330, 1620, 1920, and 2220, an aperture stop 340, 740, 1060, 1398, 1640, 1938, and 2264 and a rear part including at least one other prism 350, 750, 1050, 1390, 1670, 1970, and 2270. Furthermore, the first prism 330, 730, 1030, 1330, 1620, 1920, and 2220 and the second prism 350, 750, 1050, 1390, 1670, 1970, and 2270 in each objective lens assembly 300, 700, 1000, 1300, 1600, 1900, and 2200 are oriented in a rotational (clocking) relationship to one another.

Employing an objective lens assembly 300, 700, 1000, 1300, 1600, 1900, or 2200 in accordance with the present invention has the following advantages, among others. First, a combination of two reflecting optical elements (such as the first prism 330, 730, 1030, 1330, 1620, 1920, or 2220 and the second prism 350, 750, 1050, 1390, 1670, 1970, and 2270) allow the optical system or objective lens assembly 300, 700, 1000, 1300, 1600, 1900, or 2200 to be made compact in comparison to sequentially positioned refractive optical elements because the optical path 10 is folded. Second, an optical system or objective lens assembly 300, 700, 1000, 1300, 1600, 1900, or 2200 comprising two reflecting optical elements permit a form factor that may be manipulated to conform to a particular spatial geometry or space allocation such as a surface of a helmet 70. Third, an optical system or objective lens assembly 300, 700, 1000, 1300, 1600, 1900, or 2200 comprising two reflecting optical elements are not susceptible to the accuracy requirements of assembly because, in a construct consisting predominately of prisms, the relative positional relationship of the constituent surfaces are not as likely to be subject to alignment errors.

Each rotationally symmetric aspheric surface (which is defined as a polynomial expansion of the deviation from a spherical surface) utilized in the objective lens assembly 300, 700, 1000, 1300, 1600, 1900, or 2200 may have a surface sag as represented by equation (1)

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} \quad (1)$$

where z=sag, c=reciprocal radius of curvature, r=y-coordinate, k=conic constant and $\alpha_1$ through $\alpha_5$ are the $2^{nd}$, $4^{th}$, $6^{th}$, $8^{th}$ and $10^{th}$ order aspheric coefficients.

As described above, each objective lens assembly 300, 700, 1000, 1300, 1600, 1900, or 2200 may employ an asphero-diffractive surface or kinoform (e.g., front surface 1072 of lens 1070). A kinoform is a diffractive element whose phase modulation is introduced by a surface relief pattern. The diffractive optical surface results in a step function whose surface is cut back by precisely one wavelength of the light frequency value of interest every time their thickness increases by that amount. The general equation for the asphero-diffractive surface takes the form of the equation (1) given above for the rotationally symmetric aspheric with the addition of the phase argument reflected in equation (2):

$$\Phi = M \sum_{i=1}^{N} A_i \rho^{2i} \quad (2)$$

where N is the number of polynomial coefficients in the series, $A_i$ is the coefficient of the 2i power of $\rho$, which is the normalized aperture coordinate, and M is diffraction order.

One feature of the present invention is the construction of an LWIR objective lens assembly 300, 700 or 900, or an LWIR dual field-of-view objective lens assembly 1300 of a single material having infrared transmitting properties. This material may be a glass or a similar type of infrared transmitting material.

Each lens or prism of the LWIR objective lens assembly 300, 700, 900, or 1300 may comprise one or more of the materials listed in Table I below. In Table I, the properties of the listed materials include the index of refraction at $\lambda$=10.0 micrometers and the Abbe' number (reciprocal relative dispersion).

TABLE I

| Material | Index | Abbe' Number |
|---|---|---|
| AMTIR1 | 2.4975 | 113 |
| AMTIR2 | 2.7710 | 170 |
| AMTIR3 | 2.6036 | 110 |
| AMTIR4 | Greater than 2.6 | Greater than 110 |
| AMTIR5 | Greater than 2.7 | Greater than 110 |
| Ge | 4.003 | 991 |
| KRS-5 | 2.3707 | 265 |
| GaAs | 3.2781 | 108 |

The AMTIR materials are chalcogenide glasses, such as chalcogenide glasses commercially available from Amorphous Materials, Inc., Garland, Tex. Compression molding may be used to form the optical elements (i.e., lens, apertures, or prisms) that comprise chalcogenide glasses, specifically AMTIR1 and AMTIR5. Compression molding results in a reduction in manufacturing costs, particularly when large production quantities are required. Further information concerning molding of lens elements is disclosed by commonly assigned U.S. Pat. No. 5,346,523 entitled "METHOD OF MOLDING CHALCOGENIDE GLASS LENSES," the contents of which are incorporated herein by reference.

The chalcogenide glasses, gallium arsenide (GaAs), germanium (Ge) and thallium bromo-iodide (KRS-5) listed in Table I all exhibit minimal change in index of refraction and Abbe' number between the LWIR (8-12 μm) and mid-wave (3-5 μm) infrared wavebands (MWIR). Therefore, another significant feature of the present invention is that the lenses (e.g., 310, 710, 1010, or 1310) and prisms (e.g., 330, 350, 730, 790, 1030, 1050, 1330, and 1390) used in the objective lens assemblies 300, 700, 1000, and 1300 are equally applicable to the MWIR (3 μm-5 μm) and LWIR (8 μm-11.5 μm) wavebands.

One known chalcogenide glass has an absorption edge transmission property favorable for light transmission in the short infrared (SWIR) waveband (1.0 μm-1.7 μm). Yet another significant feature of the present invention is that lenses (e.g., 310, 710, 1010, or 1310) and prisms (e.g., 330, 350, 730, 790, 1030, 1050, 1330, and 1390) used in the objective lens assemblies 300, 700, 1000, and 1300, when comprised of this material, are equally applicable in the SWIR region (1.0 μm-1.7 μm) of the electromagnetic spectrum.

Another known chalcogenide glass has a thermal coefficient of linear expansion equivalent to that of aluminum, which may be used to form a housing (not shown in the figures) for an objective lens assembly 300, 700, 1000, 1300, 1600, 1900, and 2200 consistent with the present invention. The objective lens assembly 300, 700, 1000, 1300, 1600, 1900, and 2200 and its housing expands and contracts in unison with a change in temperature, thereby remaining in focus throughout. In addition, the chalcogenide glass has a thermal index coefficient (dn/dt), which is the rate of change of the material's refractive index with changes in temperature, less than 1. Given these two material attributes, another feature of an objective lens assembly 300, 700, 1000, 1300, 1600, 1900, and 2200 arranged consistent with the present invention, comprised of this type of chalcogenide glass, and assembled in an aluminum lens housing, is that the objective lens assembly 300, 700, 1000, 1300, 1600, 1900, and 2200 are passively athermal such that the objective lens assembly 300, 700, 1000, 1300, 1600, 1900, and 2200 will not require substantial refocusing with temperature change.

Lenses or prisms in the objective lens assemblies 1600, 1900 and 2200 of the present invention are comprised of visible near-infrared transmitting optical glasses, such as the VNIR transmitting optical glasses commercially available from Schott Optical Glass Technologies, Duryea, Pa., The Ohara Corporation, Somerville, N.J. and The Eastman Kodak Company, Rochester, N.Y., among others.

Another significant feature of the present invention is that visible near-infrared objective lenses or plates 1632, 1634, 1690, 1932, 1934, 1990, 2232, 2234, and 2290 may be fabricated by compression molding techniques, with the use of low softening temperature optical glasses, thus reducing the manufacturing costs, particularly when large production quantities are required.

Tables 2 through 8 below provide parameters for one implementation of the lenses and prisms in the respective objective lens assemblies 300, 700, 1000, 1300, 1600, 1900, and 2200 of the present invention as described herein.

TABLE 2

| | Objective Lens Assembly 300 | | |
|---|---|---|---|
| | LENS 310 | PRISM 330 | PRISM 350 |
| Power | −.09192 | .04799 | .04778 |
| K | 0 | 0 | 0 |

TABLE 2-continued

| | Objective Lens Assembly 300 | | |
|---|---|---|---|
| | LENS 310 | PRISM 330 | PRISM 350 |
| $\alpha_2$ | −3.7016E−5 | 3.6869E−6 | 4.2104E−6 |
| $\alpha_3$ | −8.7232E−8 | −1.0111E−8 | −6.2454E−9 |
| $\alpha_4$ | −1.1895E−9 | 3.5044E−11 | 2.5049E−11 |
| $\alpha_5$ | 5.7519E−12 | −6.2365E−14 | −1.9744E−14 |
| $\theta_X$ | 0 | 0 | 45 |
| $\theta_Y$ | 0 | 45 | 0 |
| $\theta_Z$ | 0 | −10 | −40 |

TABLE 3

| | Objective Lens Assembly 700 | | | | |
|---|---|---|---|---|---|
| | LENS 710 | PRISM 730 | LENS 750 | LENS 770 | PRISM 790 |
| Power | −.08671 | 0 | .04573 | .04778 | 0 |
| K | 0 | 0 | 0 | 0 | 0 |
| $\alpha_2$ | −3.4784E−5 | 0 | −3.4658E−6 | −4.1437E−6 | 0 |
| $\alpha_3$ | −8.4491E−8 | 0 | 9.2434E−9 | 5.4636E−9 | 0 |
| $\alpha_4$ | −9.2098E−10 | 0 | −2.9489E−11 | −1.9965E−11 | 0 |
| $\alpha_5$ | 3.6085E−12 | 0 | 4.9960E−14 | 1.2910E−14 | 0 |
| $\theta_X$ | 0 | 0 | 0 | 0 | 45 |
| $\theta_Y$ | 0 | 45 | 0 | 0 | 0 |
| $\theta_Z$ | 0 | −10 | 0 | 0 | −40 |

TABLE 4

| | Objective Lens Assembly 1000 | | | | | |
|---|---|---|---|---|---|---|
| | LENS 1010 | PRISM 1030 | PRISM 1050 | LENS 1070 | LENS 1090 | LENS 1100 |
| Power | −.02577 | 0 | 0 | −.00363 | .01571 | .03201 |
| K | 0 | 0 | 0 | 0 | 0 | 0 |
| $\alpha_2$ | 0 | 0 | 0 | 1.8296E−6 | −1.251E−6 | 0 |
| $\alpha_3$ | 0 | 0 | 0 | −1.186E−9 | 1.129E−10 | 0 |
| $\alpha_4$ | 0 | 0 | 0 | 0 | −2.14E−12 | 0 |
| $\theta_X$ | 0 | 0 | 45 | 0 | 0 | 0 |
| $\theta_Y$ | 0 | 45 | 0 | 0 | 0 | 0 |
| $\theta_Z$ | 0 | −10 | −40 | 0 | 0 | 0 |
| M | | | | | 1 | |
| N | | | | | 1 | |
| $A_I$ | | | | | −43.8995 | |
| $\rho$ | | | | | 14.8477 | |

TABLE 5

| | Objective Lens Assembly 1300 | | | | | |
|---|---|---|---|---|---|---|
| | LENS 1310 | PRISM 1330 | LENS 1350 | LENS 1370 | PRISM 1390 | LENS 1395 |
| Power | .0019 | −.0276 | .0337 | −.0017 | .0046 | .0382 |
| K | 0 | 0 | 0 | 0 | 0 | 0 |
| $\alpha_2$ | −2.35E−7 | 0 | 1.07E−7 | 6.75E−6 | 1.473E−5 | −9.31E−6 |
| $\alpha_3$ | −2.4E−10 | 0 | −4.4E−12 | 5.69E−9 | −2.49E−8 | −2.61E−8 |
| $\alpha_4$ | −2.7E−13 | 0 | −5.2E−13 | 0 | 2.1E−11 | 1.84E−11 |
| $\alpha_5$ | 0 | 0 | 1.1E−15 | 0 | 0 | 0 |
| $\theta_X$ | 0 | 0 | 0 | 0 | 45 | 0 |
| $\theta_Y$ | 0 | 45 | 0 | 0 | 0 | 0 |
| $\theta_Z$ | 0 | −10 | 0 | 0 | −40 | 0 |

TABLE 6

Objective Lens Assembly 1600

| | LENS 1610 | PRISM 1620 | LENS 1630 | LENS 1660 | PRISM 1670 | LENS 1680 |
|---|---|---|---|---|---|---|
| Power | −.0237 | 0 | .0067 | .0295 | 0 | .0150 |
| K | 0 | 0 | 0 | 0 | 0 | 0 |
| $\alpha_2$ | −7.164E−9 | 0 | 2.10E−6 | −2.51E−6 | 0 | 1.44E−4 |
| $\alpha_3$ | 6.362E−12 | 0 | −2.50E−9 | −7.47E−9 | 0 | 2.57E−7 |
| $\alpha_4$ | 0 | 0 | 1.66E−11 | 1.20E−11 | 0 | 1.66E−8 |
| $\alpha_5$ | 0 | 0 | 0 | 0 | 0 | 0 |
| $\theta_X$ | 0 | 0 | 0 | 0 | −45 | 0 |
| $\theta_Y$ | 0 | 45 | 0 | 0 | 0 | 0 |
| $\theta_Z$ | 0 | 5 | 0 | 0 | 20 | 0 |

TABLE 7

Objective Lens Assembly 1900

| | LENS 1910 | PRISM 1920 | LENS 1930 | PRISM 1970 | LENS 1980 |
|---|---|---|---|---|---|
| Power | −.0210 | 0 | .0028 | .0324 | .0129 |
| K | 0 | 0 | 0 | 0 | 0 |
| $\alpha_2$ | 0 | 0 | 3.48E−6 | −3.19E−6 | 1.87E−4 |
| $\alpha_3$ | −5.82E−9 | 0 | −1.03E−8 | −1.61E−8 | 4.91E−7 |
| $\alpha_4$ | −3.86E−13 | 0 | 4.36E−11 | 2.85E−11 | 2.60E−8 |
| $\alpha_5$ | 0 | 0 | 0 | 0 | 0 |
| $\theta_X$ | 0 | 0 | 0 | −45 | 0 |
| $\theta_Y$ | 0 | 45 | 0 | 0 | 0 |
| $\theta_Z$ | 0 | 5 | 0 | 20 | 0 |

TABLE 8

Objective Lens Assembly 2200

| | LENS 2210 | PRISM 2220 | LENS 2230 | LENS 2260 | PRISM 2270 | LENS 2280 |
|---|---|---|---|---|---|---|
| Power | −.0208 | 0 | .0002 | .0307 | 0 | .0169 |
| K | 0 | 0 | 0 | 0 | 0 | 0 |
| $\alpha_2$ | 0 | 0 | 5.58E−6 | −4.12E−7 | 0 | 1.521E−4 |
| $\alpha_3$ | −4.95E−9 | 0 | −2.05E−8 | −2.32E−8 | 0 | 4.388E−7 |
| $\alpha_4$ | 6.40E−12 | 0 | 6.44E−11 | 4.82E−11 | 0 | 1.589E−8 |
| $\alpha_5$ | 0 | 0 | 0 | 0 | 0 | 0 |
| $\theta_X$ | 0 | 0 | 0 | 0 | −45 | 0 |
| $\theta_Y$ | 0 | 45 | 0 | 0 | 0 | 0 |
| $\theta_Z$ | 0 | 5 | 0 | 0 | 20 | 0 |

FIGS. 25A-H are ray plot diagrams depicting the residual transverse ray aberrations of the LWIR objective lens assembly 300. In this diagram, the transverse aberrations are shown for images of various object points, expressed as X (horizontal) and Y (elevation) field angles. The residual aberrations shown in FIGS. 25A-H are representative of the state of correction of other LWIR objective lens assemblies 700, 1000, and 1300 consistent with the present invention.

Figure 26:
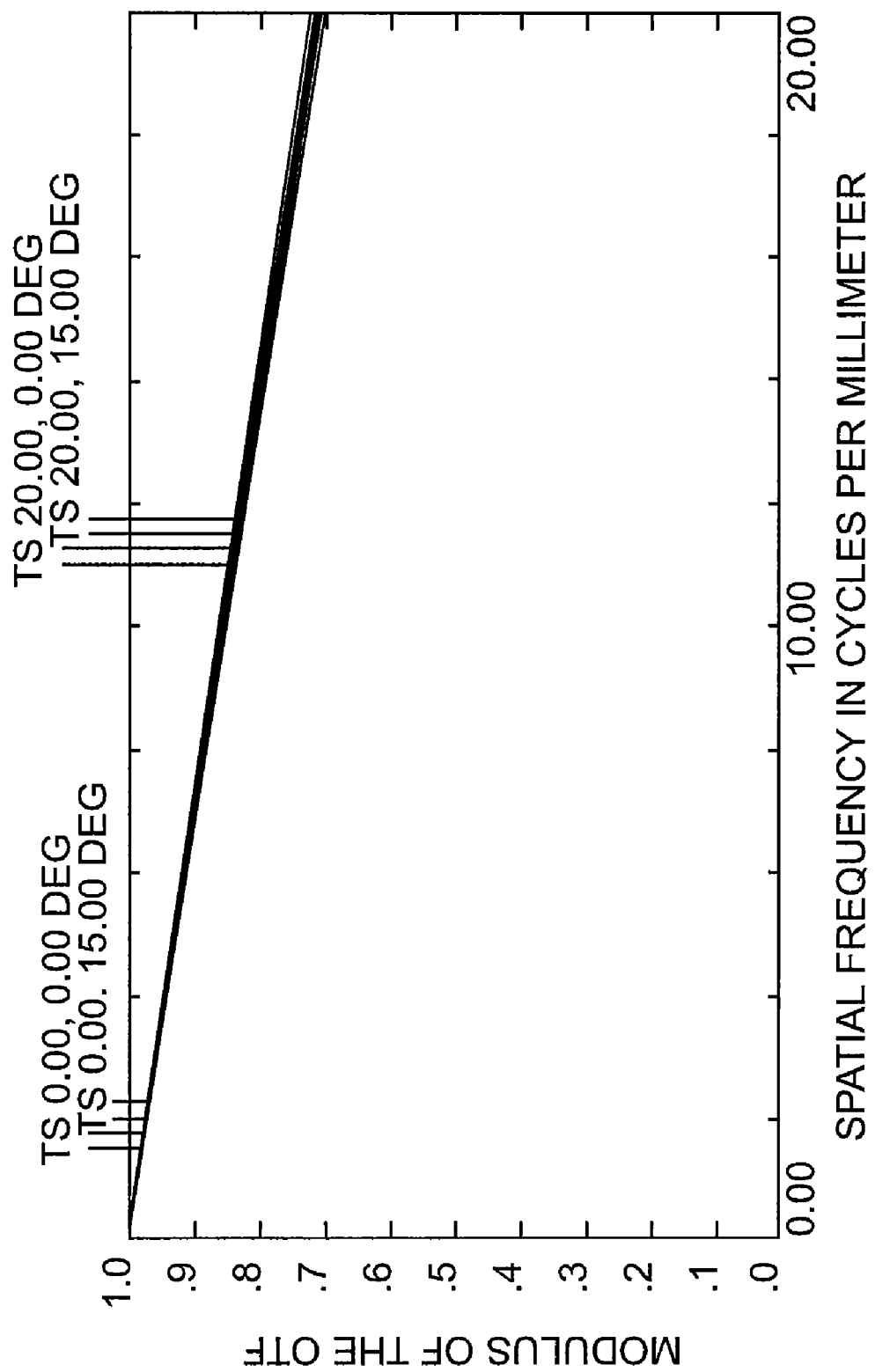
FIG. 26 is a diagram showing the modulation transfer function of the objective lens assembly in FIGS. 3-6.

FIG. 26 is a diagram showing the modulation transfer function calculated for objective lens assembly 300. Frequency response data is provided for various image points in the sensor format expressed in terms of X and Y object field angles. As shown in FIG. 26, the largest spatial frequency shown (20 cycles/mm) corresponds to the Nyquist frequency of the focal plane array of the long-wave infrared electronic camera employing the objective lens assembly 300.

FIGS. 27A-H are ray plot diagrams depicting the residual transverse ray aberrations of the VNIR objective lens assembly 1600. The diagram shows the transverse aberrations with X (horizontal) and Y (elevation) object field angles. The magnitudes of the transverse aberrations shown in FIGS. 27A-H are representative of the states of correction of other VNIR objective lens assemblies 1900 and 2200 consistent with the present invention.

Figure 28:
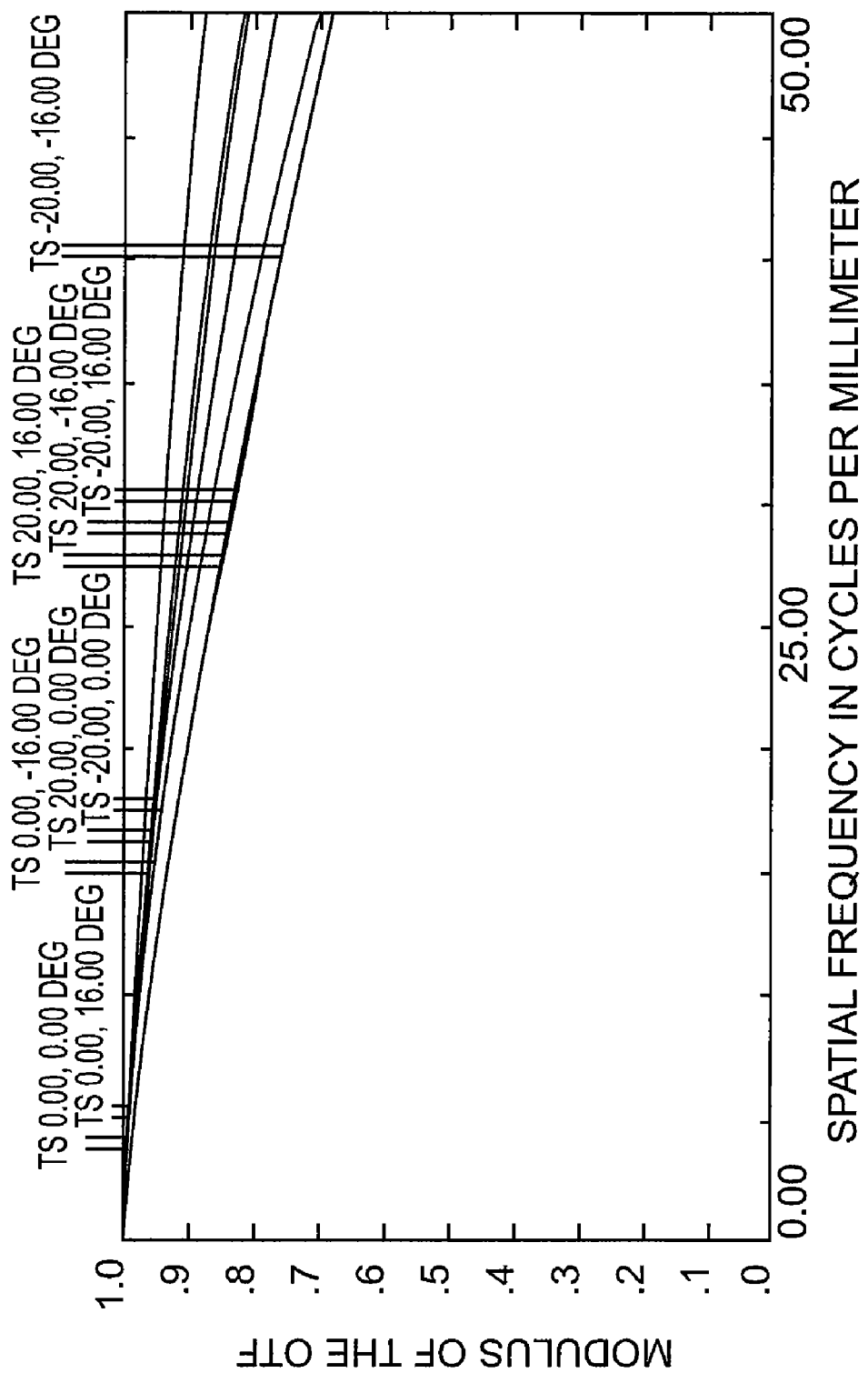
FIG. 28 is a diagram showing the modulation transfer function of the VNIR objective lens assembly in FIGS. 16-18.

FIG. 28 is a diagram showing the modulation transfer function calculated for the VNIR objective lens assembly 1600. In FIG. 28, response curves are shown for various object field angles. The upper limit of spatial frequency as shown (50 cycles/mm) represents the Nyquist frequency of the focal plane array of the VNIR electronic camera.

The VNIR waveband sensed in an object 80 scene is the result of specular radiation. Conversely, the LWIR waveband sensed in an object scene results from thermal radiation emitted from that object 80. The advantages of having sensing capability for both reflected radiation and thermal emission have become well known, particularly with respect to the complementary VNIR/SWIR and LWIR wavebands. There are two methods whereby the reflected and thermal IR wavebands may be fused; namely, either by optical means or by digital means.

Optical fusion requires LWIR and VNIR channels to be viewed through a common ocular with a beamsplitter means. The beamsplitter means provides for the conjoining of the two image modalities in a manner analogous to an optical overlay. The common ocular directly views the VNIR image, which is disposed near the front face of the beamsplitter means. The LWIR image, which has been converted into an output signal that is displayed on an OLED or LCD, is placed near an orthogonal face of said beamsplitter means. This image is viewed indirectly by the common ocular as a reflected image. The composite of the images sensed by the VNIR and LWIR are, therefore, optically fused at the ocular field stop.

Digital fusion of the VNIR and LWIR requires an arrangement consisting of LWIR and VNIR channels, and a sensing means for each channel. The radiation sensed by the respective focal plane arrays of the VNIR and LWIR electronic cameras is converted into corresponding electronic signals. These signals are then combined or fused by signal or computational processing to produce an output signal. Subsequently, the output signal is displayed as a composite visualization of dual LWIR/VNIR imagery via monitor or head-mounted display (HMD) apparatus.

Figure 29:
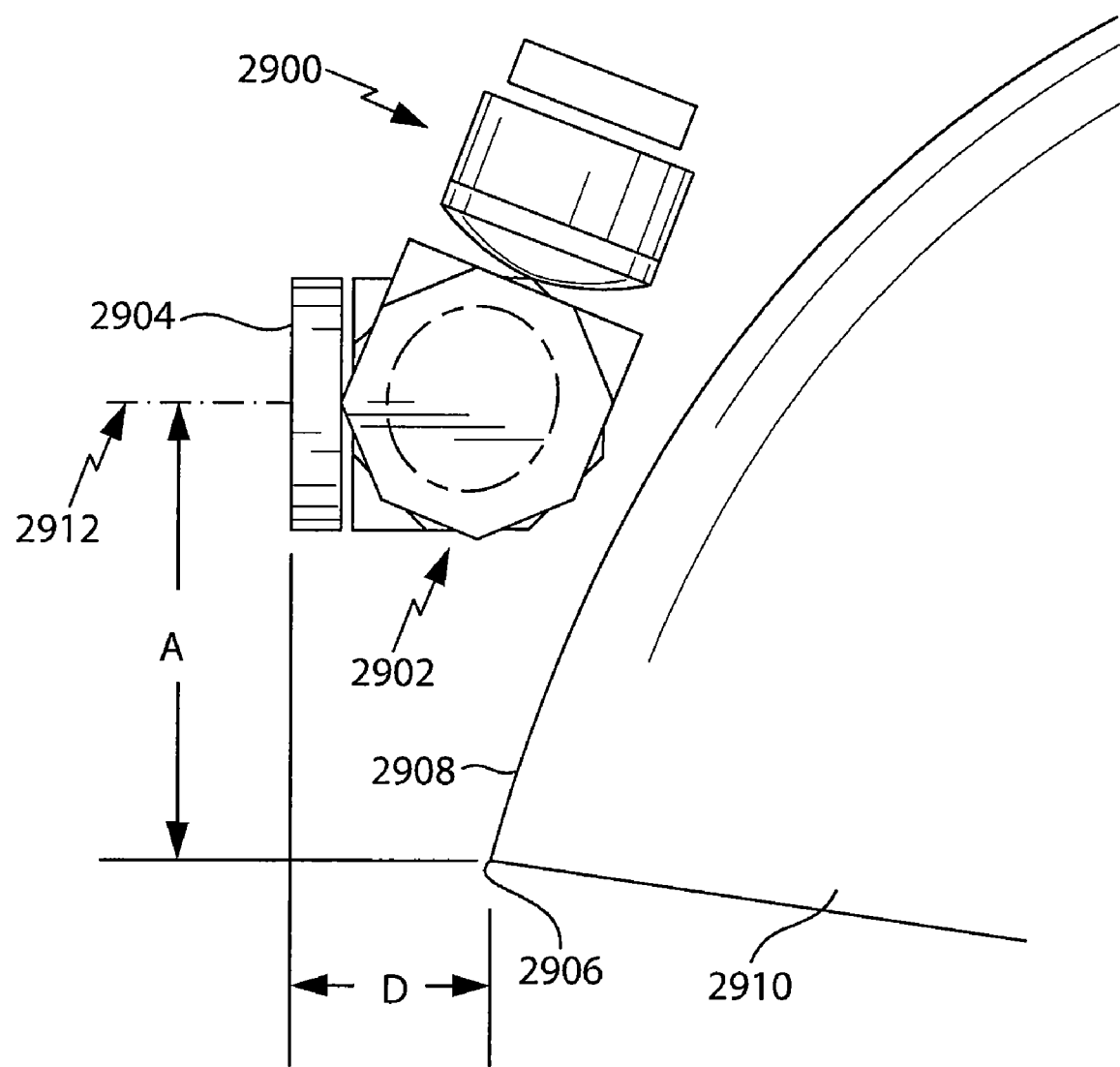
FIG. 29 is a side view of an exemplary optical system having a LWIR objective lens assembly and a VNIR objective lens assembly in accordance with the present invention, where each objective lens assembly has a depth D relative to a front surface of the objective lens assembly and a front surface of a helmet on which each objective lens assembly is mounted.
Figure 30:
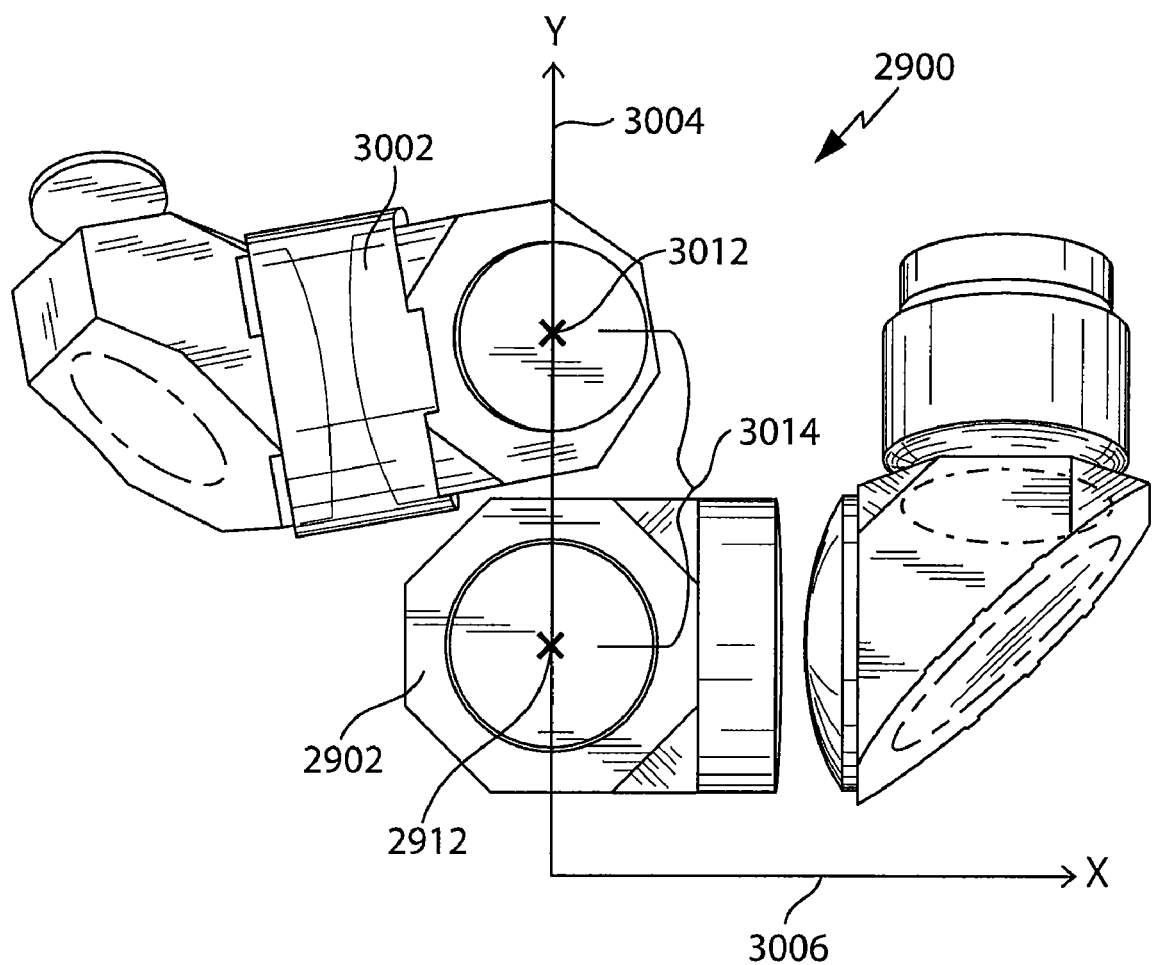
FIG. 30 is a front view of the optical system in FIG. 29 in which the LWIR objective lens assembly and the VNIR objective lens assembly of the optical system are juxtaposed next to each other such that the principal axial ray of each objective lens assembly is aligned along a common vertical axis of the optical system, as viewed from the front side thereof.

FIG. 29 is a perspective side view and FIG. 30 is a perspective front view of an exemplary optical system 2900 having a VNIR objective lens assembly 2902 and a LWIR objective lens assembly 3002 (not shown in FIG. 29) in accordance with the present invention. Object images detected via the LWIR objective lens assembly 3002 (i.e., object images detected from object light rays in the thermal infrared waveband) and a VNIR objective lens assembly 2902 (i.e., object images detected from object light rays in the specular waveband) are fused by an upstream image detector and processor (e.g., VNIR detector 3202 and LWIR detector 3302 in FIGS. 31-33) to provide complementary information about an object 80 of interest. Each objective lens assembly 2902 and 3002 has a depth D relative to a front surface 2904 of the objective lens assembly and a proximal end 2906 of a front surface 2908 of a helmet 2910 on which each objective lens assembly 2902 and 3002 is mounted. As shown in FIG. 30, the VNIR objective lens assembly 2902 and the LWIR objective lens assembly 3002 of the optical system 2900 are juxtaposed next to each other such that the respective principal axial ray 2912 and 3012 (which is parallel to the body Z-axis 84 of each objective lens assembly 2902 and 3002) of each objective lens assembly 2902 and 3002 extends into the plane of the diagram and is aligned along a common vertical axis (e.g., Y-axis 3004) of the optical system 2900.

The LWIR objective lens assembly 3002 corresponds to the objective lens assembly 300, 700, 900, or 1300 described herein. The VNIR objective lens assembly 2902 corresponds to the objective lens assembly 1600, 1900, or 2200 also described herein. Each of the two objective lens assemblies 2902 and 3002 have a first prism 330, 730, 1030, 1330, 1620, 1920, or 2220 and a second prism 350, 790, 1050, 1390, 1670, 1970, and 2270 that are each rotated about their respective local Z-axis so that each objective lens assembly 2902 and 3002 has a respective optical path 10 that conforms to the front surface 2908 of the helmet 2910 while having a depth D that is equal to or less than approximately 22 millimeters. Accordingly, the optical system 2900 is operatively configured to avoid the forward projection problem experienced with other conventional objective lens assemblies or optical systems.

Although in close proximity to each other, the vertical displacement 3014 of objective lens assemblies 2902 and 3002 as shown in FIG. 30 causes the view orientation respective of both objectives to be slightly different, making co-registration of the fused images of the two separate sensing arrays (i.e., focal plane array 380 of LWIR objective lens assembly 300 and rear surface 1692 corresponding to the focal plane array of VNIR objective lens assembly 1600) dependent on object distance (depth of scene). However, the rationale for fusing the two imaging modalities is to improve the detection of human targets at object distances ranging from a minimum of 50 meters to a maximum of 300 meters. Over this range of object distances, neither objective lens assembly 2902 nor objective lens assembly 3002 requires refocusing, nor will the resultant sensor-to-sensor parallax be a significant factor to co-registration mapping. In those operational situations where an object of interest may be close at hand, such as map reading, for example, using the VNIR objective lens assembly 2902 would be favored over the use of the two imaging modalities in fusion. Further, when the ambient lighting conditions are extremely low, such as in an unlit room, the fusing of the two infrared imaging modalities may not be of any apparent consequence. Moreover, when moving over rough terrain under starlit conditions, the movements of a soldier wearing the helmet 2910 might best be served by using just one image modality, specifically the visible near-infrared waveband of the VNIR objective lens assembly 2902.

There are other optical sensor system architectures that distinguish them from being less prone to sensor-to-sensor parallax. These include the single window and the common aperture optical arrangements. The single window approach necessitates a beamsplitting means positioned near the proximal end portion of this arrangement, followed by an objective lens assembly in each of the bifurcated paths. When mounted on a helmet, this configuration has an unfavorably long forward projection, making it impractical in many operational situations. Additionally, the separate imaging optics, as required in the single window layout, always creates a small stereo baseline between the two focal plane arrays.

The common aperture arrangement, on the other hand, requires the use of refractive materials that are capable of transmitting light in both the VNIR\SWIR (0.6-1.7 µm) and the LWIR (8.0-12.0 µm) wavebands. Materials capable of transmitting both of these wavebands also exhibit undesirable physical characteristics, such as hygroscopicity and thermal sensitivity, that may be impractical for military applications and other commercial applications requiring high moisture, humidity, and thermal sensitivity. Furthermore, the waveband of each image modality must propagate through a plurality of sequentially disposed optical elements prior to being separated by a beamsplitting means, which is located near the distal end portion of the common aperture configuration. The common aperture approach is neither sufficiently compact nor thin for a head mounted application.

Figure 31:
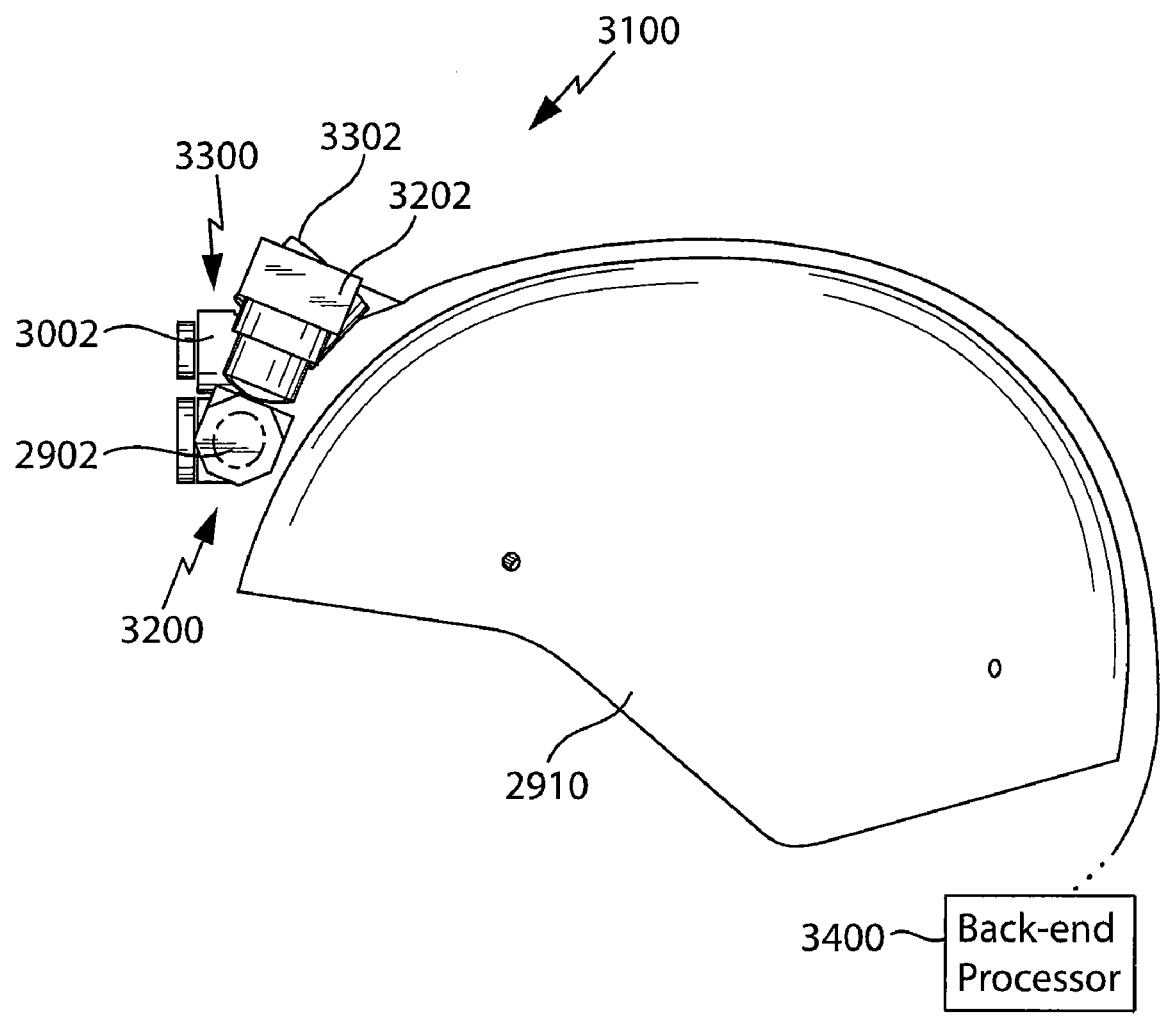
FIG. 31 is a perspective side view of an exemplary dual camera system mounted on a helmet and incorporating the optical system in FIGS. 29-30 in accordance with the present invention.
Figure 32:
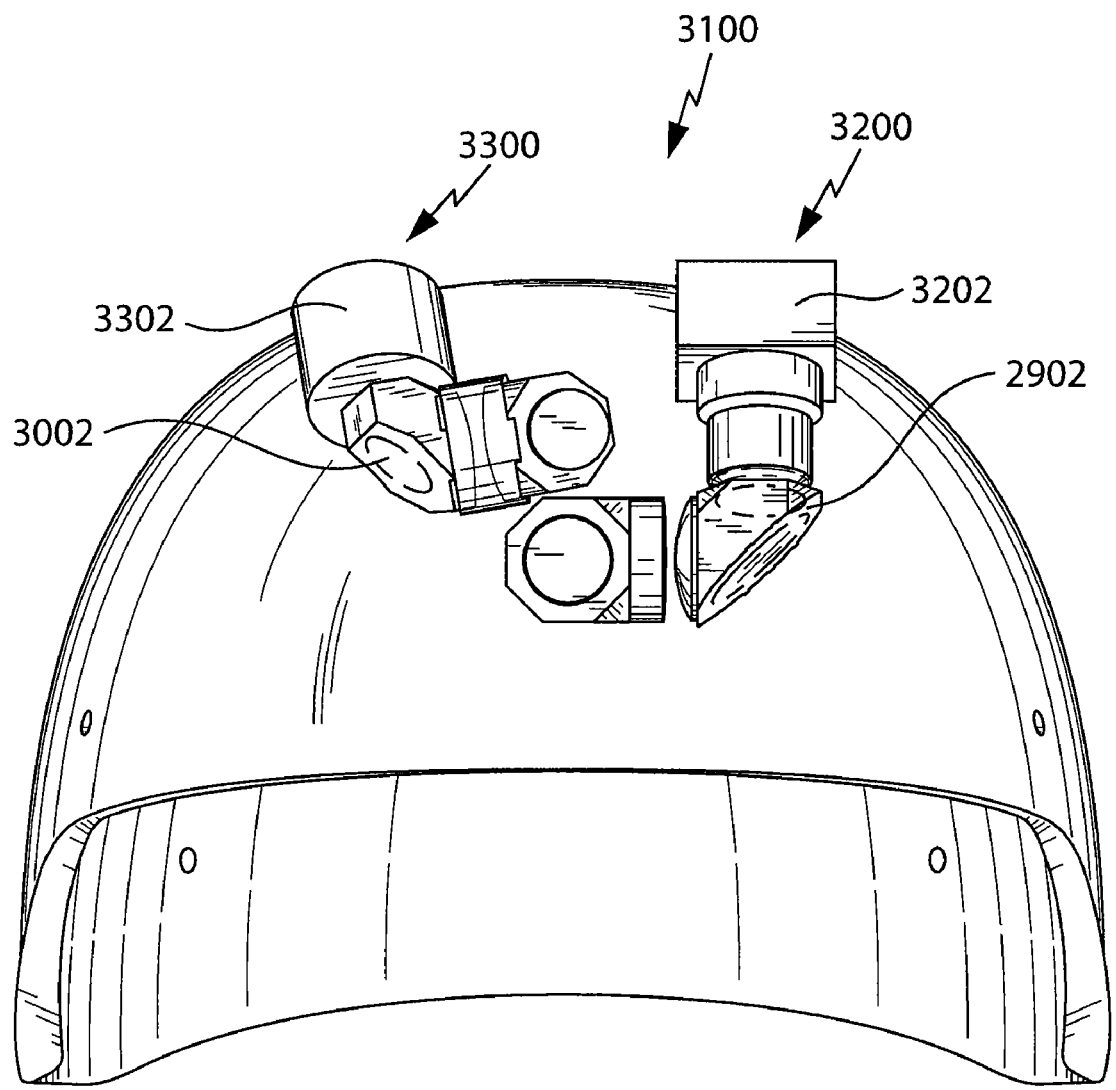
FIG. 32 is a perspective front view of the dual camera system in FIG. 31.
Figure 33:
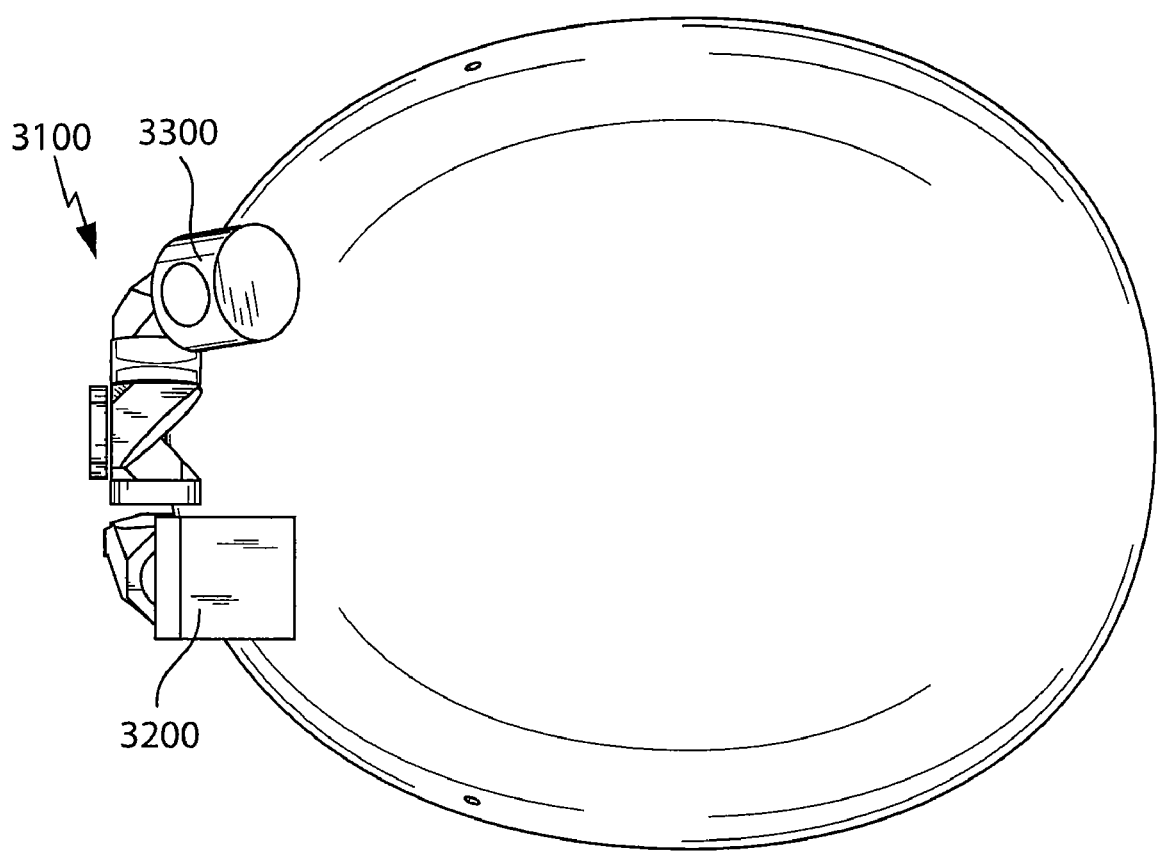
FIG. 33 is a perspective top view of the dual camera system in FIG. 31.

FIGS. 31 to 33 depict a dual camera system 3100 mounted (mounting means not shown) on the helmet 2910 and incorporating the optical system 2900 in accordance with the present invention. The dual camera system 3100 includes a VNIR camera 3200, a LWIR camera 3300, and a back-end processor 3400 that is operatively connected to the VNIR camera 3200 and the LWIR camera 3300. The back-end processor 3400, which may be disposed away from the helmet 2910, is operatively configured to receive and fuse images detected by the VNIR camera 3200 and the LWIR camera 3300 for display to a user, such as the person wearing the helmet 2900. The back-end processor 3400 may fuse the detected images using known signal or computational processing techniques.

The VNIR camera 3200 includes the VNIR objective lens assembly 2902 and a VNIR image detector and processor 3202, which is operatively configured to receive an image from the VNIR objective lens assembly 2902 (e.g., via the focal plane array corresponding to 1690, 1990, or 2290) and process the image, if necessary, before transmitting the image to the back-end processor 3400. As discussed above, the VNIR objective lens assembly 2902 may be formed consistent with the VNIR objective lens assembly 1600, 1900, or 2200.

The LWIR camera 3300 includes the LWIR objective lens assembly 3002 and a LWIR image detector and processor 3302, which is operatively configured to receive an image from the LWIR objective lens assembly 3002 (e.g., via the focal plane array 380) and process the image, if necessary, before transmitting the image to the back-end processor 3400. As discussed above, the LWIR objective lens assembly 3002 may be formed consistent with the VNIR objective lens assembly 300, 700, 1000 or 1300.

Figure 34:
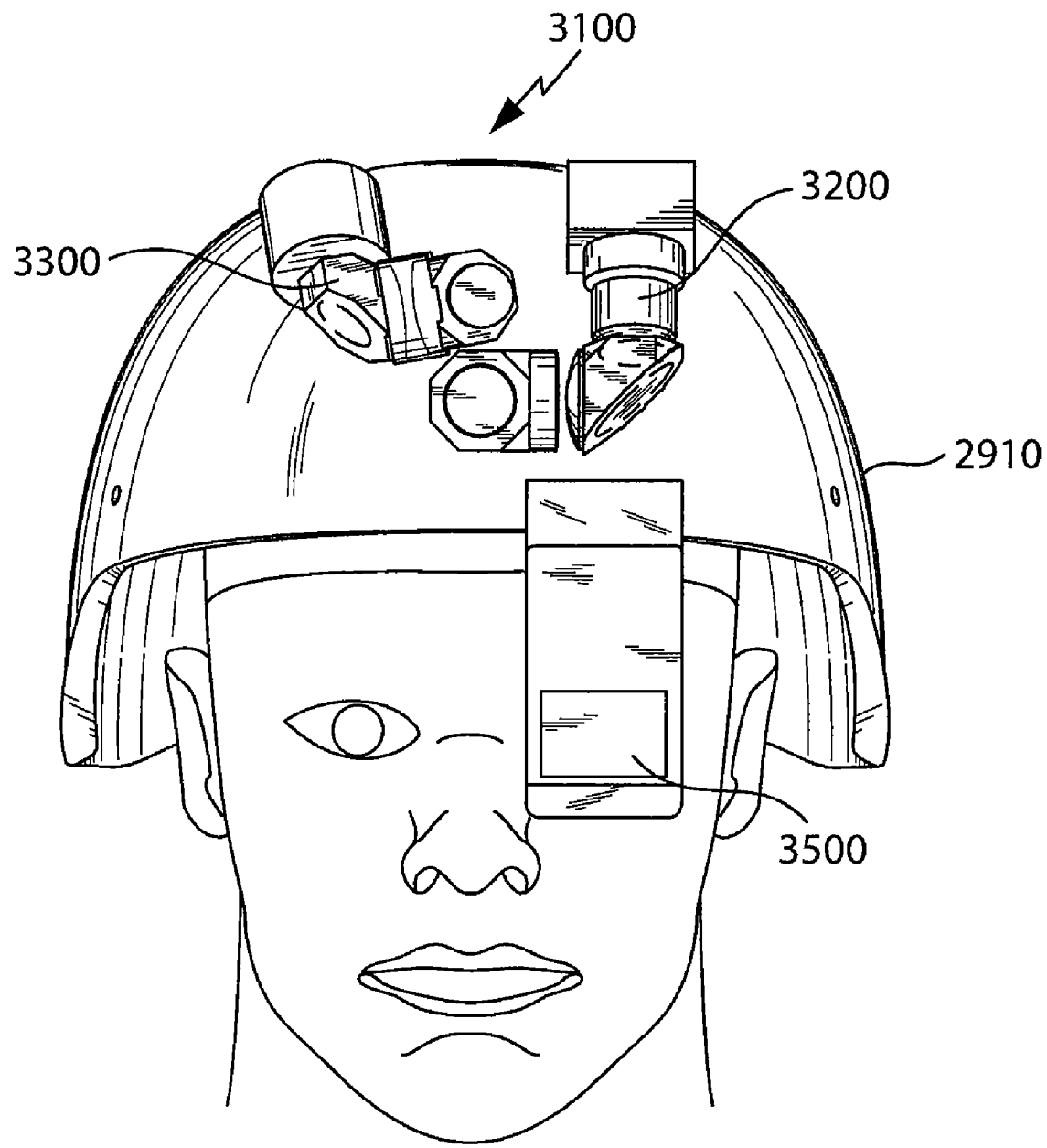
FIG. 34 is a perspective front view of the dual camera system in FIG. 31, where the dual camera system includes a near-to-eye display.
Figure 35:
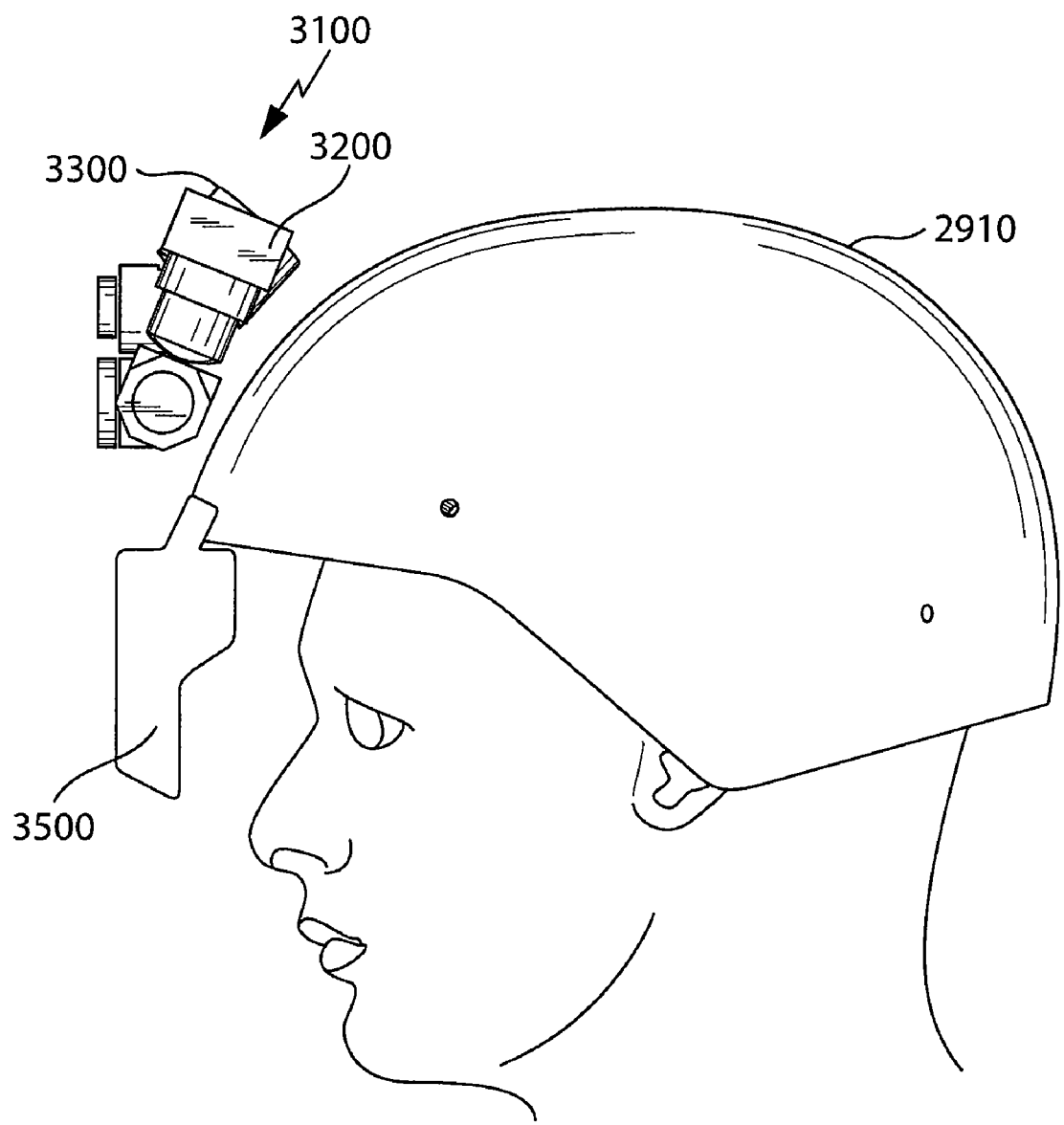
FIG. 35 is a perspective side view of the dual camera system in FIG. 34.

FIGS. 34 and 35 are conceptual views of arrangement 2900 as shown in FIG. 30 incorporating a near-to-eye display 3500, as it would appear mounted on a helmet (mounting provisions not shown). FIG. 34 is a perspective view showing arrangement 2900 and near-to-eye display 3500 as viewed from the front. FIG. 35 is a perspective view of FIG. 33 as viewed from the right side thereof.

FIGS. 34 and 35 depict the dual camera system 3100, where the dual camera system 3100 includes a near-to-eye display 3500 mounted to the helmet 2910 and operatively connected to the back-end processor 3400 (not in view in FIGS. 34 and 35). As discussed above, radiation or light from an object 80 is respectively received, twice folded, and then projected on a respective focal plane array (e.g., corresponding to 380, 1690, 1990, or 2290) by the LWIR objective lens assembly 3002 and the VNIR objective lens assembly 2902. The radiation or light projected on the respective focal plane array corresponding to 380, 1690, 1990, or 2290 is then converted by the respective image detector and processor 3302 and 3202 into corresponding electronic image signals that are then combined or fused by the back-end processor 3400 to produce a fused image for output to the near-to-eye display 3500. The near-to-eye display 3500 may be a near-to-eye prism display device as disclosed by commonly assigned U.S. Pat. No. 5,875,056 entitled "HEAD OR FACE MOUNTED IMAGE DISPLAY APPARATUS," the contents of which are incorporated herein by reference.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What I claim is:

1. An objective lens assembly for forming an image of an object, comprising:

a first prism having, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism;

a second prism having, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism;

wherein the first prism has a first local coordinate system having a local X-axis, a local Y-axis, and a local Z-axis that intersects the first transmitting surface A of the first prism, the first prism being rotated a first predetermined angle about the local Z-axis of the first prism, and wherein the second prism has a second local coordinate system having a local axis that intersects the first transmitting surface D of the second prism and is aligned with one of the local X-axis and the local Y-axis of the rotated first prism, the second prism being rotated a second predetermined angle about the local axis of the second prism.

2. An objective lens assembly as set forth in claim 1, wherein the first prism and the second prism are each right angle prisms.

3. An objective lens assembly as set forth in claim 1, wherein the first prism and the second prism are each constructed from a thermal infrared transmitting material having a refractive index ($n_{10}$), at a wavelength of 10 micrometers, greater than 2.38.

4. An objective lens assembly as set forth in claim 1, wherein the first transmitting surface A and the second transmitting surface C each have curvature adapted to converge light from the object.

5. An objective lens assembly as set forth in claim 1, wherein the first transmitting surface D and the second transmitting surface F each have curvature adapted to converge light from the object.

6. An objective lens assembly as set forth in claim 1, wherein the first prism and the second prism comprise a chalcogenide glass.

7. An objective lens assembly as set forth in claim 1, wherein the first prism and the second prism each have positive refractive power.

8. An objective lens assembly as set forth in claim 1, wherein the first and second prisms each are passively athermal.

9. An objective lens assembly as set forth in claim 1, further comprising a first lens disposed between the object side and the first transmitting surface A of the first prism.

10. An objective lens assembly as set forth in claim 9, wherein the first lens has a rotationally symmetric polynomial aspheric surface.

11. An objective lens assembly as set forth in claim 1, further comprising an optical element disposed between the second transmitting surface C of the first prism and the first transmitting surface D of the second prism.

12. An objective lens assembly as set forth in claim 11, wherein the optical element has a rotationally symmetric polynomial aspheric surface.

13. An objective lens assembly as set forth in claim 1, further comprising a second optical element facing the second transmitting surface F of the second prism.

14. An objective lens assembly as set forth in claim 13, wherein the second optical element has a rotationally symmetric polynomial aspheric surface.

15. An objective lens assembly as set forth in claim 14, wherein the rotationally symmetric polynomial aspheric surface is a diffractive surface.

16. An objective lens assembly as set forth in claim 1, wherein the first predetermined angle is greater than 0° and equal to or less than 45°.

17. An objective lens assembly as set forth in claim 16, wherein the first prism has an axial principal ray that is orthogonal to and centered on a first plane defined by the first transmitting surface A and parallel to the local Z-axis and the local Y-axis of the first prism, the local Z-axis of the first prism being aligned with the first axial principal ray.

18. An objective lens assembly as set forth in claim 17, wherein the first predetermined angle is an angle formed between the axial principal ray of the first prism and the local Y-axis of the first prism before rotation of the first prism.

19. An objective lens assembly as set forth in claim 1, wherein the first prism and the second prism are each rotated in a same angular direction.

20. An objective lens assembly as set forth in claim 1, wherein the second predetermined angle is not equal to the first predetermined angle.

21. An objective lens assembly as set forth in claim 1, wherein the second predetermined angle is greater than 0° and equal to or less than 45°.

22. An objective lens assembly as set forth in claim 21, wherein the second prism has an axial principal ray that is orthogonal to and centered on a second plane defined by the first transmitting surface D and parallel to a local Z-axis and a local Y-axis of the second prism, the local Z-axis of the second prism being aligned with the axial principal ray of the second prism.

23. An objective lens assembly as set forth in claim 22, wherein the second predetermined angle is an angle formed between the axial principal ray of the second prism and the local Y-axis of the second prism before rotation of the second prism.

24. A dual field-of-view objective lens assembly for forming an image of an object, comprising, in sequence from the object side thereof:
  a first grouping including a first positive power lens; a first prism; and a second positive power lens; and
  a second grouping including a first negative power lens, a second prism and a second positive power lens,
  wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
  wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism, and
  wherein the second positive power lens of the first grouping has a center axis and is adapted to selectively move along the center axis between the second transmitting surface C of the first prism and the first negative power lens to change a focal length of the objective lens assembly between a narrow focal position and a wide-angle focal position.

25. A dual field-of-view objective lens assembly as set forth in claim 24, wherein the first prism and the second prism are each right angle prisms.

26. A dual field-of-view objective lens assembly as set forth in claim 24, wherein the first and the second positive power lens and the first prism of the first grouping and the first negative power lens, the second prism and the second positive power lens of the second grouping are each constructed of infrared transmitting materials having a refractive index ($n_{10}$), at a wavelength of 10 micrometers, greater than 3.33.

27. A dual field-of-view objective lens assembly as set forth in claim 24, wherein the first transmitting surface A and the second transmitting surface C of the first prism each have curvature adapted to converge light from the object.

28. A dual field-of-view objective lens assembly as set forth in claim 24, wherein the first prism has negative refractive power.

29. A dual field-of-view objective lens assembly as set forth in claim 24, wherein the first transmitting surface D and the second transmitting surface F of the second prism each have curvature adapted to converge light from the object.

30. A dual field-of-view objective lens assembly as set forth in claim 24, wherein the second prism has positive refractive power.

31. A dual field-of-view objective lens assembly as set forth in claim 24, wherein the second positive power lens of the first grouping comprises at least one surface having a rotationally symmetric polynomial aspheric attribute.

32. A dual field-of-view objective lens assembly as set forth in claim 24, further comprising an aperture stop means for varying an f-number of the objective lens assembly from about 1.2 to 1.0 between the narrow and wide-angle focal positions, respectively.

33. A dual field-of-view objective lens assembly as set forth in claim 24, wherein the first prism has a first local coordinate system having a local X-axis, a local Y-axis, and a local Z-axis that intersects the first transmitting surface A of the first prism, the first prism being rotated a first predetermined angle about the local Z-axis of the first prism, and wherein the second prism has a second local coordinate system having a local axis that intersects the first transmitting surface D of the second prism and is aligned with one of the local X-axis and the local Y-axis of the rotated first prism, the second prism being rotated a second predetermined angle about the local axis of the second prism.

34. A dual field-of-view objective lens assembly as set forth in claim 33, wherein the first predetermined angle and the second predetermined angle are each greater than 0° and equal to or less than 45°.

35. A dual field-of-view objective lens assembly as set forth in claim 33, wherein the first prism has an axial principal ray that is orthogonal to and centered on a first plane defined by the first transmitting surface A and parallel to the local Z-axis and the local Y-axis of the first prism, the local Z-axis of the first prism being aligned with the axial principal ray, and the first predetermined angle is an angle formed between the axial principal ray of the first prism and the local Y-axis of the first prism before rotation of the first prism.

36. A dual field-of-view objective lens assembly as set forth in claim 33, wherein the second prism has an axial principal ray that is orthogonal to and centered on a second plane defined by the first transmitting surface D and parallel to a local Z-axis and a local Y-axis of the second prism, the local Z-axis of the second prism being aligned with the axial principal ray of the second prism, and the second predetermined angle is an angle formed between the axial principal ray of the second prism and the local Y-axis of the second prism before rotation of the second prism.

37. A dual field-of-view objective lens assembly as set forth in claim 33, wherein the second predetermined angle is not equal to the first predetermined angle.

38. An objective lens assembly for forming an image of an object, comprising, in sequence from the object side thereof:
    a first grouping including a first prism and a first achromatic doublet; and
    a second grouping including a second prism and a second achromatic doublet,
    wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
    wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism,
    wherein the first achromatic doublet includes a first positive power lens and a first negative power lens, the second achromatic doublet includes a second positive power lens and a second negative power lens, and the first positive power lens, the second positive power lens, the first prism and the second prism each have positive power for converging light, and
    wherein the first positive power lens, the second positive power lens, the first prism and the second prism are each formed from a high index, low dispersion refractive material and each has a refractive index greater than 1.74 and an Abbe' v-number greater than 45.

39. An objective lens assembly for forming an image of an object, comprising, in sequence from the object side thereof:
    a first grouping including a first prism and a first achromatic doublet; and
    a second grouping including a second prism and a second achromatic doublet,
    wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
    wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism,
    wherein the first achromatic doublet includes a first positive power lens and a first negative power lens, the second achromatic doublet includes a second positive power lens and a second negative power lens, and the first positive power lens, the second positive power lens, the first prism and the second prism each have positive power for converging light, and
    wherein the first negative power lens and the second negative power lens are each formed from a high index, high dispersion refractive material and each has a refractive index greater than 1.75 and an Abbe' v-number less than 28.

40. An objective lens assembly for forming an image of an object, comprising, in sequence from the object side thereof:
    a first grouping including a first prism and a first achromatic doublet; and
    a second grouping including a second prism and a second achromatic doublet,
    wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
    wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism,
    wherein the first achromatic doublet includes a first positive power lens and a first negative power lens, the second achromatic doublet includes a second positive power lens and a second negative power lens, and the first positive power lens, the second positive power lens, the first prism and the second prism each have positive power for converging light, and
    wherein the objective lens assembly further comprises a field lens disposed between the object and the first transmitting surface A of the first prism, the field lens having a surface that has a rotationally symmetric polynomial aspheric geometry for the correction of a field-dependent aberration associated with the objective lens assembly.

41. An objective lens assembly for forming an image of an object, comprising, in sequence from the object side thereof:
a first grouping including a first prism and a first achromatic doublet; and
a second grouping including a second prism and a second achromatic doublet,
wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism,
wherein the first achromatic doublet includes a first positive power lens and a first negative power lens, the second achromatic doublet includes a second positive power lens and a second negative power lens, and the first positive power lens, the second positive power lens, the first prism and the second prism each have positive power for converging light, and
wherein the second transmitting surface C of the first prism has curvature for the correction of an aperture-dependent aberration associated with the first grouping.

42. An objective lens assembly for forming an image of an object, comprising, in sequence from the object side thereof:
a first grouping including a first prism and a first achromatic doublet; and
a second grouping including a second prism and a second achromatic doublet,
wherein the first prism has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism,
wherein the second prism has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism,
wherein the first achromatic doublet includes a first positive power lens and a first negative power lens, the second achromatic doublet includes a second positive power lens and a second negative power lens, and the first positive power lens, the second positive power lens, the first prism and the second prism each have positive power for converging light, and
wherein the first transmitting surface of the second prism has curvature that converges light passing through the first transmitting surface for correction of an aperture-dependent aberration associated with the said second grouping.

43. An optical system comprising:
a first objective lens assembly for forming a thermal image of an object; and a second objective lens assembly for forming a near-infrared image of the object; wherein the first objective lens assembly includes:
a first prism having, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism, the first prism having a first local coordinate system having a local X-axis, a local Y-axis, and a local Z-axis that intersects the first transmitting surface A of the first prism, the first prism being rotated a first predetermined angle about the local Z-axis of the first prism; and
a second prism having, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism, the second prism having a second local coordinate system having a local axis that intersects the first transmitting surface D of the second prism and is aligned with one of the local X-axis and the local Y-axis of the rotated first prism, the second prism being rotated a second predetermined angle about the local axis of the second prism;
wherein the second objective lens assembly includes: a first grouping including a first prism and a first achromatic doublet; and a second grouping including a second prism and a second achromatic doublet,
wherein the first prism of the first grouping has, in sequence of light propagation from the object, a first transmitting surface A, a reflecting surface B and a second transmitting surface C, the first transmitting surface A being operatively configured to pass light from the object to the reflecting surface B, the reflecting surface B being operatively configured to reflect the passed light towards the second transmitting surface C, the second transmitting surface C being operatively configured to allow the reflected light from the reflecting surface B to pass through and exit the first prism of the first grouping, and wherein the second prism of the second grouping has, in sequence of light propagation from the object, a first transmitting surface D, a reflecting surface E and a second transmitting surface F, the first transmitting surface D being operatively configured to pass the light exiting the first prism to the reflecting surface E, the reflecting surface E being operatively configured to reflect the passed light towards the second transmitting surface F, the second transmitting surface F being operatively configured to allow the reflected light from the reflecting surface E to pass through and exit the second prism of the second grouping.

44. An optical system as set forth in claim 43, wherein the first objective lens assembly and the second objective lens assembly each have a respective axial principal ray, and the first objective lens assembly and the second objective lens assembly are juxtaposed to each other such that the axial principal ray of the first objective lens assembly and the axial principal ray of the second objective lens assembly are parallel and vertically displaced from each other.

45. An optical system as set forth in claim 44, wherein the first prism of the first grouping has a local Z-axis that intersects the first transmitting surface A of the first prism of the first grouping, the first prism of the first grouping being rotated a third predetermined angle about its local Z-axis, and the second prism of the second grouping has a local Z-axis that intersects the first transmitting surface D of the second prism of the second grouping, the second prism of the second grouping being rotated a fourth predetermined angle about its local Z-axis.

46. An optical system as set forth in claim 44, wherein the first and the second prisms of the first objective lens assemblies are rotated in an opposite angular direction from the first and the second prisms of the second objective lens assemblies.

47. An optical system as set forth in claim 46, wherein the first and the second objective lens assemblies are adapted to be mounted to a curved surface of a helmet such that the following conditions are satisfied:

$$20.0 < A_1 < 28.0$$

$$0.55 < D_1/\emptyset_1 < 0.82$$

where $A_1$ is the vertical distance, in millimeters, from an end of the curved surface to an axial principal ray centered on and orthogonal to a plane defined by the first transmitting surface A of the second objective lens assembly, $D_1$ is a horizontal distance between a front surface of the second objective lens assembly closest to the object and the end of the curved surface of the helmet, and $\emptyset_1$ is the diameter of an entrance pupil of the second objective lens assembly.

48. An optical system as set forth in claim 46, wherein the first and the second objective lens assemblies are adapted to be mounted to a curved surface of a helmet such that the following conditions are satisfied:

$$28.0 < A_2 < 54.0$$

$$0.42 < D_2/\emptyset_2 < 0.63$$

where $A_2$ is the vertical distance, in millimeters from an end of the curved surface to an axial principal ray centered on and orthogonal to a plane defined by the first transmitting surface A of the first objective lens assembly, $D_2$ is a horizontal distance between a front surface of the first objective lens assembly closest to the object and the end of the curved surface of the helmet, and $\emptyset_2$ is the diameter of an entrance pupil of the first objective lens assembly.

* * * * *